United States Patent
Chen et al.

(10) Patent No.: US 12,545,729 B2
(45) Date of Patent: Feb. 10, 2026

(54) ANTI-TREM2 AGONIST ANTIBODIES AND ANTIGEN-BINDING FRAGMENTS THEREOF THAT CAN INCREASE LEVELS OF SOLUBLE TREM2 IN SERUM AND BRAIN TISSUE

(71) Applicant: MABWELL THERAPEUTICS, INC., San Diego, CA (US)

(72) Inventors: Buxin Chen, San Marcos, CA (US); Yubin Wang, San Diego, CA (US); Xin Du, La Jolla, CA (US); Hsueh-Chung Lu, San Diego, CA (US); Lei Huang, San Diego, CA (US)

(*) Notice: Subject to any disclaimer, the term of this patent is extended or adjusted under 35 U.S.C. 154(b) by 0 days.

(21) Appl. No.: 19/252,441

(22) Filed: Jun. 27, 2025

(65) Prior Publication Data

US 2026/0001952 A1    Jan. 1, 2026

Related U.S. Application Data

(60) Provisional application No. 63/813,837, filed on May 29, 2025, provisional application No. 63/664,985, filed on Jun. 27, 2024.

(51) Int. Cl.
| | |
|---|---|
| *C07K 16/28* | (2006.01) |
| *A61K 39/395* | (2006.01) |
| *A61P 25/00* | (2006.01) |
| *A61P 25/28* | (2006.01) |
| *C07K 16/18* | (2006.01) |
| *C12N 15/00* | (2006.01) |
| *A61K 39/00* | (2006.01) |

(52) U.S. Cl.
CPC ........ *C07K 16/2803* (2013.01); *A61K 39/395* (2013.01); *A61P 25/00* (2018.01); *A61P 25/28* (2018.01); *C07K 16/28* (2013.01); *C12N 15/00* (2013.01); *A61K 2039/505* (2013.01); *C07K 2317/34* (2013.01); *C07K 2317/565* (2013.01); *C07K 2317/734* (2013.01); *C07K 2317/75* (2013.01)

(58) Field of Classification Search
CPC ............ C07K 2317/92; C07K 2317/24; C07K 2317/75; C07K 2317/21; C07K 2317/34; C07K 2317/33; C07K 2317/565; C07K 16/28; C07K 2317/567; C07K 2317/622; C07K 2317/51; C07K 16/18; C07K 2317/522; A61K 2039/505; A61K 2039/507; A61K 47/6849; A61K 39/39541; A61K 39/395; A61P 25/28; A61P 25/00
See application file for complete search history.

(56) References Cited

U.S. PATENT DOCUMENTS

| | | |
|---|---|---|
| 2019/0315858 A1 | 10/2019 | Monroe et al. |
| 2019/0330335 A1* | 10/2019 | Schwabe ................. A61P 37/04 |
| 2023/0295297 A1* | 9/2023 | Schwabe ................... A61P 1/04 |
| | | 424/172.1 |

FOREIGN PATENT DOCUMENTS

| | | |
|---|---|---|
| WO | 2017062672 A2 | 4/2017 |
| WO | 2018195506 | 10/2018 |

OTHER PUBLICATIONS

MacCallum et al.,J. Mol. Biol., 1996; 262: 732-745.*
Pascalis et al.,The Journal of Immunology, 2002; 169: 3076-3084.*
Casset et al., BBRC, 2003; 307: 198-205.*
Vajdos et al., J. Mol. Biol. 2002; 320: 415-428.*
Holm et al., Mol. Immunol., 2007; 44: 1075-1084.*
Chen et al., J. Mol. Bio., 1999; 293: 865-881.*
Wu et al., J. Mol. Biol., 1999; 294:151-162.*
Burgess et al. J of Cell Bio. 1990, 111:2129-2138.*
Pawson et al. 2003, Science 300:445-452.*
Alaoui-Ismaili et al., Cytokine Growth Factor Rev. 2009; 20:501-507.*
Guo et al., PNAS 2004; 101:9205-9210.*
Rudikoff et al., Proc. Natl. Acad. Sci. USA 1982 vol. 79: p. 1979.*
The factsheet of NCT04592874 retrieved from the clinical trial website: clinicaltrials.gov/study/NCT04592874 on Aug. 21, 2025.*
Colonna et al. Nat. Med. published Jul. 2, 2025. doi.org/10.1038/s41591-025-03816-2.*
Schlepckow et al. (2020) "Enhancing protective microglial activities with a dual function TREM2 antibody to the stalk region" EMBO Mol Med 12: e11227, DOI: 10.15252/emmm.2019112271.
Van Lengerich et al. (2023) "A TREM2-activating antibody with a blood-brain barrier transport vehicle enhances microglial metabolism in Alzheimer's disease models" Nature Neuroscience 26, pp. 416-429 DOI: 10.1038/s41593-022-01240-0.
Wang et al. (2020) "Anti-human TREM2 induces microglia proliferation and reduces pathology in an Alzheimer's disease model" J. Exp. Med. 217:9, e20200785 DOI: 10.1084/jem.20200785.

(Continued)

*Primary Examiner* — Chang-Yu Wang
(74) *Attorney, Agent, or Firm* — PERDUE IP LAW, APC; Donna O. Perdue

(57) ABSTRACT

The present disclosure relates to antibodies that bind the extracellular domain of human TREM2 and the use of anti-TREM2 antibodies in therapy, prophylaxis, diagnosis, screening, and monitoring, including for increasing levels of soluble TREM2 (sTREM2) in serum and brain, increasing phagocytosis by microglia and/or macrophages, and developing treatments to address TREM2-mediated conditions that may benefit from enhanced phagocytosis by microglia and/or macrophages.

7 Claims, 17 Drawing Sheets
Specification includes a Sequence Listing.

(56) References Cited

OTHER PUBLICATIONS

Zhao et al. (2022) "Discovery and engineering of an anti-TREM2 antibody to promote amyloid plaque clearance by microglia in 5XFAD mice" mAbs 14:1, 2107971, DOI: 10.1080/19420862.2022.2107971.

Zhao et al. (2022) "A tetravalent TREM2 agonistic antibody reduced amyloid pathology in a mouse model of Alzheimer's disease" Sci. Transl. Med. 14 (661), eabq0095. DOI: 10.1126/scitranslmed.abq0095.

Zhong et al. (2019), "Soluble TREM2 ameliorates pathological phenotypes by modulating microglial functions in an Alzheimer's disease model" Nature Communications 10(1):1365, DOI: 10.1038/s41467-019-09118-9.

Cignarella et al. (2020) "TREM2 activation on microglia promotes myelin debris clearance and remyelination in a model of multiple sclerosis" Acta Neuropathol. 140(4):513-534. doi: 10.1007/s00401-020-02193-z.

International Search Report (ISR) for International Application No. PCT/US2025/035648 mailed by the KIPO on Oct. 31, 2025, and received by email on Nov. 3, 2025.

\* cited by examiner

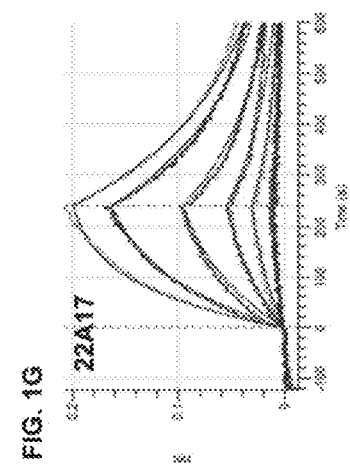
FIG. 1A 02M10
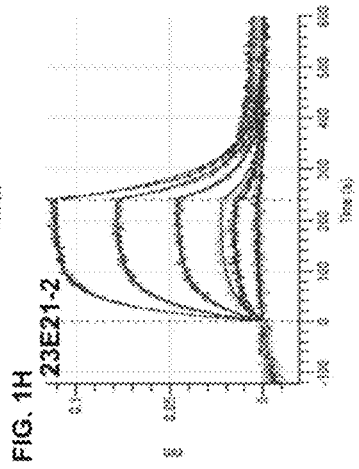
FIG. 1B 03O05
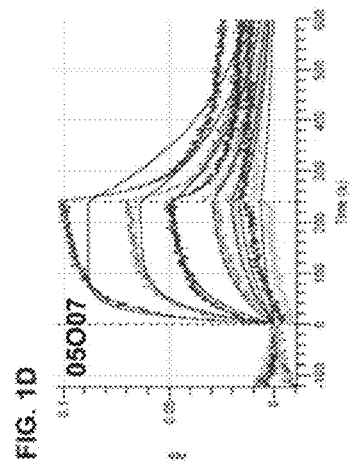
FIG. 1D 05O07
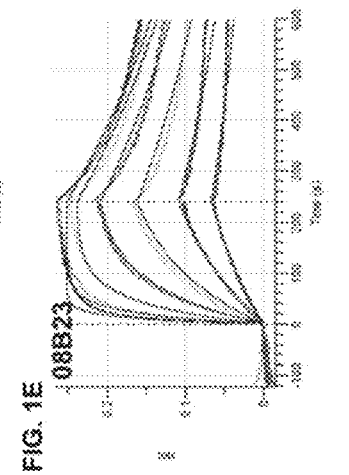
FIG. 1E 08B23
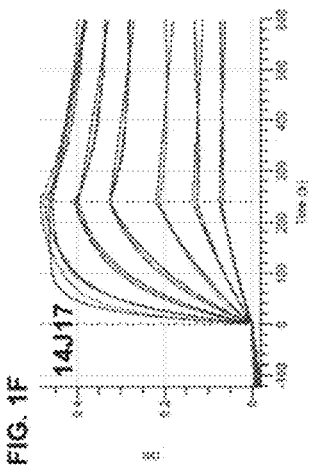
FIG. 1F 14J17
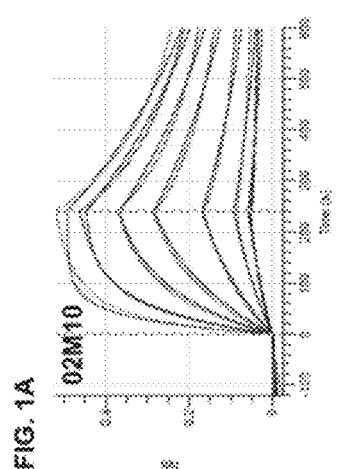
FIG. 1C 04H08
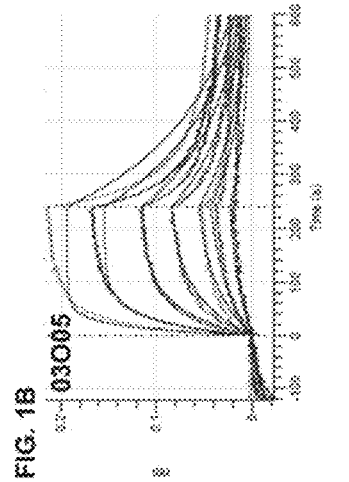
FIG. 1G 22A17
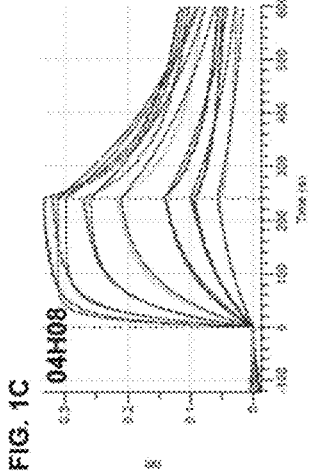
FIG. 1H 23E21-2

| anti-TREM2 | $K_D$ (M) | $k_{on}$ (1/Ms) | $k_{off}$ (1/s) | $R^2$ |
|---|---|---|---|---|
| 02M10 | 7.11E-09 | 3.18E+05 | 2.26E-03 | 0.9957 |
| 03O05 | 1.02E-08 | 5.85E+05 | 5.95E-03 | 0.9612 |
| 04H08 | 4.39E-09 | 7.76E+05 | 3.41E-03 | 0.9844 |
| 05O07 | 1.05E-08 | 5.08E+05 | 5.31E-03 | 0.9468 |
| 08B23 | 1.72E-09 | 9.06E+05 | 1.56E-03 | 0.9919 |
| 14J17 | 1.22E-09 | 4.31E+05 | 5.26E-04 | 0.9954 |
| 22A17 | 3.08E-08 | 1.49E+05 | 4.59E-03 | 0.9951 |
| 23E21-2 | 5.95E-08 | 3.11E+05 | 1.85E-02 | 0.9899 |

FIG. 11

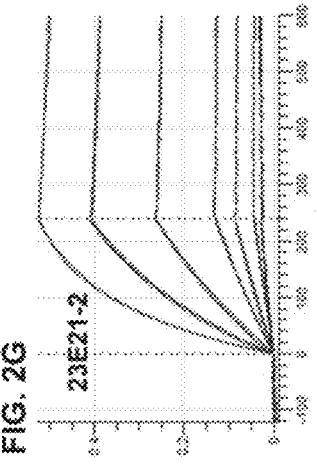
FIG. 2A
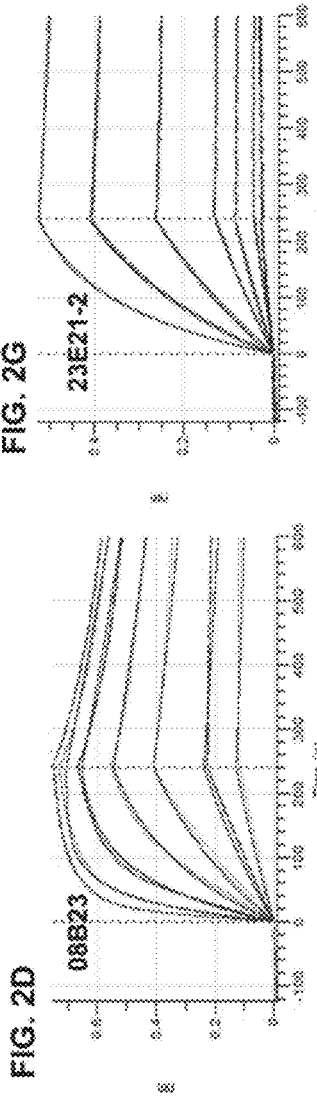
FIG. 2B
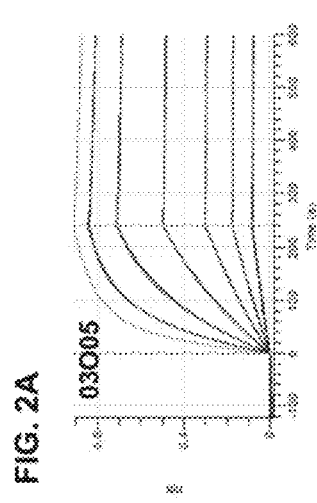
FIG. 2C
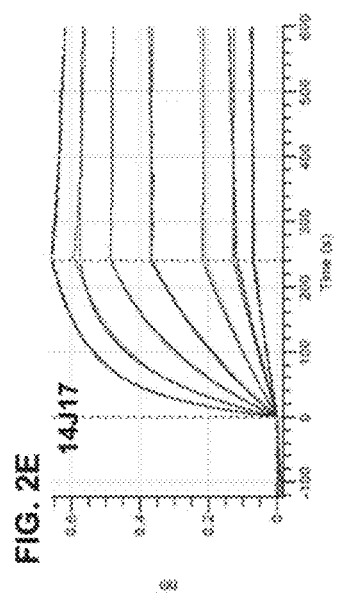
FIG. 2D
FIG. 2E
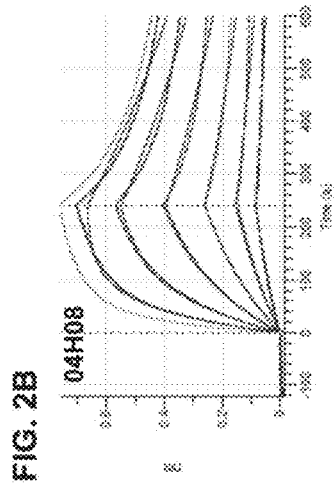
FIG. 2F
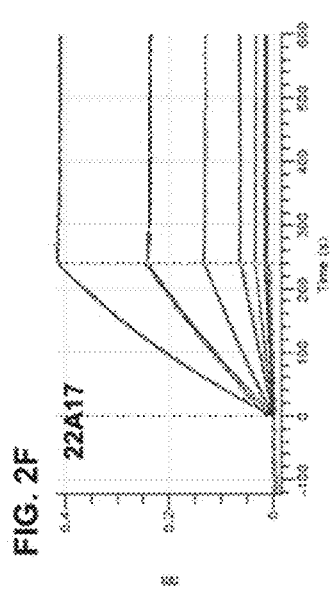
FIG. 2G
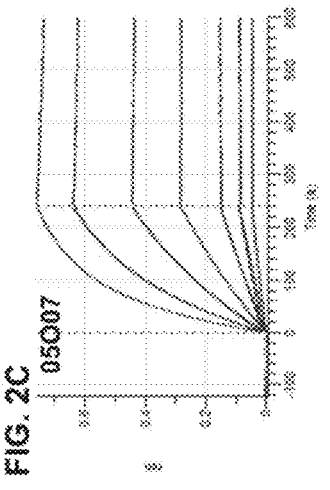

| anti-TREM2 | $K_D$ (M) | $k_{on}$ (1/Ms) | $k_{off}$ (1/s) | $R^2$ |
|---|---|---|---|---|
| 03O05 | 3.29E-10 | 2.85E+05 | 9.40E-05 | 0.9998 |
| 04H08 | 3.62E-09 | 4.07E+05 | 1.47E-03 | 0.9971 |
| 05O07 | 3.91E-10 | 1.49E+05 | 5.84E-05 | 0.9997 |
| 08B23 | 1.13E-09 | 5.61E+05 | 6.34E-04 | 0.9971 |
| 14J17 | 1.23E-10 | 2.64E+05 | 3.25E-05 | 0.9992 |
| 22A17 | 7.38E-10 | 6.00E+04 | 4.43E-05 | 0.9995 |
| 23E21-2 | 6.95E-10 | 1.99E+05 | 1.34E-04 | 0.9996 |

FIG. 2H

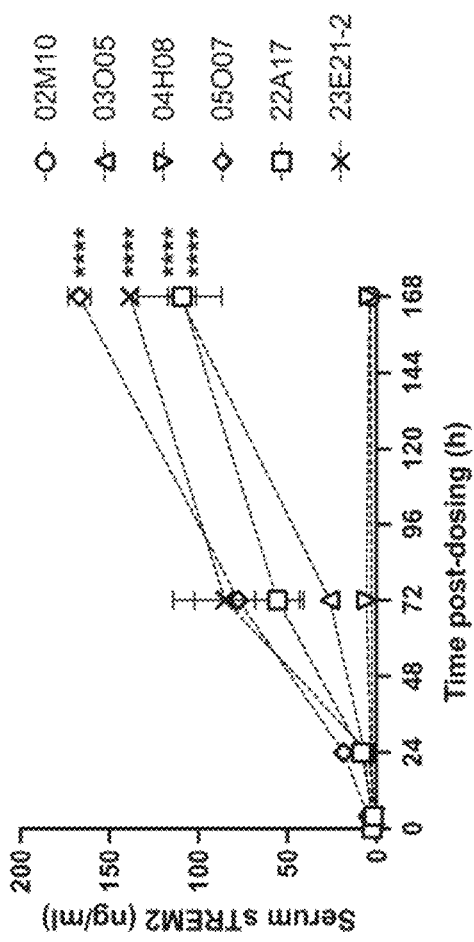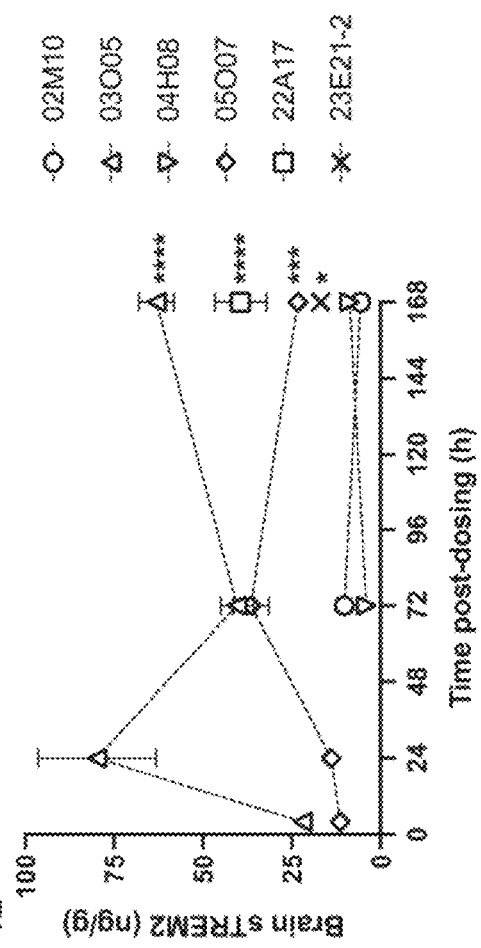
FIG. 4A
FIG. 4B

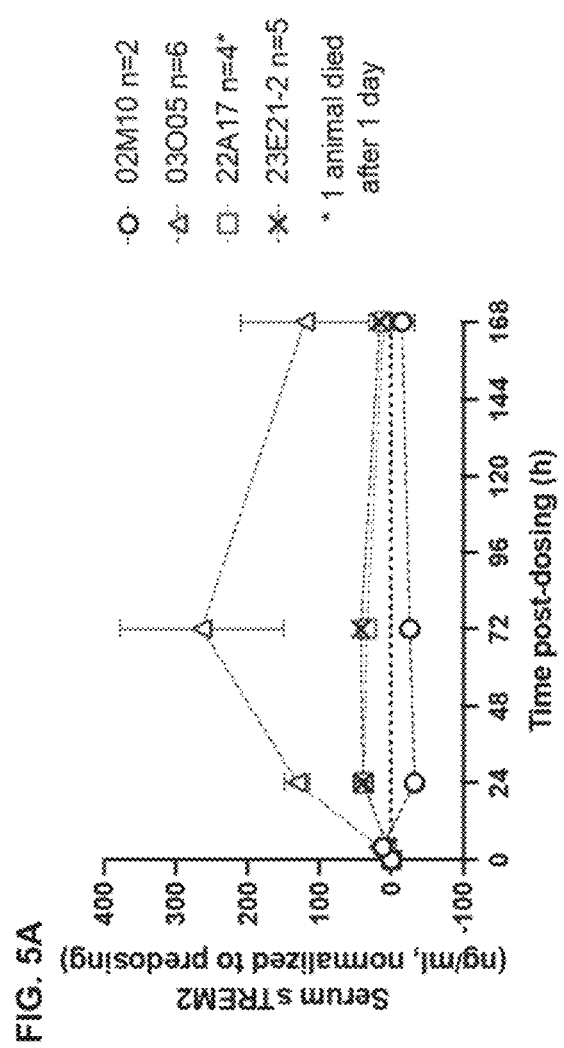
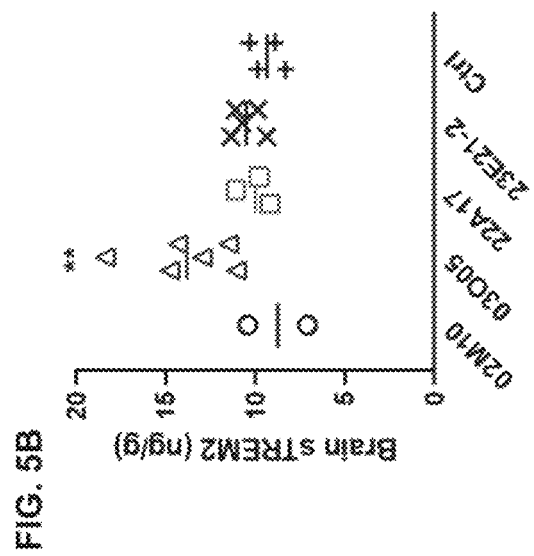

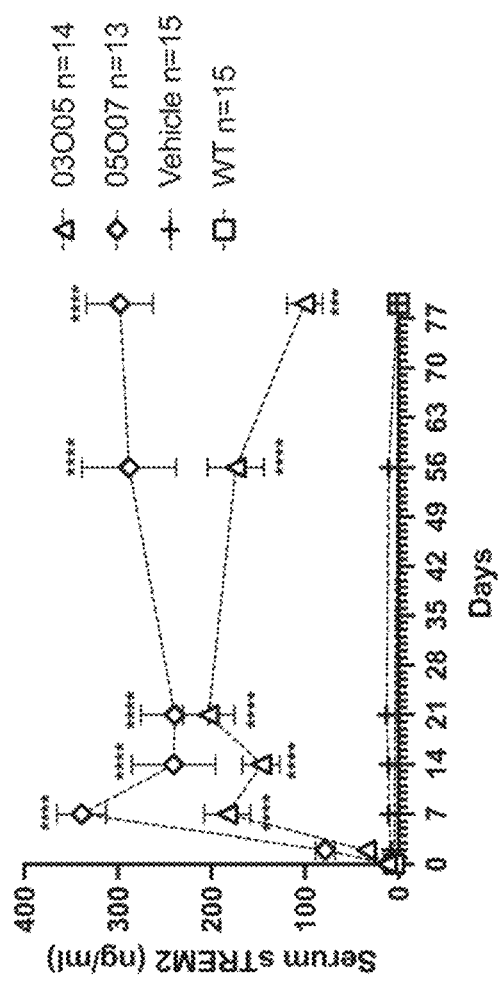
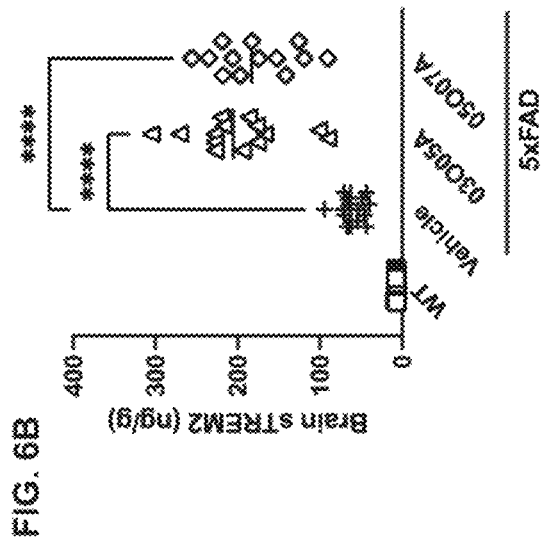
FIG. 6A
FIG. 6B

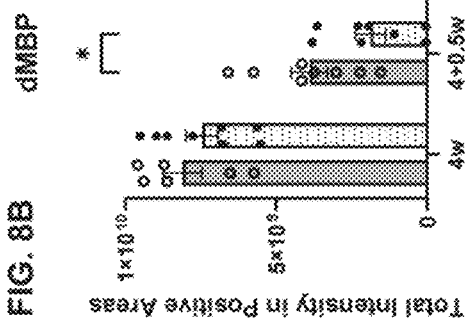
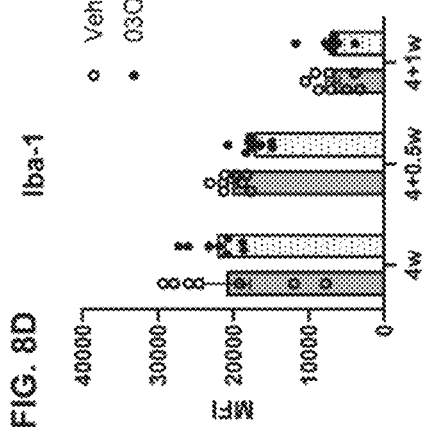
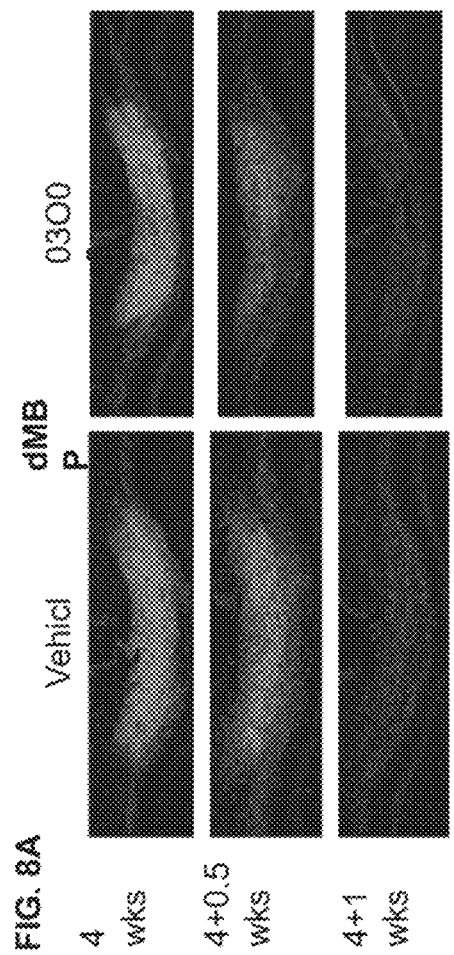
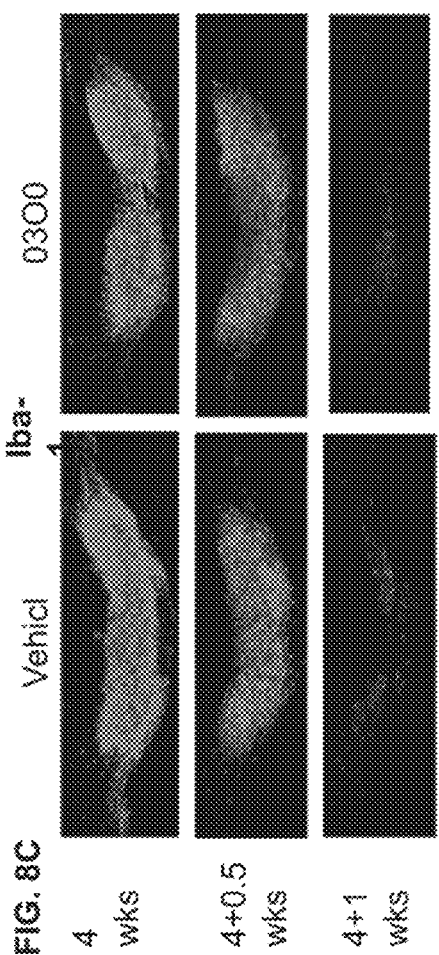
FIG. 8A, FIG. 8B, FIG. 8C, FIG. 8D

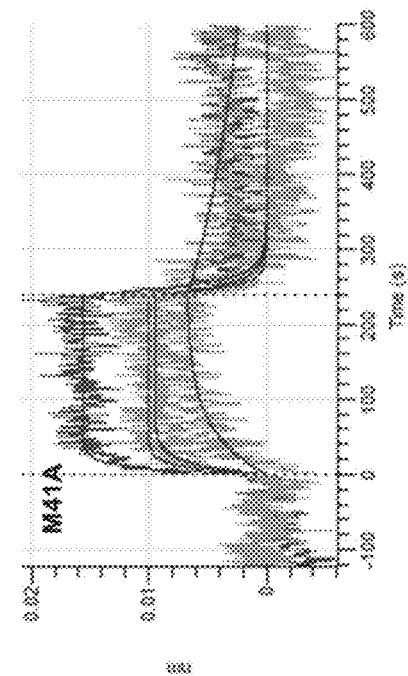
FIG. 9A
FIG. 9B
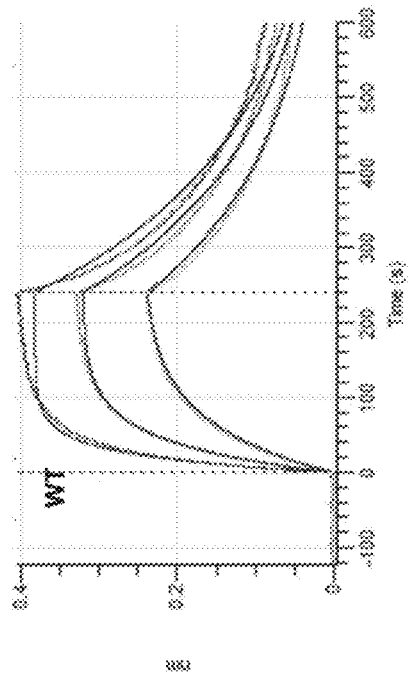
FIG. 9C
FIG. 9D
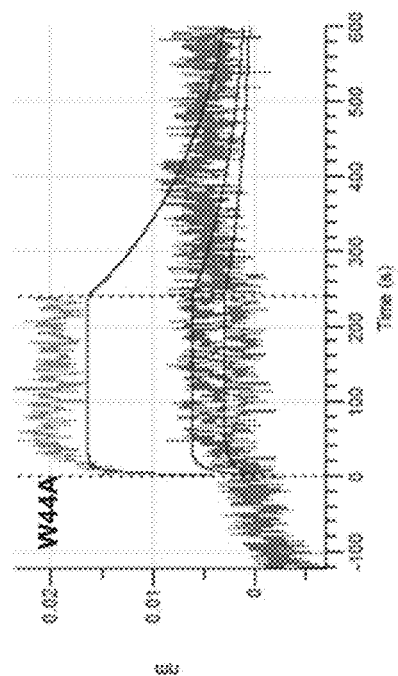
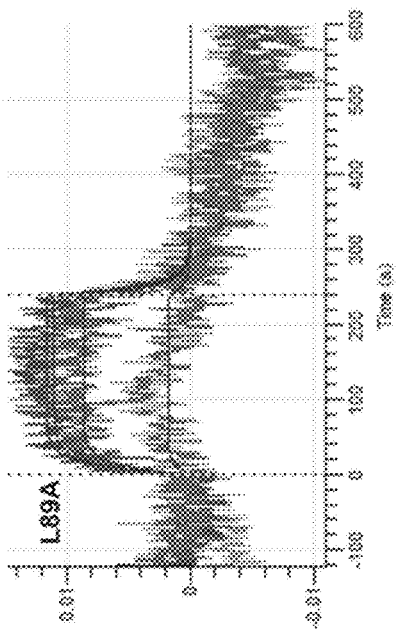

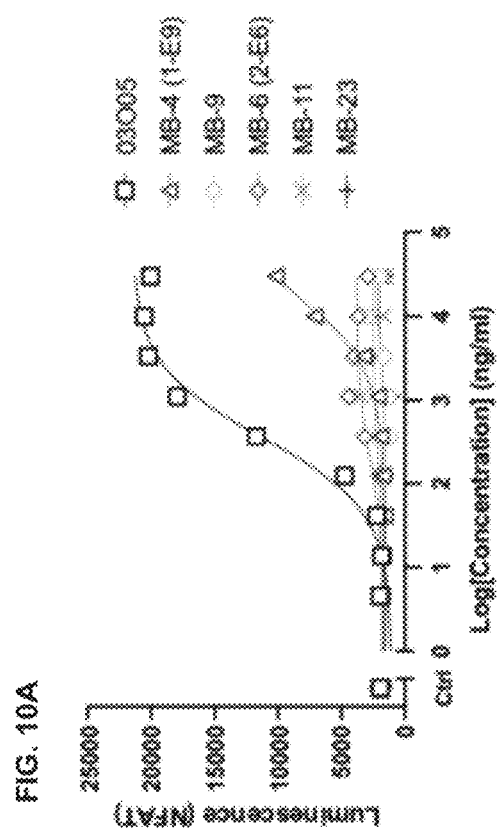 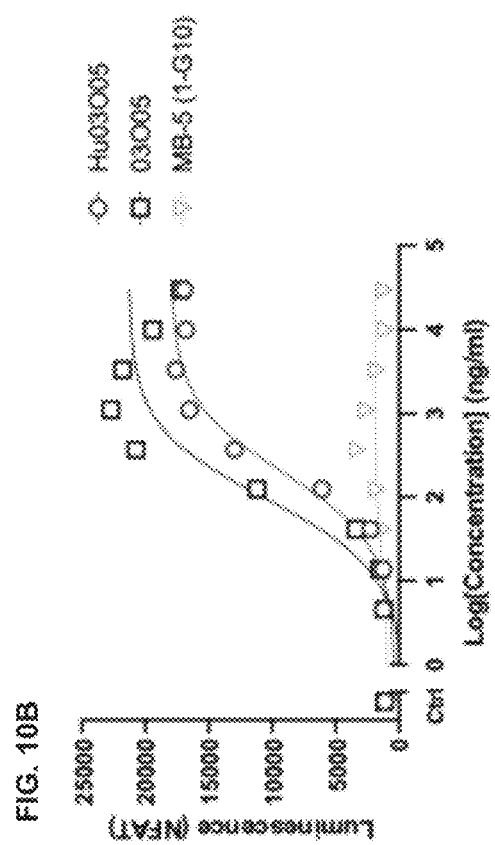

ANTI-TREM2 AGONIST ANTIBODIES AND ANTIGEN-BINDING FRAGMENTS THEREOF THAT CAN INCREASE LEVELS OF SOLUBLE TREM2 IN SERUM AND BRAIN TISSUE

RELATED APPLICATIONS

This application claims benefit of priority to U.S. Provisional Application No. 63/664,985 entitled "ANTI-TREM2 ANTIBODIES AND USES THEREOF" filed Jun. 27, 2024, and U.S. Provisional Application No. 63/813,837 entitled "ANTI-TREM2 ANTIBODIES AND USES THEREOF" filed May 29, 2025, the entire contents of each of which is hereby incorporated by reference in its entirety.

SEQUENCE LISTING

The instant application contains a Sequence Listing which has been submitted electronically in XML format and is hereby incorporated by reference in its entirety. Said XML copy, created on Jun. 20, 2025, is named 1121-104US-_SL.xml and is 141,216 bytes in size.

FIELD OF THE INVENTION

The present disclosure relates to antibodies that bind the extracellular domain of human TREM2 and the use of anti-TREM2 antibodies in therapy, prophylaxis, diagnosis, screening, and monitoring.

BACKGROUND

Triggering receptor expressed on myeloid cells 2 (TREM2) is a member of the immunoglobulin superfamily, and is mainly composed of a V-immunoglobulin extracellular domain, a transmembrane domain of lysine rich residues, and a cytoplasmic tail. TREM2 is mainly expressed in macrophages, dendritic cells (DC), granulocytes and other myeloid cells in the periphery, while in the central nervous system (CNS) it is only expressed in microglia.

The TREM2 extracellular domain can bind to a wide array of molecules, including phospholipids, lipoproteins, bacterial products, nucleic acids, and amyloid beta (AB) peptides, each of which can act as a ligand of TREM2 and is able to activate TREM2 signaling. The cytoplasmic tail of TREM2 lacks a signal motif, and binds the intracellular adapter protein DNAX-activation protein 12 (DAP12) to mediate the activation signal of TREM2. DAP12, also known as TYROBP, is a member of the type I transmembrane adaptor protein family, and is mainly expressed in microglia. When a ligand is bound to TREM2 (i.e., when TREM2 is ligated), DAP12 is tyrosine-phosphorylated within its immunoreceptor tyrosine-based activation motifs (ITAMs) by Src family kinases. This phosphorylation generates a docking site for the Src Homology 2 (SH2) domains of many molecules, initiating a signaling cascade.

TREM2 has been demonstrated to control key microglial functions, such as proliferation, phagocytosis, migration, lipid metabolism and lysosomal degradation. TREM2 coding variants have been identified to significantly increase Alzheimer's disease (AD) risk, Therefore, increased TREM2 function may be beneficial in AD. In demyelinating models to study the role of TREM2 in demyelinating disease(s), TREM2 was shown to be required for myelin debris clearance.

The extracellular domain of TREM2 can be cleaved by α-secretase (e.g., ADAM10, ADAM17) to release soluble TREM2 (sTREM2). Roles proposed for sTREM2 include as a biomarker and as a molecule with functional roles in multiple systems. (Zhong et al. (2019), Nature Communications 10 (1): 1365, DOI: 10.1038/s41467-019-09118-9) CSF biomarker studies indicate that higher sTREM2 levels are associated with slower Alzheimer's disease (AD) progression.

Efforts to develop antibodies that bind the TREM2 extracellular domain, with the goal of modulating TREM2 functions, have yielded varying results. By way of example, some disclosed anti-TREM2 antibodies decrease sTREM2 levels (Wang et al. (2020) J. Exp. Med. 217:9, e20200785; van Lengerich et al. (2023) Nature Neuroscience 26, pp 416-429 DOI: 10.1038/s41593-022-01240-0; Schlepckow et al. (2020) EMBO Mol Med 12: e11227, DOI: 10.15252/emmm.2019112271; WO2019028292; WO2017062672; WO2019055841) some increase sTREM2 levels (WO2017062672; WO2019055841), and some have no effect on sTREM2 levels (Zhao et al. (2022) mAbs 14:1, 2107971, DOI: 10.1080/19420862.2022.2107971; Zhao et al. (2022) Sci. Transl. Med. 14 (661), cabq0095. DOI: 10.1126/scitranslmed.abq0095) under reported assay conditions. Varying biological effects of anti-TREM2 antibodies in experimental systems have been disclosed.

SUMMARY

The present disclosure provides anti-TREM2 antibodies that bind to the extracellular domain (ECD) of TREM2 on the surface of a cell expressing TREM2, and are capable of having an effect on at least one TREM2-mediated or TREM2-related function. Anti-TREM2 antibodies are provided that can bind to the ECD of TREM2 on the surface of a cell expressing TREM2 under in vitro, ex vivo, and in vivo conditions, and are capable of having an effect on at least one TREM2-mediated or TREM2-related function under in vitro, ex vivo, and in vivo conditions.

The present disclosure provides anti-TREM2 antibodies that bind to the ECD of TREM2 and can increase sTREM2 levels. Anti-TREM2 antibodies are provided that bind to the extracellular domain ECD of TREM2 and can increase sTREM2 levels under in vitro, ex vivo, and in vivo conditions. Anti-TREM2 antibodies are provided that can increase the amount of sTREM2 available in vitro, ex vivo, or in vivo. Anti-TREM2 antibodies are provided that bind to the extracellular domain ECD of TREM2, increase sTREM2 levels, and are capable of having an effect on at least one other TREM2-mediated or TREM2-related function. Without wishing to be bound by a particular mechanism of action or hypothesis, it is understood that binding of an anti-TREM2 antibody as provided herein to the ECD of TREM2 triggers cleavage of the ECD, resulting in release of sTREM2 and increased sTREM2 levels.

The present disclosure provides amino acid sequences of variable regions of embodiments of anti-TREM2 antibodies of the invention, identification of the complementarity determining regions (CDRs) involved in binding TREM2 and having effects on TREM2-mediated or TREM2-related functions, nucleotide sequences encoding variable regions of embodiments of anti-TREM2 antibodies of the invention, and methods of identifying, making, and using anti-TREM2 antibodies of the invention.

The present disclosure provides anti-TREM2 antibodies for use in therapy, treatment, prophylaxis, prevention, diagnosis, screening, and monitoring of conditions associated with TREM2-mediated functions, in particular conditions that may benefit from increased sTREM2 levels, more particularly conditions that may benefit from enhanced phagocytosis by microglia and/or macrophages. Anti-TREM2 antibodies are provided for use in methods of therapy, treatment, prophylaxis, prevention, diagnosis, screening, and monitoring of conditions associated with TREM2-mediated functions, for use in compositions for therapy, treatment, prophylaxis, prevention, diagnosis, screening, and monitoring of conditions associated with TREM2-mediated functions, and for use in the manufacture of medicaments for therapy, treatment, prophylaxis, prevention, diagnosis, screening, and monitoring of conditions associated with TREM2-mediated functions. Conditions that may benefit from increased sTREM2 levels, more particularly conditions that may benefit from enhanced phagocytosis by microglia and/or macrophages, may include but are not limited to certain neurodegenerative diseases such as Nasu-Hakola disease, FTD (frontotemporal dementia), PD (Parkinson's disease), ALS (amyotrophic lateral sclerosis), Alzheimer's disease (AD), and MS (multiple sclerosis).

The present disclosure provides anti-TREM2 antibodies that can bind to TREM2 on the surface of a cell expressing TREM2, where it is understood that the anti-TREM2 antibodies bind to the ECD of TREM2 on the surface of a TREM2-expressing cell. Anti-TREM2 antibodies provided here include but are not limited to, anti-TREM2 antibodies that bind only to HuTREM2, cross-reactive antibodies that bind to both HuTREM2 and mouse TREM2 (MoTREM2), and cross-reactive antibodies that bind to HuTREM2 and TREM2 from other organisms including but not limited to cynomolgus monkey. In some embodiments, HuTREM2-specific anti-TREM2 antibodies are provided that bind only to HuTREM2 on the surface of a cell expressing HuTREM2. In some embodiments, HuTREM2 and MoTREM2-cross reactive anti-TREM2 antibodies are provided that can bind to HuTREM2 on the surface of a cell expressing HuTREM2 and can also bind to MoTREM2 on the surface of a cell expressing MoTREM2. Non-limiting embodiments of HuTREM2-specific anti-TREM2 antibodies, and embodiments of HuTREM2 and MoTREM2 cross-reactive anti-TREM2 antibodies, are disclosed in Table 1.

The present disclosure provides anti-TREM2 antibodies wherein administration of the anti-TREM2 antibodies to a mammalian subject can result in increased levels of soluble TREM2 (sTREM2) in serum and/or brain tissue after administration to the subject. In particular, agonist anti-TREM2 antibodies that activate TREM2 are provided wherein administration of the agonist anti-TREM2 antibodies can result in increased levels of sTREM2 in serum and/or brain tissue after administration to the subject. In some embodiments, the present disclosure provides agonist anti-TREM2 antibodies wherein administration to a mouse expressing HuTREM2 (a B-hTREM2 mouse) followed by post-administration measurement of sTREM2 in serum and brain showed increased sTREM2 levels in serum of B-hTREM2 mice, and in certain embodiments also showed significantly increased sTREM2 levels in brain tissue of B-hTREM2 mice expressing HuTREM2. In a non-limiting exemplary embodiment, administration of anti-TREM2 agonist antibody 03O05 to wild-type mice resulted in significantly increased sTREM2 levels in serum and in brain tissue of wild-type mice, and administration of anti-TREM2 agonist antibody 03O05 to mice expressing HuTREM2 (B-hTREM2 mice) resulted in significantly increased sTREM2 levels in serum and in brain tissue of B-hTREM2 mice. In a non-limiting exemplary embodiment, administration of anti-TREM2 agonist antibody 22A17 to wild-type mice resulted in significantly increased sTREM2 levels in serum and in brain tissue of wild-type mice, and administration of anti-TREM2 agonist antibody 22A17 to B-hTREM2 mice resulted in increased sTREM2 levels in serum in B-hTREM2 mice. In a non-limiting exemplary embodiment, administration of anti-TREM2 agonist antibody 23E21-2 to wild-type mice resulted in significantly increased sTREM2 levels in serum and in brain tissue of wild-type mice and administration of anti-TREM2 agonist antibody 23E21-2 to B-hTREM2 mice resulted in increased sTREM2 levels in serum of B-hTREM2 mice. In non-limiting exemplary embodiments, administration of fully human Hu03O05 (comprising human VH/VL sequence from antibody 03O05 and fully human IgG1/λ constant regions), and variants MB-4 (1-E9), MB-5 (1-G10), MB-6 (2-E6), MB-9, MB-11 and MB-23 generated from Hu03O05, to wild-type mice resulted in significantly increased sTREM2 levels in serum and in brain tissue of wild-type mice.

The present disclosure provides anti-TREM2 antibodies that bind to HuTREM2 on the surface of a cell expressing TREM2 and trigger a response mediated by DNAX-activating protein of 12 kDa (DAP12) signaling adapter protein associated with HuTREM2 in lymphoblasts (i.e., have an effect on a TREM2-mediated function), in a dose-dependent manner. In certain embodiments, anti-TREM2 antibodies are provided that show agonistic (stimulating) activity measured as increased TREM2/DAP12 signaling activity over baseline levels, and are identified as agonist anti-TREM2 antibodies that can activate TREM2. In certain embodiments, anti-TREM2 antibodies are provided that show inverse agonistic (inhibiting) activity measured as decreased TREM2/DAP12 signaling activity compared with baseline levels, and are identified as inverse agonist anti-TREM2 antibodies. In certain embodiments, anti-TREM2 antibodies are provided that do not show detectable effects on TREM2/DAP12 signaling activity compared with baseline levels. The Examples provide exemplary embodiments of antibodies that bind to HuTREM2 on the surface of a cell expressing TREM2 and trigger at least one response mediated by TREM2/DAP12 signaling pathway in the cell including, but not limited to: (1) HuTREM2-specific agonist antibody 02M10 with a variable region comprising a heavy chain variable region (VH) having the amino acid sequence of SEQ ID NO: 1 and a light chain variable region (VL) having the amino acid sequence of SEQ ID NO: 6; (2) HuTREM2- and MoTREM2-cross reactive agonist antibody 03O05 with a variable region comprising a VH having the amino acid sequence of SEQ ID NO: 11 and a VL having the amino acid sequence of SEQ ID NO: 16; (3) HuTREM2- and MoTREM2-cross reactive agonist antibody 04H08 with a variable region comprising a VH having the amino acid sequence of SEQ ID NO: 21 and a VL having the amino acid sequence of SEQ ID NO: 26; (4) HuTREM2- and MoTREM2-cross reactive agonist antibody 05O07 with a variable region comprising a VH having the amino acid sequence of SEQ ID NO: 31 and a VL having the amino acid sequence of SEQ ID NO: 36; (5) HuTREM2- and MoTREM2-cross reactive agonist antibody 22A17 with a variable region comprising a VH having the amino acid sequence of SEQ ID NO: 61 and a VL having the amino acid sequence of SEQ ID NO: 66; (6) HuTREM2- and MoTREM2-cross reactive agonist antibody 23E21-2 with a variable region comprising a VH having the amino acid sequence of SEQ ID NO: 71 and a VL having the amino acid sequence of SEQ ID NO: 76; (7) HuTREM2 and MoTREM2-cross reactive inverse agonist antibody 08B23 with a variable region comprising a VH having the amino acid sequence of SEQ ID NO: 41 and a VL having the amino acid sequence of SEQ ID NO: 46; and (8) HuTREM2 and MoTREM2-cross reactive inverse agonist antibody 14J17 with a variable region comprising a VH having the amino acid sequence of SEQ ID NO: 51 and a VL having the amino acid sequence of SEQ ID NO: 56. The Examples provide non-limiting exemplary embodiments of anti-TREM2 antibodies that show weak agonist effect on TREM2/DAP12 signaling activity: a variant MB-4 (1-E9) with a variable region comprising a VH having the amino acid sequence of SEQ ID NO: 111 and a VL having the amino acid sequence of SEQ ID NO: 116 generated from Hu03O05 with a variable region comprising a VH having the amino acid sequence of SEQ ID NO: 11 and a VL having the amino acid sequence of SEQ ID NO: 16. The Examples provide non-limiting exemplary embodiments of anti-TREM2 antibodies that do not show detectable effects on TREM2/DAP12 signaling activity compared with baseline levels, including variant MB-5 (1-G10) with a variable region comprising a VH having the amino acid sequence of SEQ ID NO: 121 and a VL having the amino acid sequence of SEQ ID NO: 126, variant MB-6 (2-E6) with a variable region comprising a VH having the amino acid sequence of SEQ ID NO: 131 and a VL having the amino acid sequence of SEQ ID NO: 136, variant MB-9 with a variable region comprising a VH having the amino acid sequence of SEQ ID NO: 81 and a VL having the amino acid sequence of SEQ ID NO: 86, variant MB-11 with a variable region comprising a VH having the amino acid sequence of SEQ ID NO: 91 and a VL having the amino acid sequence of SEQ ID NO: 96; and variant MB-23 with a variable region comprising a VH having the amino acid sequence of SEQ ID NO: 101 and a VL having the amino acid sequence of SEQ ID NO: 106, where all of these variants are generated from Hu03O05 with a variable region comprising a VH having the amino acid sequence of SEQ ID NO: 11 and a VL having the amino acid sequence of SEQ ID NO: 16.

The present disclosure provides anti-TREM2 antibodies that bind to mappable epitopes on the HuTREM2 ECD and can have an effect on at least one TREM2-mediated or TREM2-related function. In a non-limiting exemplary embodiment, anti-TREM2 antibodies are provided that bind to a discontinuous, conformational epitope comprising at least residues M41-W44 and L89 of HuTREM2 (Example 8, FIG. 9E) that maps to ligand recognition site I, also known as the hydrophobic site, and have at least the effect of increasing sTREM2 levels.

The present disclosure provides embodiments of anti-TREM2 antibodies that bind to the same epitope and have different effects on at least one TREM2-mediated function. In a non-limiting exemplary embodiment, Hu03O05 has the same variable regions as the chimeric antibody 03O05 (i.e., VH SEQ ID NO: 11 and VL SEQ ID NO: 16) that binds to a discontinuous, conformational epitope comprising at least residues M41-W44 and L89 of HuTREM2 (Example 8, FIG. 9E) that maps to ligand recognition site I, also known as the hydrophobic site, and both the chimeric 03O05 and fully human antibody Hu03O05 significantly increased sTREM2 levels in serum and brain tissue (in vivo functionality) and stimulated NFAT-driven luciferase activities in a dose-dependent manner (in vitro functionality). However, certain affinity-matured variants of Hu03O05 with increased affinity with CDR substitutions as shown in Tables 5 and 6 showed the same in vivo functionality of increasing sTREM2 levels in serum and brain tissue, but showed weak or substantially no detectable in vitro functionality in the NFAT-Luciferase reporter assay.

The present disclosure provides anti-TREM2 antibodies that can be detected in brain tissue after administration of anti-TREM2 antibodies to a mammalian subject. The present disclosure provides anti-TREM2 antibodies that have effects on targets in brain tissue. In particular, the amount of anti-TREM2 antibody can be measured in brain tissue, and that measurement can be used to support a calculation of brain penetrance under experimental conditions. In a non-limiting embodiment, antibody 03O05 can be measured in brain tissue after administration, supporting a calculation of 0.17% brain penetrance. In a non-limiting embodiment, antibody 05O07 can be measured in brain tissue after administration, supporting a calculation of 0.22% brain penetrance.

The present disclosure provides anti-TREM2 antibodies wherein administration of the anti-TREM2 antibodies to a mammalian subject that provides a disease model of Alzheimer's disease (AD), can result in at least one effect including but not limited to: increased serum sTREM2; increased brain sTREM2; reduced microglia-mediated inflammation in the brain; increased microglial phagocytosis in the brain; an increased proportion of phagocytic microglia in the brain; and reduced levels of toxic filamentous plaque in the brain.

In non-limiting embodiments using the 5×FAD mouse model of AD wherein 5×FAD mice exhibit an AD phenotype, administration of anti-TREM2 antibody 03O05 or anti-TREM2 antibody 05O07 significantly increased sTREM2 levels in serum and in brain tissue of 5×FAD mice. In a non-limiting exemplary embodiment using the 5×FAD mouse model of AD, administration of anti-TREM2 antibody 03O05 significantly reduced levels of filamentous plaque in brain tissue. In a non-limiting exemplary embodiment using the 5×FAD mouse model of AD, administration of anti-TREM2 antibody 03O05 significantly reduced microglia-mediated inflammation in brain tissue. In a further non-limiting exemplary embodiment, administration of anti-TREM2 antibody 03O05 increased the proportion of phagocytic microglia in the brain, indicating that microglial phagocytosis in the brain has been promoted.

The present disclosure provides agonist anti-TREM2 antibodies capable of reducing microglia-mediated inflammation, promoting microglial phagocytosis, and reducing levels of toxic filamentous plaque in brain tissue when the antibody is administered to a mammalian subject. In one non-limiting exemplary embodiment, administration of anti-TREM2 antibody 03O05 to an animal known or suspected of having a condition associated with Aβ protein aggregation, by treatment of 5×FAD mice with anti-TREM2 antibody 03O05, reduced microglia-mediated inflammation, promoted microglial phagocytosis, and reduced levels of toxic filamentous plaque in the brain.

The present disclosure provides anti-TREM2 antibodies wherein the anti-TREM2 antibodies can trigger at least one effect on myelin phagocytosis in macrophages. In a non-limiting exemplary embodiment, macrophages exposed to anti-TREM2 antibody 23E21-2 showed significantly increased myelin phagocytosis. In a non-limiting exemplary embodiment, macrophages exposed to anti-TREM2 antibody 03O05 showed increased myelin phagocytosis.

The present disclosure provides anti-TREM2 antibodies wherein administration of the anti-TREM2 antibodies to a mammalian subject that provides a disease model of multiple sclerosis (MS), can result in at least one effect including but not limited to: increased serum sTREM2; increased brain sTREM2; increased myelin debris clearance demonstrated by decreased levels of degraded myelin basic protein (dMBP) during a window of time between demyelination and remyelination in an inducible MS model, indicating microglial phagocytosis of myelin debris; and facilitation of myelin repair. In a non-limiting exemplary embodiment, administration of antibody 03O05 to wild-type mice fed with cuprizone to cause demyelination in the corpus callosum followed by removal of cuprizone from the diet to allow remyelination over a defined time course, resulted in decreased levels of degraded myelin basic protein (dMBP) during a window of time between demyelination and remyelination in an inducible MS model.

An anti-TREM2 antibody as provided here can be at least one of: a monoclonal antibody; a recombinantly expressed antibody; a chimeric antibody; a humanized antibody; a fully human antibody; a recombinant antibody; a synthetic antibody; a full-length antibody; and an antibody fragment.

The present disclosure provides anti-TREM2 antibodies of isotypes including but not limited to IgG2a, IgG2b, or IgG1 heavy chain, and Kappa (κ) or Lambda (λ) light chain. While the present disclosure provides anti-TREM2 antibodies that are originally produced with a fully human variable region (VH/VL) and a mouse constant region, suitable antibodies can be produced with constant regions based on other species or with non-naturally occurring constant regions. Non-limiting exemplary embodiments of chimeric monoclonal anti-TREM2 antibodies with a human variable region (human VH/VL) and mouse constant region are disclosed in the Examples, and Table 1 discloses the amino acid sequence of the (human) variable regions of these antibodies. The Examples provide exemplary embodiments of recombinantly expressed chimeric anti-TREM2 antibodies with a human VH/VL and mouse constant region. The Examples further provide exemplary embodiments of recombinantly expressed fully human anti-TREM2 antibodies with a human VH/VL and human constant regions. In a preferred embodiment, Hu03O05 is provided with the 03O05 VH/VL and fully human IgG1/λ constant regions, i.e., human VL/VH from 03O05 antibody and human constant regions including human CL/CH1 and Fc. Anti-TREM2 antibodies of the invention can be produced with heavy chain constant regions that may be derived from IgG, or from another one of five major classes of antibodies, viz., IgA, IgD, IgE, IgG, and IgM, and may be further divided into subclasses (isotypes), e.g., IgG1, IgG2, IgG3, IgG4, IgA1, and IgA2. Exemplary embodiments include but are not limited to a human IgG1 Fc, or a mouse IgG Fc that may be mouse IgG1 Fc or mouse IgG2a Fc or mouse IgG2b Fc. Exemplary embodiments include recombinantly expressed anti-TREM2 antibodies with kappa or lambda light chain.

The present disclosure provides pharmaceutical compositions containing at least one anti-TREM2 antibody as disclosed herein, and a pharmaceutically acceptable carrier or excipient. In particular, the present disclosure provides pharmaceutical compositions containing at least one agonist anti-TREM2 antibody that triggers TREM2 activation as disclosed herein, and a pharmaceutically acceptable carrier or excipient.

The present disclosure provides methods of triggering an increase in sTREM2 in serum and/or brain of a subject, by administration of a therapeutically effective amount of at least one anti-TREM2 antibody sufficient to trigger an increase in sTREM2 in serum and/or brain of the subject. In particular, methods are provided of triggering an increase in sTREM2 in serum and/or brain of a subject by administration of a therapeutically effective amount of at least one agonist anti-TREM2 antibody that triggers TREM2 activation.

The present disclosure provides methods to increase microglial phagocytosis in brain tissue by administration of a therapeutically effective amount of at least one anti-TREM2 antibody, with effects that may include but are not limited to phagocytosis of Aβ in an AD model, which is known to be critical for amyloid plaque clearance. In particular, methods are provided to increase microglial phagocytosis in brain tissue by administration of a therapeutically effective amount of at least one agonist anti-TREM2 antibody that triggers TREM2 activation.

The present disclosure provides methods to increase myelin phagocytosis by macrophages by administration of a therapeutically effective amount of at least one anti-TREM2 antibody. Without wishing to be bound by a particular mechanism of action or hypothesis, phagocytosis of myelin debris is presumed to be necessary for myelin repair in MS.

The present disclosure provides a method wherein administration of a therapeutically effective amount of at least one anti-TREM2 antibody that triggers TREM2 activation has at least one effect in the brain selected from: suppressed microglia-mediated inflammation in the brain; increased microglial phagocytosis in the brain; an increased proportion of phagocytic microglia in the brain; and reduced levels of toxic filamentous plaque in the brain.

In particular embodiments, present disclosure provides isolated anti-TREM2 antibodies that bind the ECD of TREM2 on a cell expressing TREM2, where administration of the antibody to a mammalian subject can increase the level of soluble TREM2 (sTREM2) in serum and brain tissue in the subject after administration, where the antibody has a heavy chain variable region (VH) that includes a heavy chain (HC) complementarity region (CDR) 1, an HC CDR2, an HC CDR3, and a light chain variable region (VL) that includes a light chain (LC) CDR1, an LC CDR2, and an LC CDR3.

In particular non-limiting embodiments, the present disclosure provides isolated anti-TREM2 antibodies that bind the ECD of TREM2 on a cell expressing TREM2, wherein binding of the antibody to TREM2 can increase the level of soluble TREM2 (sTREM2) in serum and brain tissue in the subject after administration to a mammalian subject, and the antibody binds to a discontinuous conformational epitope comprising at least residues M41-W44 and L89 of human TREM2, where the antibody has a heavy chain variable region (VH) that includes a heavy chain (HC) complementarity determining region (CDR) 1 having the amino acid sequence GYTFTDYF (SEQ ID NO: 12) or a sequence at least about 65% identical thereto, an HC CDR2 having the amino sequence FNPNSGGS (SEQ ID NO: 13) or a sequence at least about 65% identical thereto, and an HC CDR3 having the amino acid sequence ARNGEVPFDN (SEQ ID NO: 14) or a sequence at least about 65% identical thereto, and a light chain variable region (VL) that includes a light chain (LC) CDR1 having the amino acid sequence SSNIGNNF (SEQ ID NO: 17) or a sequence at least about 65% identical thereto, an LC CDR2 having the amino acid sequence DIN or a sequence at least about 65% identical thereto, and an LC CDR3 having the amino acid sequence GTWDISLSAGV (SEQ ID NO: 19) or a sequence at least about 65% identical thereto. In a preferred embodiment, an antibody with the CDRs of antibody 03O05 is provided with an HC CDR1 having the amino acid sequence GYTFTDYF (SEQ ID NO: 12), an HC CDR2 having the amino sequence FNPNSGGS (SEQ ID NO: 13), an HC CDR3 having the amino acid sequence ARNGEVPFDN (SEQ ID NO: 14), an LC CDR1 having the amino acid sequence SSNIGNNF (SEQ ID NO: 17), an LC CDR2 having the amino acid sequence DIN, and an LC CDR3 having the amino acid sequence GTWDISLSAGV (SEQ ID NO: 19). In another embodiment, an antibody with the CDRs of antibody MB-9 is provided with an HC CDR1 having the amino acid sequence GYNFTDYF (SEQ ID NO: 82), an HC CDR2 having the amino sequence FNPYSGAS (SEQ ID NO: 83), an HC CDR3 having the amino acid sequence ARSGEVPFDN (SEQ ID NO: 84), an LC CDR1 having the amino acid sequence SSNIGNNF (SEQ ID NO: 87), an LC CDR2 having the amino acid sequence DIN, and an LC CDR3 having the amino acid sequence GTWDISLSAAV (SEQ ID NO: 89). In another embodiment, an antibody with the CDRs of antibody MB-11 is provided with an HC CDR1 having the amino acid sequence GYNFTDYF (SEQ ID NO: 92), an HC CDR2 having the amino sequence FNPYSGAS (SEQ ID NO: 93), an HC CDR3 having the amino acid sequence ARNGEVPFDN (SEQ ID NO: 94), an LC CDR1 having the amino acid sequence SSNVGNNF (SEQ ID NO: 97), an LC CDR2 having the amino acid sequence GIN, and an LC CDR3 having the amino acid sequence GTWDISLSAAV (SEQ ID NO: 99). In another embodiment, an antibody with the CDRs of antibody MB-23 is provided having an HC CDR1 having the amino acid sequence GYTFTDYF (SEQ ID NO: 102), an HC CDR2 having the amino sequence FNPYSGES (SEQ ID NO: 103), an HC CDR3 having the amino acid sequence ARNGEVPFDN (SEQ ID NO: 104), an LC CDR1 having the amino acid sequence SSNIGNSF (SEQ ID NO: 107), an LC CDR2 having the amino acid sequence DIN, and an LC CDR3 having the amino acid sequence GTWDISLSAAV (SEQ ID NO: 109). In another embodiment, an antibody with the CDRs of antibody MB-4 (1-E9) is provided with an HC CDR1 having the amino acid sequence GYNFTDYF (SEQ ID NO: 112), an HC CDR2 having the amino sequence FNPYSGES (SEQ ID NO: 113), an HC CDR3 having the amino acid sequence ARNGEVPFDN (SEQ ID NO: 114), an LC CDR1 having the amino acid sequence SSNIANNF (SEQ ID NO: 117), an LC CDR2 having the amino acid sequence DNN, and an LC CDR3 having the amino acid sequence GTWDISLSAAV (SEQ ID NO: 119). In another embodiment, an antibody with the CDRs of antibody MB-5 (1-G10) is provided with an HC CDR1 having the amino acid sequence GYTFTDYF (SEQ ID NO: 122), an HC CDR2 having the amino sequence FDPNSGAS (SEQ ID NO: 123), an HC CDR3 having the amino acid sequence ARNGEVPFDN (SEQ ID NO: 124), an LC CDR1 having the amino acid sequence SSNIGNSF (SEQ ID NO: 127), an LC CDR2 having the amino acid sequence DNN, and an LC CDR3 having the amino acid sequence GSWDISLSAGV (SEQ ID NO: 129). In another embodiment, an antibody with the CDRs of antibody MB-6 (2-E6) is provided with an HC CDR1 having the amino acid sequence GYTFTDYY (SEQ ID NO: 132), an HC CDR2 having the amino sequence FNPYSGGS (SEQ ID NO: 133), and an HC CDR3 having the amino acid sequence ARSGEVPFDN (SEQ ID NO: 134), an LC CDR1 having the amino acid sequence SSNIGNNF (SEQ ID NO: 137), an LC CDR2 having the amino acid sequence GIN, and an LC CDR3 having the amino acid sequence GTWDISLSAYV (SEQ ID NO: 139).

In another embodiment, the present disclosure provides an anti-TREM2 antibody with the CDRs of antibody 05O07 that binds the ECD of TREM2 on a cell expressing TREM2, where the antibody can increase the level of soluble TREM2 (sTREM2) in serum and brain tissue in the subject after administration to a mammalian subject, with an HC CDR1 having the amino acid sequence GYTFTGYY (SEQ ID NO: 32), an HC CDR2 having the amino acid sequence FNPNSGGT (SEQ ID NO: 33), an HC CDR3 having the amino acid sequence ARTGVIPFDY (SEQ ID NO: 34), an LC CDR1 having the amino acid sequence SSNIGNDY (SEQ ID NO: 37), an LC CDR2 having the amino acid sequence DNN, and an LC CDR3 having the amino acid sequence GTWDSSLSAVV (SEQ ID NO: 39).

In another embodiment, the present disclosure provides an anti-TREM2 antibody with the CDRs of antibody 22A17 that binds the ECD of TREM2 on a cell expressing TREM2, where the antibody can increase the level of soluble TREM2 (sTREM2) in serum and brain tissue in the subject after administration to a mammalian subject, with an HC CDR1 having the amino acid sequence GYTFTGYY (SEQ ID NO: 62), an HC CDR2 having the amino acid sequence ISPHSGGT (SEQ ID NO: 63), an HC CDR3 having the amino acid sequence ARSGRVAFDI (SEQ ID NO: 64), an LC CDR1 having the amino acid sequence SSNIGNDY (SEQ ID NO: 67), an LC CDR2 having the amino acid sequence DNN, and an LC CDR3 having the amino acid sequence GTWDTSLSAVV (SEQ ID NO: 69).

In another embodiment, the present disclosure provides an anti-TREM2 antibody with the CDRs of antibody 23E21-2 that binds the ECD of TREM2 on a cell expressing TREM2, where the antibody can increase the level of soluble TREM2 (sTREM2) in serum and brain tissue in the subject after administration to a mammalian subject, with an HC CDR1 having the amino acid sequence GYTFTGYY (SEQ ID NO: 72), an HC CDR2 having the amino acid sequence FDPNSGGA (SEQ ID NO: 73), an HC CDR3 having the amino acid sequence ARSGSFPFDY (SEQ ID NO: 74), an LC CDR1 having the amino acid sequence SSNIGNDY (SEQ ID NO: 77), an LC CDR2 having the amino acid sequence DNN, and an LC CDR3 having the amino acid sequence GTWDSSLSAVV (SEQ ID NO: 79).

In particular non-limiting preferred embodiments, the present disclosure provides anti-TREM2 that are cross-reactive antibodies that bind the ECD of human TREM2 (HuTREM2) on a cell expressing HuTREM2 and the ECD of mouse TREM2 (MoTREM2) on a cell expressing MoTREM2. In particular non-limiting preferred embodiments, the antibody can be at least one of a chimeric antibody, a humanized antibody, a fully human antibody, a recombinant antibody, a synthetic antibody, a full-length antibody, and/or an antibody fragment.

In non-limiting embodiments the present disclosure provides anti-TREM2 antibodies that can increase phagocytosis by microglia and/or macrophages. In non-limiting embodiments, the present disclosure provides anti-TREM2 antibodies that can increase microglial phagocytosis in the brain of the subject after administration. In non-limiting embodiments, the present disclosure provides anti-TREM2 antibodies that can reduce microglia-mediated inflammation in the brain of the mammalian subject after administration. In non-limiting embodiments, the present disclosure provides anti-TREM2 antibodies that can reduce levels of toxic filamentous plaque in the brain after administration. In non-limiting preferred embodiments, the present disclosure provides anti-TREM2 antibodies that can increase myelin debris clearance in the brain after administration. In a particularly preferred embodiment, the anti-TREM2 antibody that can increase phagocytosis of degraded myelin basic protein (dMBP) after administration.

In non-limiting embodiments the present disclosure provides anti-TREM2 antibodies wherein binding of the anti- TREM2 antibody triggers a response mediated by a DNAX-activating protein of 12 kDa (DAP12) signaling adapter protein associated with HuTREM2, in a dose-dependent manner. In a preferred embodiment, the anti-TREM2 antibody is an agonist antibody that triggers increased TREM2/DAP12 signaling activity.

In non-limiting embodiments the present disclosure provides anti-TREM2 antibodies wherein the antibody is selected from an anti-TREM2 antibody having the variable region sequence of antibody 03O05 comprising a VH having the amino acid sequence of SEQ ID NO: 11 and a VL having the amino acid sequence of SEQ ID NO: 16, an anti-TREM2 antibody having the variable region sequence of antibody 05O07 comprising a VH having the amino acid sequence of SEQ ID NO: 31 and a VL having the amino acid sequence of SEQ ID NO: 36, an anti-TREM2 antibody having the variable region sequence of antibody 22A17 comprising a VH having the amino acid sequence of SEQ ID NO: 61 and a VL having the amino acid sequence of SEQ ID NO: 66, and an anti-TREM2 antibody having the variable region sequence of antibody 23E21-1/-2 comprising a VH having the amino acid sequence of SEQ ID NO: 71 and a VL having the amino acid sequence of SEQ ID NO: 76; an anti-TREM2 antibody having the variable region sequence of antibody MB-9 comprising a VH having the amino acid sequence of SEQ ID NO: 81 and a VL having the amino acid sequence of SEQ ID NO: 86; an anti-TREM2 antibody having the variable region sequence of antibody MB-11 comprising a VH having the amino acid sequence of SEQ ID NO: 91 and a VL having the amino acid sequence of SEQ ID NO: 96; an anti-TREM2 antibody having the variable region sequence of antibody MB-23 comprising a VH having the amino acid sequence of SEQ ID NO: 101 and a VL having the amino acid sequence of SEQ ID NO: 106; an anti-TREM2 antibody having the variable region sequence of antibody MB-4 (1-E9) comprising a VH having the amino acid sequence of SEQ ID NO: 111 and a VL having the amino acid sequence of SEQ ID NO: 116; an anti-TREM2 antibody having the variable region sequence of antibody MB-5 (1-G10) comprising a VH having the amino acid sequence of SEQ ID NO: 121 and a VL having the amino acid sequence of SEQ ID NO: 126; and an anti-TREM2 antibody having the variable region sequence of antibody MB-6 (2-E6) comprising a VH having the amino acid sequence of SEQ ID NO: 131 and a VL having the amino acid sequence of SEQ ID NO: 136.

In non-limiting embodiments, the present disclosure provides a method of increasing sTREM in serum and brain tissue in a mammalian subject by administering a therapeutically effective amount of an anti-TREM2 antibody to the subject.

In non-limiting embodiments, the present disclosure provides a method of reducing microglia-mediated inflammation in the brain of a mammalian subject by administering a therapeutically effective amount of an anti-TREM2 antibody to the subject.

In non-limiting embodiments, the present disclosure provides a method of increasing microglial phagocytosis in the brain of a mammalian subject by administering a therapeutically effective amount of an anti-TREM2 antibody to the subject.

In non-limiting embodiments, the present disclosure provides a method of reducing levels of toxic filamentous plaque in the brain of a mammalian subject by administering a therapeutically effective amount of an anti-TREM2 antibody to the subject.

In non-limiting embodiments, the present disclosure provides a method of increasing myelin debris clearance in a mammalian subject by administering a therapeutically effective amount of an anti-TREM2 antibody to the subject. In a preferred embodiment, the therapeutically effective amount is sufficient to increase microglial phagocytosis of degraded myelin basic protein (dBMP) in the brain.

In non-limiting embodiments, the present disclosure provides a method of facilitating myelin repair by administering a therapeutically effective amount of an anti-TREM2 antibody to the subject.

In non-limiting embodiments, the present disclosure provides a method of treating Alzheimer's disease (AD) in a subject in need thereof, by administering a therapeutically effective amount of an anti-TREM2 antibody sufficient to trigger at least one effect selected from increased serum sTREM2; increased brain sTREM2, reduced microglia-mediated inflammation in the brain, increased microglial phagocytosis in the brain, an increased proportion of phagocytic microglia in the brain, and reduced levels of toxic filamentous plaque in the brain.

In non-limiting embodiments, the present disclosure provides a method of treating multiple sclerosis (MS) in a subject in need thereof, by administering a therapeutically effective amount of an anti-TREM2 antibody sufficient to trigger at least one effect selected from increased serum sTREM2, increased brain sTREM2, increased microglial phagocytosis in the brain, an increased proportion of phagocytic microglia in the brain, increased myelin debris clearance, and increased myelin repair.

In non-limiting embodiments, the present disclosure provides a method of treating a condition associated with TREM2 mediated functions wherein the condition may benefit from enhanced microglial phagocytosis, by administering a therapeutically effective amount of an anti-TREM2 antibody sufficient to trigger at least one effect selected from increasing serum sTREM2; increasing brain sTREM2, reducing microglia-mediated inflammation in the brain, increasing microglial phagocytosis in the brain, an increased proportion of phagocytic microglia in the brain, reducing levels of toxic filamentous plaque in the brain, increasing myelin debris clearance, and facilitating increased myelin repair.

BRIEF DESCRIPTION OF THE FIGURES

FIGS. 1A-1I show results of determinations of anti-TREM2 antibody affinity and binding kinetics for HuTREM2-IgG1Fc (SEQ ID NO: 141) by Bio-Layer Interferometry (BLI) technology using the OCTET® RED96e system, with analyte concentrations of 100 nM (top trace), 50 nM (second trace from top), 25 nM (third trace from top), 12.5 nM (fourth trace from top), 6.25 nM (fifth trace from top), 3.13 nM (sixth trace from top) and 1.56 nM (seventh trace from top), with an accompanying smoothed line showing the line fitted to each trace according to a monovalent (1:1) binding model. FIG. 1A shows binding kinetics of anti-TREM2 antibody 02M10 towards HuTREM2-IgG1Fc. FIG. 1B shows binding kinetics of anti-TREM2 antibody 03O05 towards HuTREM2-IgG1Fc. FIG. 1C shows binding kinetics of anti-TREM2 antibody 04H08 towards HuTREM2-IgG1Fc. FIG. 1D shows binding kinetics of anti-TREM2 antibody 05O07 towards HuTREM2-IgG1Fc. FIG. 1E shows binding kinetics of anti-TREM2 antibody 08B23 towards HuTREM2-IgG1Fc. FIG. 1F shows binding kinetics of anti-TREM2 antibody 14J17 towards HuTREM2-IgG1Fc. FIG. 1G shows binding kinetics of anti-TREM2 antibody 22A17 towards HuTREM2-IgG1Fc. FIG. 1H shows binding kinetics of anti-TREM2 antibody 23E21-2 towards HuTREM2-IgG1Fc. FIG. 1I shows calculated affinity measurements of all anti-TREM2 antibodies tested here, based on fitted lines generated using a monovalent (1:1) binding model.

FIGS. 2A-2H show results of determinations of anti-TREM2 antibody affinity and binding kinetics for MoTREM2-IgG1Fc (SEQ ID NO: 142) by BLI using the OCTET® RED96c with analyte concentrations of 100 nM (top trace), 50 nM (second trace from top), 25 nM (third trace from top), 12.5 nM (fourth trace from top), 6.25 nM (fifth trace from top), 3.13 nM (sixth trace from top) and 1.56 nM (seventh trace from top), with an accompanying smoothed line showing the line fitted to each trace according to a monovalent (1:1) binding model. FIG. 1A shows binding kinetics of anti-TREM2 antibody 03O05 towards MoTREM2-IgG1Fc. FIG. 1B shows binding kinetics of anti-TREM2 antibody 04H08 towards MoTREM2-IgG1Fc. FIG. 1C shows binding kinetics of anti-TREM2 antibody 05O07 towards MoTREM2-IgG1Fc. FIG. 1D shows binding kinetics of anti-TREM2 antibody 08B23 towards MoTREM2-IgG1Fc. FIG. 1E shows binding kinetics of anti-TREM2 antibody 14J17 towards MoTREM2-IgG1Fc. FIG. 1F shows binding kinetics of anti-TREM2 antibody 22A17 towards MoTREM2-IgG1Fc. FIG. 1G shows binding kinetics of anti-TREM2 antibody 23E21-2 towards MoTREM2-IgG1Fc. FIG. 1H shows calculated affinity measurements of all anti-TREM2 antibodies tested here, based on fitted lines generated using a monovalent (1:1) binding model.

In FIG. 3A, open circles represent results using anti-TREM2 antibody 02M10, open upward-pointing triangles represent results using anti-TREM2 antibody 03O05, open downward-pointing triangles represent results using anti-TREM2 antibody 04H08, open diamonds represent results using anti-TREM2 antibody 05O07, open squares represent results using anti-TREM2 antibody 22A17 and 'X's represent results using anti-TREM2 antibody 23E21-2. In FIG. 3B, open circles represent results using anti-TREM2 antibody 08B23, and open upward-pointing triangles represent results using anti-TREM2 antibody 14J17.

FIGS. 4A-4B show effects of anti-TREM2 antibodies on soluble TREM2 (sTREM2) levels in wild-type B6SJLF1 mice, showing serum sTREM2 (FIG. 4A) and brain sTREM2 (FIG. 4B) measured in B6SJLF1 mice dosed i.p. at 10 mg/kg. In FIGS. 4A and 4B, open circles represent results using anti-TREM2 antibody 02M10, open upward-pointing triangles represent results using anti-TREM2 antibody 03O05, open downward-pointing triangles represent results using anti-TREM2 antibody 04H08, open diamonds represent results using anti-TREM2 antibody 05O07, open squares represent results using anti-TREM2 antibody 22A17 and 'X's represent results using anti-TREM2 antibody 23E21-2. **$P<0.0001$, *$P<0.001$, *$P<0.05$, using one-way ANOVA with Dunnett's multiple comparison adjustment.

FIGS. 5A-5B shows effects of anti-TREM2 antibodies on serum sTREM2 (FIG. 5A) and brain sTREM2 at day 7 (FIG. 5B) in B-HuTREM2 mice dosed i.p. at 30 mg/kg. In FIGS. 5A and 5B, open circles represent results using anti-TREM2 antibody 02M10, open upward-pointing triangles represent results using anti-TREM2 antibody 03O05, open squares represent results using anti-TREM2 antibody 22A17, 'X's represent results using anti-TREM2 antibody 23E21-2 and '+'s represent control results without antibody treatment. **$P<0.01$, using one-way ANOVA with Dunnett's multiple comparison adjustment.

FIGS. 6A-6J show long term efficacy of anti-TREM2 antibodies using 5×FAD mice. FIGS. 6A-6B show effects of anti-TREM2 antibodies on serum sTREM2 (FIG. 6A) and brain sTREM2 at day 79 post first dosing (FIG. 6B). In FIGS. 6A-6B, open upward-pointing triangles represent results using anti-TREM2 antibody 03O05, open diamonds represent results using anti-TREM2 antibody 05O07, '+'s represent results using PBS as vehicle, and open squares represent results using WT mice. FIGS. 6C-6F show effects of anti-TREM2 antibodies on $A\beta_{1-40}$ (FIGS. 6E-6F) and $A\beta_{1-42}$ (FIGS. 6C-6D) in the guanidine-soluble (FIGS. 6C-6E) and RIPA-soluble fractions (FIGS. 6D-6F). FIG. 6G shows representative digitized images of IHC labeled with anti-Abeta antibody 6E10 in mouse brain, and FIG. 6H shows quantifications of area of total, inert and filamentous plaque in mouse brain. FIG. 6I shows representative digitized images of immunohistostaining (IHC) labeled with anti-iba1 antibody in mouse brain, and FIG. 6J shows quantifications of area of iba1, CD68 and ratios of CD68 to iba1 in mouse brain. *$P<0.05$, $P<0.01$, *$P<0.001$, ****$P<0.0001$, using one-way or two-way ANOVA with Dunnett's multiple comparison adjustment. Scale bar, 200 μm.

FIGS. 8A-8D show the efficacy of anti-TREM2 antibody 03O05 using cuprizone mouse model of Multiple Sclerosis. Wild-type C57BL6 mice were administered 0.2% cuprizone in regular chow and dosed i.p. with 30 mg/kg anti-TREM2 antibody 03O05 or vehicle weekly for 4 weeks. Cuprizone was then withdrawn for 0 day (4 weeks), 3 days (4+0.5 weeks) or 7 days (4+1 weeks). FIG. 8A shows representative digitized images of IHC labeled with anti-MBP antibody of coronal brain sections, and FIG. 8B shows quantifications of total intensity in positive areas of anti-MBP antibody staining. FIG. 8C shows representative digitized images of IHC labeled with anti-Iba1 antibody of coronal brain sections, and FIG. 8D shows quantification of MFI (mean fluorescence intensity) of anti-Iba1 antibody staining. *$P<0.05$, using one-way ANOVA with Dunnett's multiple comparison adjustment.

FIGS. 9A-9E show antibody 03O05 binding kinetics and epitope locations. FIGS. 9A-9D show binding kinetics of anti-TREM2 antibody 03O05 towards HuTREM2-IgG1Fc (FIG. 9A), HuTREM2 (M41A)-IgG1Fc (FIG. 9B), HuTREM2 (W44A)-IgG1Fc (FIG. 9C) or HuTREM2 (L89A)-IgG1Fc (FIG. 9D) by BLI technology using the OCTETR RED96e system, with analyte concentrations of 100 nM (top trace), 50 nM (second trace from top), 25 nM (third trace from top) and 12.5 nM (fourth trace from top), with an accompanying smoothed line showing the line fitted to each trace according to a monovalent (1:1) binding model.

FIG. 9E shows locations of epitope (M41-W44 and L89, in dashed circles) on AlphaFold structure of HuTREM2 (AF-Q9NZC2-F1).

FIGS. 10A-10F show in vitro and in vivo effects of affinity maturation of anti-TREM2 antibody 03O05. FIGS. 10A-10B show in vitro effects of affinity maturation of anti-TREM2 antibody 03O05 on NFAT-luciferase reporter activity measured using BW5147.G.1.4 cell line co-expressing human TREM2, adaptor protein DAP-12, and luciferase reporter under a NFAT promoter, for a range of antibody concentrations indicated on the x-axis. FIGS. 10C-10D show in vivo effect of affinity maturation of anti-TREM2 antibody 03O05 on sTREM2 levels in wild-type B6SJLF1 mice, showing serum sTREM2 (FIG. 10C) and brain sTREM2 on day 7 (FIG. 10D) measured in mice dosed i.p. at 30 mg/kg. FIGS. 10E-10F show concentration of anti-TREM2 antibodies in serum (FIG. 10E) and brain on day 7 (FIG. 10F) in mice dosed i.p. at 30 mg/kg. Open squares represent results using anti-TREM2 antibody 03O05, open circle represent results using anti-TREM2 antibody Hu03O05 (HuIgG1Fc), open upward-pointing triangles represent results using anti-TREM2 antibody MB-4 (1-E9), open downward-pointing triangles represent results using anti-TREM2 antibody MB-5 (1-G10), open diamonds represent results using anti-TREM2 antibody MB-6 (2-E6), open hexagons represent results using anti-TREM2 antibody MB-9, 'X's represent results using anti-TREM2 antibody MB-11, '+'s represent results using anti-TREM2 antibody MB-23 and solid squares represent control results without antibody treatment.

DETAILED DESCRIPTION

Figure 3A:
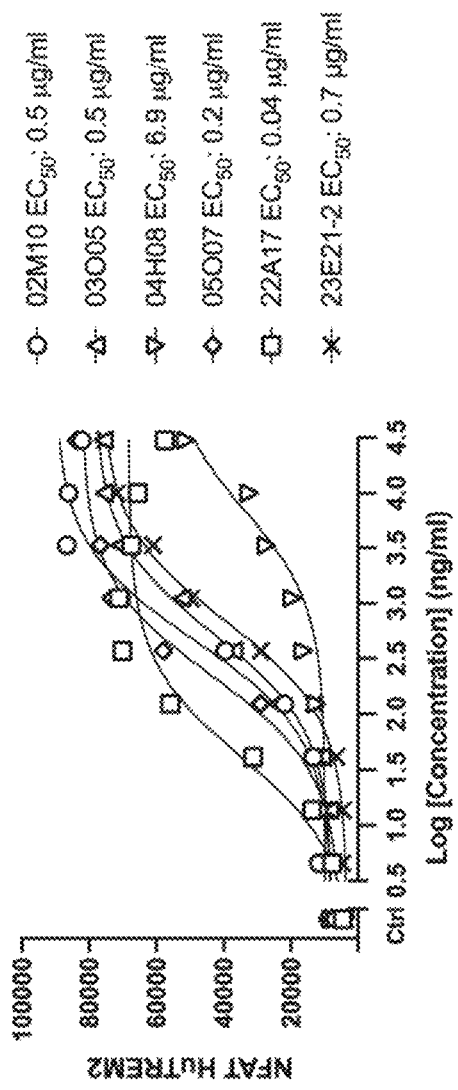
FIGS. 3A-3B show effects of anti-TREM2 agonist (FIG. 3A) or inverse agonist (FIG. 3B) antibodies on NFAT-luciferase reporter activity measured using BW5147.G.1.4 cell line co-expressing human TREM2, adaptor protein DAP-12, and luciferase reporter under a NFAT promoter, for a range of antibody concentrations indicated on the x-axis.

The present disclosure relates to and provides novel anti-TREM2 antibodies that bind the ECD of TREM2 on the surface of a cell expressing TREM2 and have an effect on at least one TREM2-mediated or TREM2-related function. In particular, the present disclosure relates to and provides novel anti-TREM2 antibodies that bind the ECD of HuTREM2 on the surface of a cell expressing HuTREM2, wherein administration of the anti-TREM2 antibodies to a subject expressing HuTREM2 can trigger increased levels of sTREM2 in serum and/or brain of the subject, i.e. antibodies wherein binding the ECD of HuTREM2 can trigger TREM2 cleavage that results in increased levels of sTREM2 in serum and/or brain of the subject. In some aspects, novel agonist anti-TREM2 antibodies that bind the ECD of HuTREM2 on the surface of a cell expressing HuTREM2, wherein administration of the anti-TREM2 antibodies to a subject expressing HuTREM2 can trigger increased levels of sTREM2 in serum and/or brain of the subject and may activate HuTREM2 signalling. In another aspect, novel anti-TREM2 antibodies wherein administration of the anti-TREM2 antibodies to a subject expressing HuTREM2 can trigger increased levels of sTREM2 in serum and/or brain of the subject and does not activate HuTREM2 signalling.

In another aspect, anti-TREM2 antibodies are provided that can be detected in brain tissue after administration, indicating that the anti-TREM2 antibodies can act on targets within brain tissue. In accordance with this aspect, anti-TREM2 antibodies can trigger TREM2 cleavage that results in increased levels of sTREM2 in the brain of the subject. Administration of anti-TREM2 antibodies as provided herein can have effects in the brain including but not limited to decreasing microglia-mediated inflammation in the brain, increasing microglial phagocytosis in the brain, increasing the proportion of phagocytic microglia in the brain, reducing levels of toxic filamentous plaque in the brain, increasing phagocytosis of degraded myelin basic protein (dMBP) in the brain and clearance of myelin debris in the brain.

In another aspect, anti-TREM2 antibodies are provided that bind to a discontinuous, conformational epitope consisting of residues M41-W44 and L89 of HuTREM2. Embodiments in accordance with this aspect include antibodies with differing CDR sequences that bind the epitope with differing kinetics (e.g., target affinities, $k_{off}$ values), and differing downstream effects after binding to the epitope. Some embodiments in accordance with this aspect provide agonist anti-TREM2 antibodies that can trigger increased levels of sTREM2 in serum and brain of a subject after administration (i.e., trigger cleavage of TREM2) and can trigger TREM2 signalling measured as a response mediated by a DNAX-activating protein of 12 kDa (DAP12) signaling adapter protein associated with HuTREM2, in a dose-dependent manner. Other embodiments in accordance with this aspect provide anti-TREM2 antibodies that can trigger increased levels of sTREM2 in serum and brain of a subject after administration and do not detectably trigger TREM2 signalling measured as a response mediated by a DNAX-activating protein of 12 kDa (DAP12) signaling adapter protein associated with HuTREM2. Non-limiting exemplary embodiments include, but are not limited to, antibodies having the variable region of anti-TREM2 antibody 03O05 and antibodies wherein each CDR has at least about 60% or 65% identity to a corresponding CDR of anti-TREM2 antibody 03O05, as disclosed in Tables 5 and 6. Thus, embodiments in accordance with this aspect provide a TREM2 epitope that appears to exert effects on binding-triggered effects on TREM2 cleavage (and sTREM2 levels) and effects on TREM2 signalling through independent mechanisms, and further provide antibodies that can be selected for their ability to trigger specific downstream effects after binding to this epitope. Accordingly, antibodies can be selected that bind to the epitope and trigger TREM2 cleavage and TREM2 signalling, while other antibodies can be selected to bind to the epitope and trigger TREM2 cleaving without triggering TREM2 signalling. The embodiment provided in accordance with this aspect is in the portion of TREM2 known as ligand recognition site I (hydrophobic site), and this epitope is predicted to overlap with known binding sites for amyloid beta (Aβ) peptides and Apolipoprotein E (ApoE), both of which are implicated in numerous conditions including but not limited to Alzheimer's disease (AD) and cardiovascular diseases. It is understood that the predicted overlap of binding sites allows for multiple binding scenarios, e.g., providing cases wherein anti-TREM2 antibody binding to the epitope interferes with binding of another protein that binds to an overlapping binding site, and cases wherein anti-TREM2 antibody binding does not interfere with the binding of another protein to an overlapping site, e.g., wherein anti-TREM2 can bind to its epitope and does not interfere with ApoE4 binding.

In another aspect, the present disclosure provides agonist anti-TREM2 antibodies that can activate TREM2 via one or more distinct mechanisms that can provide agonist anti-TREM2 antibodies that can be used to achieve therapeutic effects not previously seen for other agonist anti-TREM2 antibodies. In accordance with this aspect, the present disclosures provides antibodies having the variable regions of anti-TREM2 antibody 03O05 and variants derived from anti-TREM2 antibody 03O05, that bind to a discontinuous, conformational epitope consisting of residues M41-W44 and L89 of HuTREM2, and are able to induce phagocytosis and suppress neuronal inflammation in the brain, that can activate TREM2 via one or more distinct mechanisms from previously reported agonist anti-TREM2 antibodies. Methods are provided for treating, preventing, diagnosing, screening for, or monitoring a condition associated with TREM2 activity or TREM2-mediated functions having downstream effects such that a subject having that condition (disorder) may benefit from enhanced phagocytosis by microglia and/or macrophages, using an effective amount of an anti-TREM2 antibody disclosed herein. One or more methods can be used for precise targeting of anti-TREM2 antibodies to facilitate a desired effect or outcome, including but not limited to the use of routes of administration to target specific locations or systems involved in a condition, the use of timing of administration (including dosage regimens) to target critical time periods, the use of formulations designed to target specific tissues, systems, or conditions, and combinations of these methods.

Terminology/Definitions

Scientific and technical terms used in connection with the present invention shall have the meanings that are commonly understood by those of ordinary skill in the art, unless otherwise defined. Use of singular terms ("a" or "an" or "the" or other use of a term in the singular) include plural reference, and plural terms shall include the singular, unless the context clearly dictates otherwise. Thus, for example, reference to "an antibody" includes "one or more" antibodies or a "plurality" of such antibodies. All publications mentioned herein are hereby incorporated by reference in their entirety.

Generally, nomenclature and techniques of molecular biology, microbiology, cell and tissue culture, protein and nucleotide chemistry, and recombinant DNA techniques available to one of skill of the art can be employed for the antibodies, antigen-binding fragments, compositions, and methods disclosed herein. Techniques and procedures described herein are generally performed according to conventional methods well known in the art and as described in various general and more specific references, inter alia, Sambrook et al. (1989) MOLECULAR CLONING: A LABORATORY MANUAL (2nd ed., Cold Spring Harbor Laboratory Press, Cold Spring Harbor, N.Y.) and Ausubel et al. (1994) CURRENT PROTOCOLS IN MOLECULAR BIOLOGY, Volumes I-III (John Wiley & Sons, N.Y.). Enzymatic reactions and purification techniques are performed according to manufacturer's specifications or as commonly accomplished in the art or as described herein, unless otherwise specified herein. Techniques and methods for pharmaceutical preparation and formulation, and treatment of subjects, are described herein using conventional nomenclature.

"Antibody" refers in the broadest sense to a polypeptide or combination of polypeptides that recognizes and binds to an antigen through one or more immunoglobulin variable regions, where the immunoglobulin variable regions may be naturally occurring or non-naturally occurring, e.g., as a result of engineering, chimerization, humanization, optimization, CDR-grafting, or affinity maturation. An antibody as disclosed herein comprises at least sufficient complementarity determining regions (CDR), interspersed with framework regions (FR), for the antibody to recognize and bind to an antigen. An antibody as disclosed herein may include additional peptides or other moieties, according to the desired function, such as sufficient constant region (also called constant domain) structure/sequence to elicit a desired reaction, or regions that support labels, tags, linkers, conjugation, etc., to allow the antibody to be detected, imaged, conjugated, tagged, cross-linked, immobilized, removed, etc.

An anti-TREM2 antibody as disclosed herein may be, but is not limited to, at least one of a monoclonal antibody, a recombinant monoclonal antibody, a polyclonal antibody, a humanized antibody, a chimeric antibody, a single chain antibody, a Fab fragment, a single-chain variable fragment (scFv), an aptamer, a single-domain antibody (VHH or nanobody), a recombinant antibody, a modified antibody having peptide/other moieties attached to antibody and/or additional amino acids added the N- or C-terminus, or other antigen-binding fragment or variant. The term "chimeric" antibody refers to an antibody in which a portion of the heavy chain (HC) and/or light chain (LC) is derived from a particular source or species, while some of, or the remainder of, the HC and/or LC is derived from a different source or species, e.g., wherein a target binding region (usually, the variable region) will be from one species (e.g., human, non-human primate, or mouse) and the constant region (especially the Fc) is from a different species. A chimeric antibody may be produced by a source engineered to produce antibodies with defined variable regions and defined constant regions, e.g., by a mouse engineered to express the entire human variable immunoglobulin region to produce antibodies with fully human variable regions, and constant regions that may include mouse constant region sequence (e.g., mouse Fc) and/or by cells engineered to produce antibodies with similar defined variable region/constant region formats. It is understood that the present disclosure is directed to providing anti-TREM2 antibodies with fully human variable regions, where in some embodiments antibodies may be naturally occurring chimeric antibodies produced by cells from a mouse (*Mus musculus*) engineered to produce antibodies with fully human variable regions. It is understood that in other embodiments, anti-TREM2 antibodies as provided here may be recombinant antibodies produced by cells expressing one or more constructs encoding antibodies with fully human variable regions in defined variable region/constant region formats such as fully human antibodies or chimeric antibodies, where constant region components including the Fc are from a class/subclass (isotype) selected for the particular use and target for which the antibody is intended. As used herein, the phrase "humanized antibody" refers to an antibody or antibody variant derived from a non-human antibody that presumably has a non-human variable region, typically a mouse monoclonal antibody, where CDRs from the parental non-human antibody are grafted (fused) in a framework comprising variable regions derived from a human immunoglobulin framework, in particular an acceptor human framework or a human consensus framework. Techniques and principles for designing, making, and testing humanized antibodies are known (Jones P T, Dear P H, Foote J, Neuberger M S, Winter G. Replacing the complementarity-determining regions in a human antibody with those from a mouse. *Nature.* 1986 May 29-Jun. 4; 321 (6069): 522-5; Almagro J C, Fransson J. Humanization of antibodies. *Front Biosci.* 2008 Jan. 1; 13:1619-33). It is understood that changes can be made to an acceptor framework at multiple locations in order to develop a humanized antibody having improved features according to the desired use, e.g., high affinity for target, low clearance, low toxicity, etc.

It is understood that the isotype of anti-TREM2 antibodies as provided here can be selected for a desired functionality or compatibility, to produce isotpes including but not limited to IgG2a, IgG2b, or IgG1 (heavy chain), kappa (κ) or lambda (λ) (light chain). A variable region with CDRs that bind an epitope on the ECD of TREM2 can be paired with a constant region selected for desired functions. The constant region (constant domain) of an antibody may be derived from one of five major classes of antibodies, viz., IgA, IgD, IgE, IgG, and IgM, and several of these may be further divided into subclasses (isotypes), e.g., IgG1, IgG2, IgG3, IgG4, IgA1, and IgA2, each of which is well characterized and known to confer functional specialization. Modified versions of each of these classes and isotypes are readily discernable and within the scope of the instant disclosure. While all immunoglobulin classes are within the scope of the present disclosure, the present disclosure will be directed largely to the IgG class of immunoglobulin molecules.

An anti-TREM2 antibody as disclosed herein can be a whole (intact, full length) antibody, a single chain antibody, or an antibody fragment with one or two chains, and can be naturally occurring or non-naturally occurring. An antibody as disclosed herein comprises at least sufficient complementarity determining regions (CDR), interspersed with framework regions (FR), for the antibody to recognize and bind to an antigen, preferably the ECD of TREM2. An anti-TREM2 antibody as disclosed herein may have a partial or complete variable region portion comprising at least a sufficient amount of a fully human heavy chain variable region polypeptide (VH) and a sufficient amount of a fully human light chain variable region polypeptide (VL) that together form a structure with a binding domain that interacts with an antigen, preferably the ECD of TREM2, and it is understood that the variable region of an anti-TREM2 antibody disclosed herein may include two VH-VL structures. An anti-TREM2 antibody as disclosed herein may be a full length antibody, intact antibody, isolated antibody, naturally occurring antibody, or equivalent terms which are understood to refer to a polypeptide comprising two full-length heavy chains (HCs) and two light chains (LCs) interconnected by disulfide bonds, forming a constant region and a variable region. It is understood that an anti-TREM2 antibody disclosed herein, in particular an anti-TREM2 antibody fragment disclosed herein, may comprise HC polypeptides that would not necessarily be considered full-length HCs, especially in the constant region, but have sufficient structure/sequence for a desired function, e.g., sufficient constant region structure/sequence to elicit a desired reaction or support labels, tags, linkers, conjugation, etc., to allow the antibody to be detected, imaged, tagged, conjugated, cross-linked, immobilized, removed, etc.

In an anti-TREM2 antibody as disclosed herein, each of the VH and VL regions can be further subdivided into CDR regions characterized by hypervariability, interspersed with FR regions that are typically more conserved. Each VH and VL is typically composed of three CDRs and four FRs arranged from amino-terminus to carboxy-terminus in the following order: FR1, CDR1, FR2, CDR2, FR3, CDR3, FR4. The constant regions of the antibodies may mediate the binding of the immunoglobulin to host tissues or factors, including various cells of the immune system and the classical complement system, and/or may trigger functions in effector cells. Typically, an anti-TREM2 antibody as disclosed herein has at least heavy chain (HC)-CDR1, HC-CDR2, and HC-CDR3 and light chain (LC)-CDR1, LC-CDR2, and LC-CDR3 sequences. The VH and VL amino acid sequences of non-limiting embodiments of anti-TREM2 antibodies are disclosed in Table 1, where the CDRs as identified by AlivaMab Biologics (alivamab.com, San Diego, CA) using IMGT numbering (imgt.org) are indicated by underlining in each VH and VL region and are also provided as separate sequences. An antibody may comprise fewer CDR sequences, as long as the antibody can recognize and bind an antigen, and trigger desired effects mediated by the complex formed by the antibody bound to the antigen.

An anti-TREM2 antibody disclosed herein may be a variant comprising at least one altered CDR sequence and/or altered framework sequence, wherein CDR and/or framework sequences may by optimized by mutating a nucleic acid molecule encoding such framework sequence. An anti-TREM2 antibody disclosed herein may have HC and LC portions derived independently from different sources. Techniques for generating variants include but are not limited to conservative amino acid substitution, computer modeling, screening candidate polypeptides alone or in combinations, and codon optimization, and it is understood that a skilled person is capable of generating antibody variants as may be needed.

An anti-TREM2 antibody disclosed herein may be a TREM2-binding fragment, provided the fragment retains the ability to trigger any desired effects mediated by the complex formed by anti-TREM2 antibody variable region sequences bound to TREM2. If any desired effect of anti-TREM2 antibodies is known to be mediated by constant region sequences, an anti-TREM2 antibody may be a TREM2-binding fragment that includes sufficient constant region sequence to trigger that effect. TREM2 binding and effects on TREM2-mediated activities can be performed by fragments of anti-TREM2 antibodies provided here such as: a Fab fragment; a monovalent fragment consisting of the VL, VH, CL and CH1 domains; a F(ab)$_2$ fragment; a bivalent fragment comprising two Fab fragments linked by a disulfide bridge at the hinge region; an Fd fragment consisting of the VH and CH1 domains; a single-chain variable fragment (scFv) consisting of the VL and VH domains of a single arm of an antibody; a single domain antibody (dAb) fragment which consists of a VH domain; and an isolated CDR (VHH, nanobody), or an aptamer. Antigen binding portions can be incorporated into single domain antibodies, maxibodies, minibodies, nanobodies, intrabodies, diabodies, triabodies, tetrabodies, v-NAR and bis-scFv (see, e.g., Hollinger and Hudson, 2005, *Nature Biotechnology*, 23, 9, 1126-1136). Antigen binding portions of antibodies can be grafted into scaffolds based on polypeptides to form monobodies (see, e.g., U.S. Pat. No. 6,703,199, which describes fibronectin polypeptide monobodies).

An anti-TREM2 antibody disclosed herein may be a multivalent antibody with three, four, or more F(ab') fragments that bind the ECD of TREM2. An anti-TREM2 antibody disclosed herein may be a multispecific antibody, i.e., an antibody with one, two, three, four, or more F(ab') fragments that bind the ECD of TREM2, fused with one, two, three, four, or more F(ab') fragments that bind one or more targets that are not the ECD of TREM2.

The sequence and format of anti-TREM2 antibodies can be altered to develop antibodies having desired properties. In non-limiting embodiments described in the Examples, an anti-TREM2 antibody with desired properties for a particular use can be developed using suitable variable region frameworks comprising VH/VL sequences provided in Table 1, or CDRs provided in Tables 1, 5, and 6 in suitable variable region frameworks other than the framework sequences provided in Table 1, optionally combined with constant region sequences that include Fc sequences selected to be suitable for that particular use. Experimental results disclosed below provide non-limiting exemplary embodiments of altering sequence and format of anti-TREM2 antibodies to develop antibodies with properties such as enhanced target antigen binding and a change in the ability to act as agonist of TREM2 activation. In particular, the Examples provide exemplary embodiments of altering CDR sequences of antibodies that bind the same epitope as the parental antibody, with different binding kinetics and different effects on TREM2-mediated signalling.

Terms including "condition that may benefit from enhanced phagocytosis by microglia and/or macrophages" or "disorder that may benefit from enhanced phagocytosis by microglia and/or macrophages" or "condition (or disorder) such that a subject having that condition may benefit from enhanced phagocytosis by microglia and/or macrophages" or similar terms are understood to refer to a group of conditions, diseases, and disorders associated with TREM2 activity or TREM2-mediated functions having downstream effects such that a subject having that condition (disorder) may benefit, or does benefit, or is known to benefit from enhanced phagocytosis by microglia and/or macrophages, including but not limited to certain neurodegenerative diseases such as Nasu-Hakola disease, FTD (frontotemporal dementia), PD (parkinson's disease), Alzheimer's disease (AD), ALS (Amyotrophic lateral sclerosis) and MS (multiple sclerosis), including relapsing-remitting MS (RRMS).

In the present disclosure, "binds to TREM2" or "binds to the ECD of TREM2" or "binds the ECD of TREM2 on the surface of a cell expressing TREM2" or "binds TREM2 on the surface of a cell expressing TREM2" or similar language, is understood as showing selectivity or affinity for the ECD of TREM2, which can be measured by common methods known in the art, including those described herein. The calculated concentration at which approximately 50% of maximal binding (the calculated $EC_{50}$) occurs can often be used as an estimate of affinity.

A "subject" is a mammal, where mammals include but are not limited to primates (e.g., humans and non-human primates such as monkeys), mammals commonly used for research such as rabbits and rodents (e.g., mice and rats), and domesticated animals (e.g., cows, sheep, cats, dogs, pigs, llamas, camels, and horses). In certain embodiments, the subject is a human expressing HuTREM2. In certain embodiments, the subject is a non-human mammal, in particular a mouse, that has been engineered to express HuTREM2. The phrases "to a subject in need thereof" or "to a patient in need thereof" or "to a patient in need of treatment" or "a subject in need of treatment" may include subjects that would benefit from administration of the anti-TREM2 antibodies disclosed herein, for treatment, prevention, diagnosis, screening, or monitoring of a condition. It is understood that administration of anti-TREM2 antibodies encompasses administration to "a subject in need thereof" can be interpreted as referring to a subject known or suspected to have a condition associated with TREM2 activity, or TREM2-mediated functions, with downstream effects such that a subject having that condition (disorder) may benefit from increased sTREM2 levels and more particularly, enhanced phagocytosis by microglia and/or macrophages. Exemplary conditions that may benefit from administration of anti-TREM2 antibodies resulting in enhanced phagocytosis from microglia or macrophages include but are not limited to certain neurodegenerative diseases such as Nasu-Hakola disease, FTD (frontotemporal dementia), PD (parkinson's disease), Alzheimer's disease (AD), ALS (Amyotrophic lateral sclerosis) and MS (multiple sclerosis). Anti-TREM2 antibodies disclosed herein can be administered to a subject for therapeutic, preventative, or prophylactic purposes including but not limited to, for treating, for screening, for diagnostics, for monitoring, for research purposes related to a condition that may benefit from enhanced phagocytosis by microglia and/or macrophages, or to achieve results distinct from treating an identified condition. It is further understood that anti-TREM2 antibodies can be administered to a subject that is not known or suspected to have a condition that may benefit from enhanced phagocytosis by microglia and/or macrophages, for purposes that may include but are not limited to, preventative or prophylactic purposes, for screening, for diagnostics, for monitoring, for research purposes, or to achieve results distinct from treating a condition or disorder.

The present disclosure provides anti-TREM2 antibodies that include an amino acid sequence that is at least 65%; 70%; 80%; 85%, 90%, 92%, 95%, 97%, 98%, 99% or 100% identical to one of the following: SEQ ID NO: 1; SEQ ID NO: 2; SEQ ID NO: 3; SEQ ID NO: 4; SEQ ID NO: 6; SEQ ID NO: 7; SEQ ID NO: 9; SEQ ID NO: 11; SEQ ID NO: 12; SEQ ID NO: 13; SEQ ID NO: 14; SEQ ID NO: 16; SEQ ID NO: 17; SEQ ID NO: 19; SEQ ID NO: 21; SEQ ID NO: 22; SEQ ID NO: 23; SEQ ID NO: 24; SEQ ID NO: 26; SEQ ID NO: 27; SEQ ID NO: 29; SEQ ID NO: 31; SEQ ID NO: 32; SEQ ID NO: 33; SEQ ID NO: 34; SEQ ID NO: 36; SEQ ID NO: 37; SEQ ID NO: 39; SEQ ID NO: 41; SEQ ID NO: 42; SEQ ID NO: 43; SEQ ID NO: 44; SEQ ID NO: 46; SEQ ID NO: 47; SEQ ID NO: 49; SEQ ID NO: 51; SEQ ID NO: 52; SEQ ID NO: 53; SEQ ID NO: 54; SEQ ID NO: 56; SEQ ID NO: 57; SEQ ID NO: 59; SEQ ID NO: 61; SEQ ID NO: 62; SEQ ID NO: 63; SEQ ID NO: 64; SEQ ID NO: 66; SEQ ID NO: 67; SEQ ID NO: 69; SEQ ID NO: 71; SEQ ID NO: 72; SEQ ID NO: 73; SEQ ID NO: 74; SEQ ID NO: 76; SEQ ID NO: 77; SEQ ID NO: 79; SEQ ID NO: 81; SEQ ID NO: 82; SEQ ID NO: 83; SEQ ID NO: 84; SEQ ID NO: 86; SEQ ID NO: 87; SEQ ID NO: 89; SEQ ID NO: 91; SEQ ID NO: 92; SEQ ID NO: 93; SEQ ID NO: 94; SEQ ID NO: 96; SEQ ID NO: 97; SEQ ID NO: 99; SEQ ID NO:101; SEQ ID NO: 102; SEQ ID NO: 103; SEQ ID NO: 104; SEQ ID NO: 106; SEQ ID NO: 107; SEQ ID NO: 109; SEQ ID NO: 111; SEQ ID NO: 112; SEQ ID NO: 113; SEQ ID NO: 114; SEQ ID NO: 116; SEQ ID NO: 117; SEQ ID NO: 119; SEQ ID NO: 121; SEQ ID NO: 122; SEQ ID NO: 123; SEQ ID NO: 124; SEQ ID NO: 126; SEQ ID NO: 127; SEQ ID NO: 129; SEQ ID NO: 131; SEQ ID NO: 132; SEQ ID NO: 133; SEQ ID NO: 134; SEQ ID NO: 136; SEQ ID NO: 137; and SEQ ID NO: 139.

A sequence that is 65% identical to a CDR sequence is characterized as follows: a sequence that is 65% identical to a CDR having 3 amino acids has 2 identical amino acids and 1 differing amino acid; a sequence that is 65% identical to a CDR having 4 amino acids has 3 identical amino acids and 1 differing amino acid; a sequence that is 65% identical to a CDR having 5 amino acids has 4 identical amino acids and 1 differing amino acid; a sequence that is 65% identical to a CDR having 6 amino acids has 4 identical amino acids and 2 differing amino acids; a sequence that is 65% identical to a CDR having 7 amino acids has 5 identical amino acids and 2 differing amino acids; a sequence that is 65% identical to a CDR having 8 amino acids has 6 identical amino acids and 2 differing amino acids; a sequence that is 65% identical to a CDR having 9 amino acids has 6 identical amino acids and 3 differing amino acids; a sequence that is 65% identical to a CDR having 10 amino acids has 7 identical amino acids and 3 differing amino acid; a sequence that is 65% identical to a CDR having 11 amino acids has 8 identical amino acids and 3 differing amino acids; and a sequence that is 65% identical to a CDR having 12 amino acids has 8 identical amino acids and 4 differing amino acids.

The present disclosure provides an isolated nucleic acid molecule that encodes at least a portion of an anti-TREM2 antibody or antibody fragment as disclosed herein, where the nucleotide sequence of isolated nucleic acid molecule incudes a nucleotide sequence that is at least 85%, 90%, 92%, 95%, 97%, 98%, 99% or 100% identical to one of the following: SEQ ID NO: 5 encoding 02M10 VH; SEQ ID NO: 10 encoding 02M10 VL: SEQ ID NO: 15 encoding 03O05 VH; SEQ ID NO: 20 encoding 03O05 VL; SEQ ID NO. 25 encoding 04H08 VH; SEQ ID NO: 30 encoding 04H08 VL; SEQ ID NO: 35 encoding 05O07 VH; SEQ ID NO: 40 encoding 05O07 VL; SEQ ID NO: 45 encoding 08B23 VH; SEQ ID NO: 50 encoding 08B23 VL: SEQ ID NO: 55 encoding 14J17 VH; SEQ ID NO: 60 encoding 14J17 VL; SEQ ID NO: 65 encoding 22A17 VH; SEQ ID NO: 70 encoding 22A17 VL; SEQ ID NO: 75 encoding 23E21-2 VH; and SEQ ID NO: 80 encoding 23E21-2 VL. The present disclosure provides a vector comprising an isolated nucleic acid molecule that encodes at least a portion The following examples are offered to illustrate, but not to limit, the claimed invention.

EXAMPLES

Example 1: Antibody Production and Identification of Antibodies that Bind TREM2

Immunization and Primary Screen for Human TREM2-Binding Hybridomas

The production of novel monoclonal antibodies against TREM2 was carried out under contract by AlivaMab Biologics (alivamab.com, San Diego, CA), utilizing in vivo AlivaMab Mouse immunization and hybridoma technology. Eight (8) AlivaMab Mice (AMM: XKL with chimeric human F(ab')$_2$/mouse CH2-CH3 antibody composition) were immunized with both recombinant protein immunogen and DNA immunogen using AlivaMab Biologics' immunization protocol. The protein immunogen consisted of human TREM2 extracellular domain (ECD) fused with human IgG1Fc (HuTREM2-IgG1 Fc; SEQ ID NO: 141) and mouse TREM2 ECD fused with human IgG1Fc (MoTREM2-IgG1Fc; SEQ ID NO: 142), both produced in house. Portions of the recombinant protein immunogen were conjugated with super T cell epitopes (TCEs) with the focus to break immune tolerance and generate a mouse cross-reactive response (conjugation performed by AlivaMab Biologics). DNA immunogen consisted of plasmids encoding human TREM2 ECD tagged with TCE (HuTREM2-TCE) and mouse TREM2 ECD tagged with TCE (MoTREM2-TCE), respectively (custom made by AlivaMab Biologics). Plasma titers were determined by fluorescence-activated cell sorting (FACS) against HEK293T cell lines stably expressing human-, mouse-, or cynomolgus monkey TREM2 (HEK293T HuTREM2, HEK293T MoTREM2, and HEK293T CyTREM2 cell lines; custom made by AlivaMab Biologics; cynomolgus monkey TREM2 SEQ ID NO: 153). Following immunization and final titer measurement that confirmed sufficient plasma titers were obtained, B cells were isolated and enriched from spleens and lymph nodes, and subsequently used for electrofusion to generate hybridomas. Hybridoma supernatants were initially screened for HuTREM2 and CyTREM2 reactivity by FACS. Positive binders were identified when supernatants gave positive staining signals on HEK293T HuTREM2 and HEK293T CyTREM2 cell lines but negative staining signal on parental cell line HEK293T. An ELISA (enzyme linked immunosorbent assay) counter-screen against human IgG1Fc was performed to eliminate IgG1Fc-binding hybridoma clones. HuTREM2-binding hybridomas were also analyzed for their affinity to MoTREM2 using HEK293T MoTREM2 cells by FACS, identifying clones that cross react to both HuTREM2 and MoTREM2, and clones specific to HuTREM2. Seven hundred thirty-four (734) HuTREM2-binding hybridoma supernatants were transferred to Mabwell Therapeutics for in-house functional screening.

Functional Screening Using NFAT-Luciferase Reporter Assay

Mouse T lymphoblast cell line BW5147.G.1.4 (ATCC, TIB-48™ (atcc.org/products/tib-48)) was used to generate NFAT (nuclear factor of activated T cells)-Luciferase reporter cell line, which stably co-expresses HuTREM2, adaptor protein DAP-12, and firefly luciferase under the control of a NFAT promoter (custom made by Biosettia, San Diego, CA).

To conduct a NFAT-Luciferase reporter assay, 1 µg/well of Goat Anti-Mouse IgG Fc (Invitrogen, #A16086) was first coated in the 96-well plate overnight. The next day, excess of Anti-Mouse IgG Fc was washed away, and hybridoma supernatants were added to the plate and incubated for 30 min allowing capture of anti-TREM2 antibodies. After incubation, BW5147.G.1.4 NFAT-Luciferase reporter cells were added to the plate and incubated at 37° C. for 5-6 h before cells were lysed for luminescence recording using Promega ONE-Glo™ Luciferase Assay System (Promega, #E6130).

Seven hundred thirty-four (734) HuTREM2-binding hybridomas were tested as described above. Hybridomas showing agonistic (stimulating) activity or inverse agonistic (inhibiting) activity were chosen for subcloning and sequencing. Resulted subclones were verified for binding to HuTREM2, MoTREM2 and CyTREM2 by FACS (against stable HEK293T TREM2 cells) and ELISA (against His-tagged TREM2 ECDs), as well as for in vitro functionality in NFAT-Luciferase reporter assay.

The anti-TREM2 antibody discovery campaign described above identified: one (1) HuTREM2-specific agonist antibody 02M10; five (5) HuTREM2- and MoTREM2-cross reactive agonist antibodies, 03O05, 04H08, 05O07, 22A17 and 23E21-2; and two (2) HuTREM2 and MoTREM2-cross reactive inverse agonist antibodies, 08B23 and 14J17. Amino acid sequences of the variable regions of these antibodies are shown in Table 1, with complementarity determining regions (CDRs) indicated by bold and underlining.

TABLE 1

ANTI-TREM2 ANTIBODIES-VARIABLE REGION SEQUENCE, CDRS UNDERLINED IN VH/VL

Antibody 02M10 HuTREM2-specific agonist antibody

02M10 VH peptide sequence
EVQLVESGGGLVKPGGSLRLSCAASGFTFSTYSMNWVRQAPGKGLEWVSSISSGSSHKYYAD
SVKGRFTISRDNAKNSLYLQMNSLRAEDTAVYYCARWENAMGLDYWGQGTLVTVSS (SEQ
ID NO: 1)

TABLE 1-continued

ANTI-TREM2 ANTIBODIES-VARIABLE REGION SEQUENCE, CDRS UNDERLINED IN VH/VL

HC CDR1 GFTFSTYS (SEQ ID NO: 2)

HC CDR2 ISSGSSH (SEQ ID NO: 3)

HC CDR3 ARWENAM (SEQ ID NO: 4)

02M10 VL peptide sequence
QSVLTQPPSVSAAPGQKVTISCSGSSSNIGNNYVSWYQQVPGTAPKLLIYDNNKRPSGIPDRES
GSKSGTSATLGITGLQTGDEADYYCGTWDSSLRAVVFGGGTKLSVL (SEQ ID NO: 6)

LC CDR1 SSNIGNNY (SEQ ID NO: 7)

LC CDR2 DNN

LC CDR3 GTWDSSLRAVV (SEQ ID NO: 9)

Antibody 03005 HuTREM2- and MoTREM2-cross reactive agonist antibody

03005 VH peptide sequence
QVQLVQSGAEVKKPGAAVKVSCTASGYTFTDYFMHWVRRAPGQGLEWMGWFNPNSGGSN
YAQKFQGRVAMTRDTSISTAYMELSRLRSDDTAVYYCARNGEVPFDNWGQGTLVTVSS
(SEQ ID NO: 11)

HC CDR1 GYTFTDYF (SEQ ID NO: 12)

HC CDR2 FNPNSGGS (SEQ ID NO: 13)

HC CDR3 ARNGEVPFDN (SEQ ID NO: 14)

03005 VL peptide sequence
QSVLTQPPSVSAAPGQKVTISCSGSSSNIGNNFVSWYQQLPGTAPKLLIYDINKRPSGI
PDRFSGSKSGTSATLVITGLQTGDEADYYCGTWDISLSAGVFGGGTKLTVL (SEQ ID NO: 16)

LC CDR1 SSNIGNNF (SEQ ID NO: 17)

LC CDR2 DIN

LC CDR3 GTWDISLSAGV (SEQ ID NO: 19)

Antibody 04H08 HuTREM2- and MoTREM2-cross reactive agonist antibody

04H08 VH peptide sequence
EVQVVESGGGLVQPGGSLRLSCAASGFTFSSYSMNWVRQAPGKGLEWVSYISSSSGTIYYAD
SVKGRFTISRDNAKNSLYLQMNSLRDEDTAVYYCARLPREGFFDYWGQGTLVTVSS (SEQ ID
NO: 21)

HC CDR1 GFTFSSYS (SEQ ID NO: 22)

HC CDR2 ISSSSGTI (SEQ ID NO: 23)

HC CDR3 ARLPREGFFDY (SEQ ID NO: 24)

04H08 VL peptide sequence
DIVMTQTPLSSPVTLGQPASISCRSSQSLVHSDGNTYLSWLQQRPGQPPRLLIYKISNRFSGVPD
RFSGSGAGTDFTLKISRVEAEDVGVYYCMQVTQFPFTFGPGTKVDIK (SEQ ID NO: 26)

LC CDR1 QSLVHSDGNTY (SEQ ID NO: 27)

LC CDR2 KIS

LC CDR3 MQVTQFPFT (SEQ ID NO: 29)

Antibody 05O07 HuTREM2- and MoTREM2-cross reactive agonist antibody

05O07 VH peptide sequence
QVQLVQSRAEVKKPGASVKVSCKASGYTFTGYYMHWVRQAPGQGLEWMGWFNPNSGGT
KYAQKFQGRVTMTRDTSINTAYMELSSLRSDDTAVYYCARTGVIPFDYWGQGTLVTVSS
(SEQ ID NO: 31)

HC CDR1 GYTFTGYY (SEQ ID NO: 32)

HC CDR2 FNPNSGGT (SEQ ID NO: 33)

HC CDR3 ARTGVIPFDY (SEQ ID NO: 34)

05O07 VL peptide sequence
QSVLTQPPSVSAAPGQKVTISCSGSSSNIGNDYVSWYQQLPETAPKLLIYDNNKRPSGIPDRFSG TABLE 1-continued

ANTI-TREM2 ANTIBODIES-VARIABLE REGION SEQUENCE, CDRS UNDERLINED IN VH/VL

SKSGTSATLGITGLQTGDEADYYCGTWDSSLSAVVFGGGTKLTVL (SEQ ID NO: 36)

LC CDR1 SSNIGNDY (SEQ ID NO: 37)

LC CDR2 DNN

LC CDR3 GTWDSSLSAVV (SEQ ID NO: 39)

---
Antibody 08B23 MoTREM2-cross reactive inverse agonist antibody
---

08B23 VH peptide sequence
EVQLVQSGSEVKKPGESLRISCKGSGYSFSSYWLAWVRQMPGKGLEWMGIIYPGDSDTRYSP
SFQGQVTISADKSISTAYLQWSSLKASDTAMYYCARGTPLFYFTYWGQGTLVTVSS (SEQ ID
NO: 41)

HC CDR1 GYSFSSYW (SEQ ID NO: 42)

HC CDR2 IYPGDSDT (SEQ ID NO: 43)

HC CDR3 ARGTPLFYFTY (SEQ ID NO: 44)

08B23 VL peptide sequence
DIVMTQTPLSLPVTPGETASISCRSSQSLLDSEDGNTYLDWYLQKPGQSPQLLIYTLSYRASGV
PDRFSGSGSGTDFTLKISRVEAEDVGVYYCMQRIESPLTFGGGTKVEIK
(SEQ ID NO: 46)

LC CDR 1 QSLLDSEDGNTY (SEQ ID NO: 47)

LC CDR 2 TLS

LC CDR 3 MQRIESPLT (SEQ ID NO: 49)

---
Antibody 14J17 HuTREM2 and MoTREM2-cross reactive inverse agonist antibody
---

14J17 VH peptide sequence
QVQLQESGPGLVKPSETLSLTCTVSGGSISSYYWSWIRQPAGKGLEWIGLIYTSGSTIYNPSVK
RRVTMSVDTSKNQFSLKLTSVTAADTAVYYCARDLFYFDYWGQGTLVTVSS (SEQ ID NO:
51)

HC CDR1 GGSISSYY (SEQ ID NO: 52)

HC CDR2 IYTSGST (SEQ ID NO: 53)

HC CDR3 ARDLFYFDY (SEQ ID NO: 54)

14J17 VL peptide sequence
EIVLTQSPATLSLSPGERATLSCRASQSVSSYLAWYQQRPGQAPRLLISDASNRATGIPARFSGS
ESGTDFTLTISSLEPEDFAVYYCQQRSNWPWTFGQGTKVEIK (SEQ ID NO: 56)

LC CDR1 QSVSSY (SEQ ID NO: 57)

LC CDR2 DAS

LC CDR3 QQRSNWPWT (SEQ ID NO: 59)

---
Antibody 22A17 HuTREM2- and MoTREM2-cross reactive agonist antibody
---

22A17 VH peptide sequence
QVHLVQSGAEVKKPGASVKVSCKASGYTFTGYYMHWVRQAPGQGLEWMGWISPHSGGTN
YAQNFQGRVTMTRDTSISTAYMELSRLRSDDTAVYYCARSGRVAFDIWGQGTMVTVSS
(SEQ ID NO: 61)

HC CDR1 GYTFTGYY (SEQ ID NO: 62)

HC CDR2 ISPHSGGT (SEQ ID NO: 63)

HC CDR3 ARSGRVAFDI (SEQ ID NO: 64)

22A17 VL peptide sequence
QSVLTQPPSVSAAPGQKVTISCSGSSSNIGNDYVSWFQQLPGTAPKLLIYDNNKRPSGIPDRFSG
SKSGTSATLGITGLQTGDEADYYCGTWDTSLSAVVFGGGTKLTVL (SEQ ID NO: 66)

LC CDR1 SSNIGNDY (SEQ ID NO: 67)

LC CDR2 DNN

LC CDR3 GTWDTSLSAVV (SEQ ID NO: 69)

TABLE 1-continued

ANTI-TREM2 ANTIBODIES-VARIABLE REGION SEQUENCE, CDRS UNDERLINED IN VH/VL

Antibody 23E21-2 HuTREM2- and MoTREM2-cross reactive agonist antibody

23E21-2 VH peptide sequence
QVQLVQSGTEVKKPGASVKVSCKASGYTFTGYYMHWVRQAPGQGLEWMGWFDPNSGGA
NHAQKFQDRVTMTRDTSISTAYMELRRLTSDDSAVYFCARSGSFPFDYWGQGTLVTVSS
(SEQ ID NO: 71)

HC CDR1 GYTFTGYY (SEQ ID NO: 72)

HC CDR2 FDPNSGGA (SEQ ID NO: 73)

HC CDR3 ARSGSFPFDY (SEQ ID NO: 74)

23E21-2 VL peptide sequence
QSVLTQPPSVSAAPGQKVTISCSGSSSNIGNDYVSWFQQLPGTAPKLLIYDNNKRPSGIPDRFSG
SKSGTSATLGITGLQTGDEADYYCGTWDSSLSAVVFGGGTKLTVL (SEQ ID NO: 76)

LC CDR1 SSNIGNDY (SEQ ID NO: 77)

LC CDR2 DNN

LC CDR3 GTWDSSLSAVV (SEQ ID NO: 79)

Example 2. Binding Affinity of Anti-TREM2 Antibodies

Antibody affinity and binding kinetics were analyzed using Bio-Layer Interferometry (BLI) technology with OCTET® RED96e system (Sartorius AG, sartorious.com). Pre-hydrated Anti-Mouse IgG Fc Capture (AMC) biosensors were first equilibrated in 1×KB (Kinetic Buffer, 1×PBS pH 7.4+0.02% TWEEN®-20+0.1% BSA) for 120 sec to establish the first baseline, then incubated with 10 μg/ml anti-TREM2 antibodies (02M10, FIG. 1A; 03O05, FIGS. 1B & 2A; 04H08, FIGS. 1C & 2B; 05O07, FIGS. 1D & 2C; 08B23, FIGS. 1E & 2D; 14J17, FIGS. 1F & 2E; 22A17, FIGS. 1G & 2 F; and 23E21-2, FIGS. 1H & 2G) for 240 sec to ensure antibody loading onto the biosensor. The second baseline was established for the antibody immobilized biosensors for 120 sec before association step taking place between the immobilized anti-TREM2 antibodies with various concentrations of HuTREM2-IgG1Fc (from 100 nM to 1.56 nM, 1:2 serial dilution) (FIGS. 1A-H) and MoTREM2-IgG1Fc (from 100 nM to 1.56 nM, 1:2 serial dilution) (FIGS. 2A-G), respectively for 240 sec. At last, antibody-antigen complex was dissociated in 1×KB for 360 sec. Antibody binding kinetic constants were calculated using a monovalent (1:1) binding model with Octet Data Analysis HT Software (Sartorius, Version 11.1.3.25). Respective sensorgrams were analyzed and KD, $k_{on}$, $k_{off}$ and $R^2$ were calculated for each antibody/target combination. FIG. 1I shows calculated KD, $k_{on}$, $k_{off}$ and $R^2$ values of anti-TREM2 antibodies for HuTREM2, with binding affinities ranging from around 1 nM to around 60 nM for HuTREM2. FIG. 2H shows calculated KD, $k_{on}$, $k_{off}$ and $R^2$ values of anti-TREM2 antibodies for MoTREM2, with binding affinities ranging from around 0.1 nM to around 4 nM.

The affinity of anti-TREM2 antibodies for targets was also determined by FACS-based $EC_{50}$ measurements. HEK293T HuTREM2 and HEK293T MoTREM2 cells were collected and blocked with dPBS (Dulbecco's phosphate-buffered saline, Corning Cellgro)+3% BSA before incubation with various concentrations of anti-TREM2 antibodies ranging from 10 μg/ml to 0.64 ng/ml, at 1:5 dilution. After incubation, cells were washed with dPBS and then incubated with goat anti-mouse IgG conjugated with Allophycocyanin (APC) as a secondary antibody (Jackson ImmunoResearch (jacksonimmuno.com), #115-135-164). Finally, cells were washed with dPBS to remove unbound antibody, re-suspended with dPBS+1 mM EDTA, and then subjected to FACS analysis using a NOVOCYTE® Flow Cytometer (ACEA Biosciences, Inc., San Diego CA). Bound antibody at each concentration was determined by measuring mean APC intensity after excitation at 640 nm and measurement of emission (fluorescence) at 675 nm. Results were used to calculate $EC_{50}$ for each antibody for each target (HuTREM2 and MoTREM2), shown in Table 2 below.

TABLE 2

$EC_{50}$ for HuTREM2 and MoTREM2 determined by FACS

| ANTI-TREM2 ANTIBODY | $EC_{50}$ (μg/ml) | |
|---|---|---|
| | HEK293T HUTREM2 | HEK293T MOTREM2 |
| 02M10 | 0.3 | no binding |
| 03O05 | 1.8 | 6.6 |
| 04H08 | 0.5 | 1.3 |
| 05O07 | 3.8 | 2.3 |
| 08B23 | 0.6 | 0.8 |
| 14J17 | 0.9 | 2.6 |
| 22A17 | 0.1 | not tested |
| 23E21-2 | 1.2 | not tested |

Figure 3B:
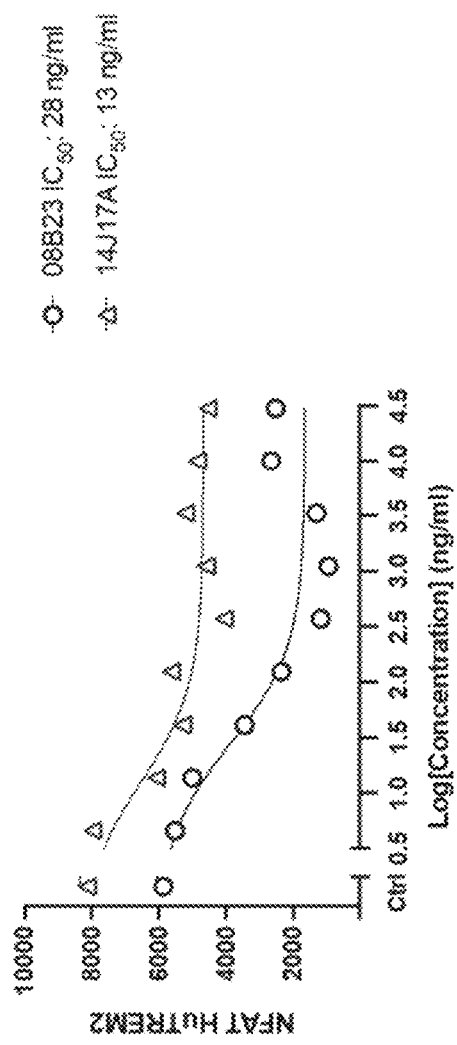

Example 3. Dose-Dependent Effects of Anti-TREM2 Antibodies on NFAT-Luciferase Reporter Activity Lead anti-TREM2 monoclonal antibodies (mAbs) were tested using the NFAT-Luciferase reporter assay described in Example 1. For these assays, 30 μg/ml to 5 ng/ml (3:1 serial dilution) of anti-TREM2 mAbs were directly mixed with BW5147.G.1.4 NFAT-Luciferase reporter cells, and their effects on the NFAT-Luciferase reporter activity were measured and analyzed. FIG. 3A shows the dose-dependent responses from agonist antibodies 02M10, 03O05, 04H08, 05O07, 22A17 and 23E21-2, and FIG. 3B shows results with inverse agonist antibodies 08B23 and 14J17. Each of the agonist antibodies increased NFAT-Luciferase reporter activity in a dose-dependent manner (FIG. 3A), while each of the inverse agonist antibodies decreased NFAT-Luciferase reporter activity from the baseline in a dose-dependent manner (FIG. 3B). The $EC_{50}$ for agonist antibodies 02M10, 03O05, 04H08, 05O07, 22A17 and 23E21-2 was calculated to be 0.5 µg/ml, 0.5 µg/ml, 6.9 µg/ml, 0.2 µg/ml, 0.04 µg/ml and 0.7 µg/ml respectively, as shown in FIG. 3A. The $IC_{50}$ for inverse agonist antibodies 08B23 and 14J17 was calculated to be 28 ng/ml and 13 ng/ml respectively, as shown in FIG. 3B.

Example 4. Effects of Anti-TREM2 Antibodies on the Level of Soluble TREM2 (STREM2) in Mouse Serum and Brain Wild-type B6SJLF1/J mice Anti-TREM2 agonist antibodies 02M10, 03O05, 04H08, 05O07, 22A17 and 23E21-2 were injected intraperitoneally (i.p.) into B6SJLF1/J mice (The Jackson Laboratory, Strain #: 100012, RRID:IMSR_JAX:10001) at a dose of 10 mg/kg. Serum and brain tissue were collected at 4 hours, 1 day, 3 days and 7 days after injection. Whole blood was allowed to clot at room temperature for 30 min before centrifugation and serum collection. Whole-animal perfusion with 1×PBS was performed before brain tissue collection. Brain tissue was homogenized in 2×-volumes (200 µl per 100 mg tissue) of 1× Tris-Buffered Saline (TBS) with protease inhibitor cocktail (Thermo Fisher Scientific, #78429) added using a BULLET BLENDER® 5E Gold tissue homogenizer (Next Advance, #BB5E-AU) with zirconium oxide beads (Next Advance, #PINK5E100). Homogenate was transferred to another tube and centrifuged at 20,000×g for 20 min at 4° C. to remove the pellet. The supernatant was saved as brain lysates. Measurement of soluble TREM2 (sTREM2) in mouse serum and brain lysate was performed by a sandwich ELISA developed in house. Briefly, a commercially available Human/Mouse TREM2 Antibody (R&D Systems, #MAB17291) was coated as a capture antibody in 96-well plates overnight. Diluted sTREM2 standard (Recombinant Mouse TREM2 His-tag Protein (R&D Systems, #9228-T2)), serum, or brain lysate were incubated with the blocked 96-well plates to allow capture of sTREM2. Then, the captured sTREM2 was detected using Mouse TREM2 Biotinylated Antibody (R&D Systems, #BAF1729) as the detection antibody. Finally, the detection antibody was quantified using Streptavidin-HRP (R&D Systems, #DY998). Color was developed with ELISA TMB Stabilized Chromogen (Invitrogen, #SB02) followed by stop solution (1M $H_2SO_4$). Absorbance was then read at $OD_{450\ nm}$. The data was analyzed with Graphpad Prism 10 (graphpad.com) using a four-parameter logistic (4-PL) curve-fit, and sTREM2 concentration was interpolated. Brain sTREM2 concentration was normalized with brain weight. As shown in FIG. 4, anti-TREM2 antibody 02M10 is an antibody that only binds HuTREM2 (HuTREM2-specific antibody), and therefore it had no effect on sTREM2 levels in wild-type B6SJLF1/J mouse serum and brain as expected, and was used as a control. Antibody 04H08 also showed no effect on sTREM2 level in serum (FIG. 4A) or brain (FIG. 4B). In contrast, four (4) anti-TREM2 antibodies 03O05, 05O07, 22A17 and 23E21-2 all significantly elevated sTREM2 level in serum (FIG. 4A) and brain (FIG. 4B).

Human TREM2 Knock-In (B-hTREM2) Mice

As described above and shown in FIG. 4, agonist anti-TREM2 antibodies 03O05, 05O07, 22A17 and 23E21-2 significantly increased sTREM2 level in the serum and brain of B6SJLF1/J mice, most likely by promoting TREM2 shedding. Effects of anti-TREM2 antibodies on human TREM2 were determined using a human TREM2 knock-in mouse, named B-hTREM2 (Biocytogen (biocytogen.com), #111176), whose exons 1-5 and 3'UTR of mouse TREM2 gene that encode the full-length protein were replaced by human TREM2 exons 1-5 and 3'UTR. Expression of human TREM2 replacing mouse TREM2 was confirmed at both RNA and protein levels in B-hTREM2 mice. B-hTREM2 mice were dosed at 30 mg/kg. Serum samples were collected at pre-dosing, 4 hours, 1 day, 3 days, and 7 days post injection, brain lysates were collected and processed at day 7 post injection as described above, and sTREM2 was quantified using Human TREM2 DUOSET® ELISA development kit (R&D Systems, #DY1828-05). As shown in FIG. 5A, antibodies 03O05, 22A17 and 23E21-2 consistently elevated serum sTREM2, while antibody 02M10 slightly suppressed serum sTREM2 in B-hTREM2 mice. In contrast, only antibody 03O05 significantly increased sTREM2 levels in the brains of B-hTREM2 mice, whereas antibodies 02M10, 22A17 and 23E21-2 had no effect.

In summary, anti-TREM2 antibodies 03O05, 05O07, 22A17 and 23E21-2 significantly increased both serum and brain sTREM2 levels in wild-type mouse, however, their effects on human TREM2 shedding varied, as demonstrated in B-hTREM2 mice. While all 03O05, 22A17 and 23E21-2 were able to increase serum sTREM2 levels in B-hTREM2 mice, only 03O05 significantly increased sTREM2 levels in the brains of B-hTREM2 mice. The distinct effects of anti-TREM2 antibodies on human sTREM2 compared to mouse sTREM2 are likely attributable to significant differences in antibody affinity towards human TREM2 versus mouse TREM2.

Example 5. Long-Term Efficacy Study of Anti-TREM2 Antibodies in 5×FAD Mice

5×FAD transgenic mice overexpress human amyloid beta precursor protein (APP) with the Swedish (K670N, M671L), Florida (I716V), and London (V717I) Familial Alzheimer's Disease (FAD) mutations and human presenilin 1 (PSEN1) with two FAD mutations, M146L and L286V. These mice develop many AD-related phenotypes at a relatively early age. Here we used 5×FAD mice as a mouse model of Alzheimer's disease (AD) to evaluate and compare the long-term efficacy of anti-TREM2 antibodies 03O05, 05O07, and a reference antibody (rfmAb). 5×FAD mice in B6SJLF1/J background (The Jackson Laboratory (jax.org), MMRRC Strain #034840-JAX; RRID:MMRRC_034840-JAX) at 7 months of age were i.p. injected weekly with 30 mg/kg of anti-TREM2 antibodies for 12 weeks. Naïve B6SJLF1/J mice (wild-type, WT) at the same age were used as the control. There were 13-15 mice in each group. Serum samples were collected at pre-dosing, 2, 7, 14, 21, 56, and 79 days after the first injection. Mice were perfused with ~15 mL 1×PBS and brain tissue were collected at 2 days after the last injection (79 days after the first injection). Half cerebrum was homogenized to evaluate amyloid beta (Aβ) fragments $Aβ_{1-40}$ and $Aβ_{1-42}$, and sTREM2 levels. The other half of the cerebrum was fixed and cryo-sectioned. Immunohistostaining was performed to evaluate levels of filamentous and inert plaque (with anti-Aβ antibody 6E10), microglia (with anti-IBA1 antibody), and microglia-mediated phagocytosis (with anti-CD68 antibody).

Levels of sTREM2 in serum were measured (FIG. 6A) using the sandwich ELISA developed in house as described in Example 4. Serum sTREM2 levels in untreated WT mice were barely detectable, while in vehicle-treated 5×FAD mice serum sTREM2 levels were around 10 ng/mL during the treatment period. Treatment with anti-TREM2 antibodies 03O05 and 05O07 significantly increased serum sTREM2 levels, consistent with results obtained with B6SJLF1/J and B-hTREM2 mice (Example 4). Notably, 30 mg/kg weekly dosing of 03O05 and 05O07 was capable of maintaining a significantly elevated serum sTREM2 levels throughout the treatment course.

Half cerebellum of the PBS-perfused mice was homogenized in 600 µL of 1×TBS with protease and phosphatase inhibitor cocktail using a BULLET BLENDER® tissue homogenizer with zirconium oxide beads as described above in Example 4. 250 µL of the homogenate was centrifuged at 20,000×g for 20 min at 4° C., and the supernatant is the TBS-soluble fraction. 250 µL of the remaining homogenate was added with equal volume of RIPA buffer (Thermo Scientific, #89901) and centrifuged at 20,000×g for 20 min at 4° C., and the supernatant is the RIPA-soluble fraction. The pellet (RIPA-insoluble fraction) was resuspended in 100 µL of 8 M guanidine-HCl and incubated at room temperature for 2 h. The resuspension was diluted by adding 400 µL of 1×TBS and centrifuged again at 20,000×g for 20 min at 4° C., and the supernatant is the guanidine soluble fraction.

sTREM2 levels in the TBS-soluble fraction were measured (FIG. 6B) using the method described above in Example 4. Brain sTREM2 levels from vehicle-treated 5×FAD mice were significantly higher than that of WT mice. Treatment of 5×FAD mice with antibody 03O05 or antibody 05O07 significantly increased brain sTREM2 levels as compared with vehicle treatment (FIG. 6B).

Concentrations of anti-TREM2 antibodies in serum and TBS-soluble fraction of brain at 2 days after the last injection were also measured and brain penetration of those antibodies in 5×FAD mice was calculated, as shown in Table 3.

TABLE 3

Serum concentration, brain concentration, and brain penetration after chronic administration of antibody 03O05 and antibody 05O07

|  | 03O05 | 05O07 |
| --- | --- | --- |
| Serum concentration (µg/ml) | 250 | 100 |
| Brain concentration (µg/g) | 0.428 | 0.218 |
| Brain penetration (%) | 0.17 | 0.22 |

Figure 6C:
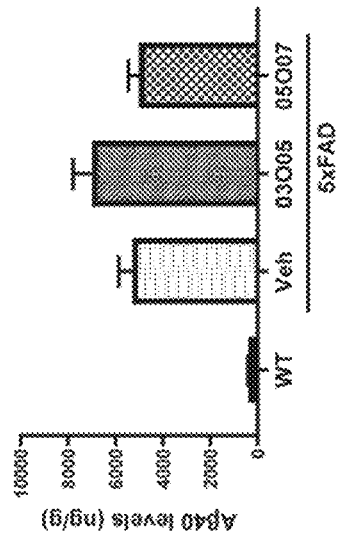
Figure 6E:
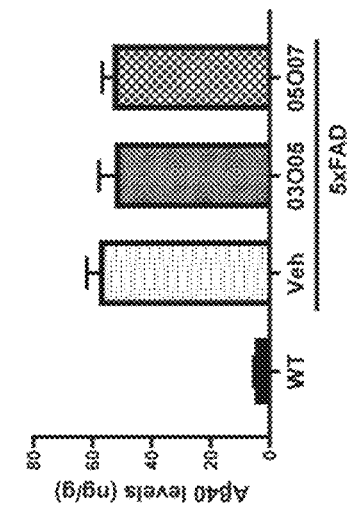
Figure 6D:
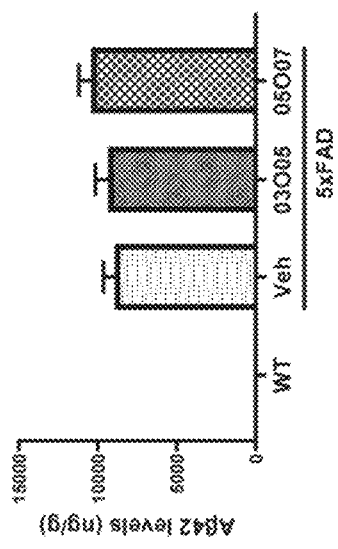
Figure 6F:
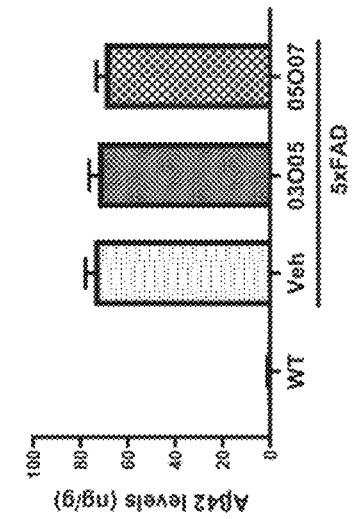

$A\beta_{1-42}$ levels in the RIPA-soluble fraction and guanidine-soluble fraction of brain were measured using Human Amyloid β (aa1-42) QUANTIKINE® ELISA immunoassay kit (R&D Systems, #DAB142) as shown in FIG. 6C-D. Treatment of 5×FAD mice with anti-TREM2 antibodies 03O05 and 05O07 did not affect $A\beta_{1-42}$ levels in the Guanidine-soluble fraction or RIPA soluble fraction of brain. The $A\beta_{1-40}$ levels in the RIPA-soluble fraction and Guanidine-soluble fraction were measured using Human Amyloid β (aa1-40) QUANTIKINE® ELISA immunoassay kit (R&D Systems, #DAB140) as shown in FIG. 6E-F. Treatment of 5×FAD mice with anti-TREM2 antibody 03O05 or anti-TREM2 antibody 05O07 did not affect $A\beta_{1-40}$ levels in the guanidine-soluble fraction of brain (FIG. 6E) or the RIPA-soluble fraction of brain (FIG. 6F).

The other half of the cerebrum was fixed in 4% PFA in 1×PBS for 1 day and incubated in 1×PBS for another day before sending to NeuroScience Associates (neuroscienceassociates.com, Knoxville, TN) for immunohistostaining (IHC). NeuroScience Associates treated the brain tissue overnight with 20% glycerol and 2% dimethylsulfoxide to prevent freeze artifacts. The specimens were then embedded in a gelatin matrix using MULTIBRAIN®/MULTICORD® Technology to embed multiple tissues together in a solid matrix to be processed as a single unit (NeuroScience Associates, neuroscienceassociates.com). Every 25 brain hemispheres were embedded together into a single block. The blocks were rapidly frozen, after curing by immersion in 2-Methylbutane chilled with crushed dry ice and mounted on a freezing stage of an AO 860 sliding microtome. The blocks were freeze-sectioned at 30 µm in the Coronal plane through the cortical section of the mouse brain hemisphere. The sections were collected into series of 24 containers with Antigen Preserve solution (50% PBS pH7.0, 50% Ethylene Glycol, 1% Polyvinyl Pyrrolidone). IHC with anti-Abeta antibody 6E10 (Biolegend, #803001), anti-IBA1 antibody (FUJIFILM Wako, #019-19741), and anti-CD68 (Biolegend, #FA-11) was performed through Bregma-1.00 mm to Bregma-3.70 mm of the cerebrum on 7 sections spaced at ~450 µm intervals. The whole slides were imaged under a wide-field fluorescent microscope (Slide View VS200, Olympus). Image analysis was conducted using QuPath software for image analysis (QuPath version V0.4.4 (downloaded on Oct. 24, 2023) and V0.5.5 (downloaded on Dec. 5, 2023), qupath.github.io). Briefly, the total area of each brain section was outlined and measured. The positive area of each marker under a certain threshold was measured. For staining with 6E10, two thresholds were set to measure total plaque (lower threshold) and inert plaque (higher threshold). Percentage area of each marker was calculated as positive area divided by total area. The percentage area of 7 brain sections in each brain was measured and averaged. 13 to 15 brains for each treatment group were analyzed.

Figure 6G:
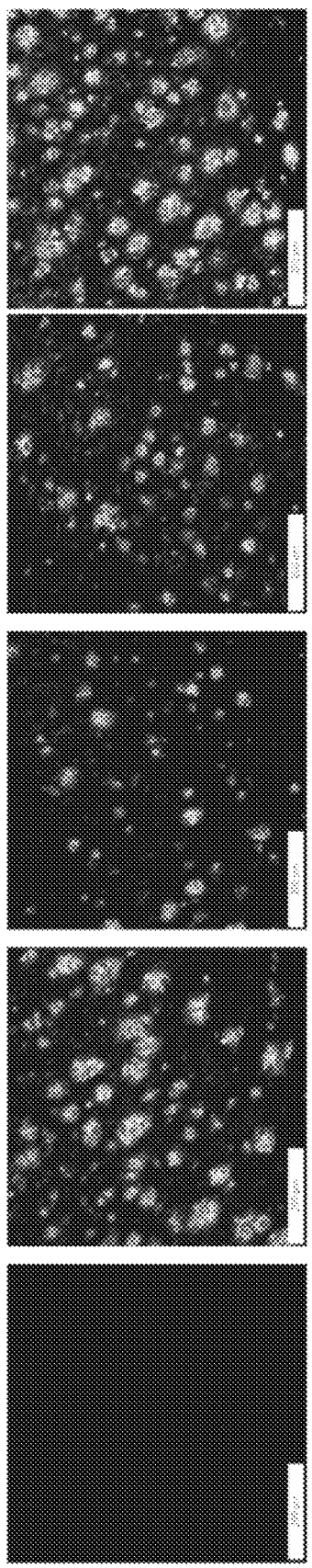
Figure 6H:
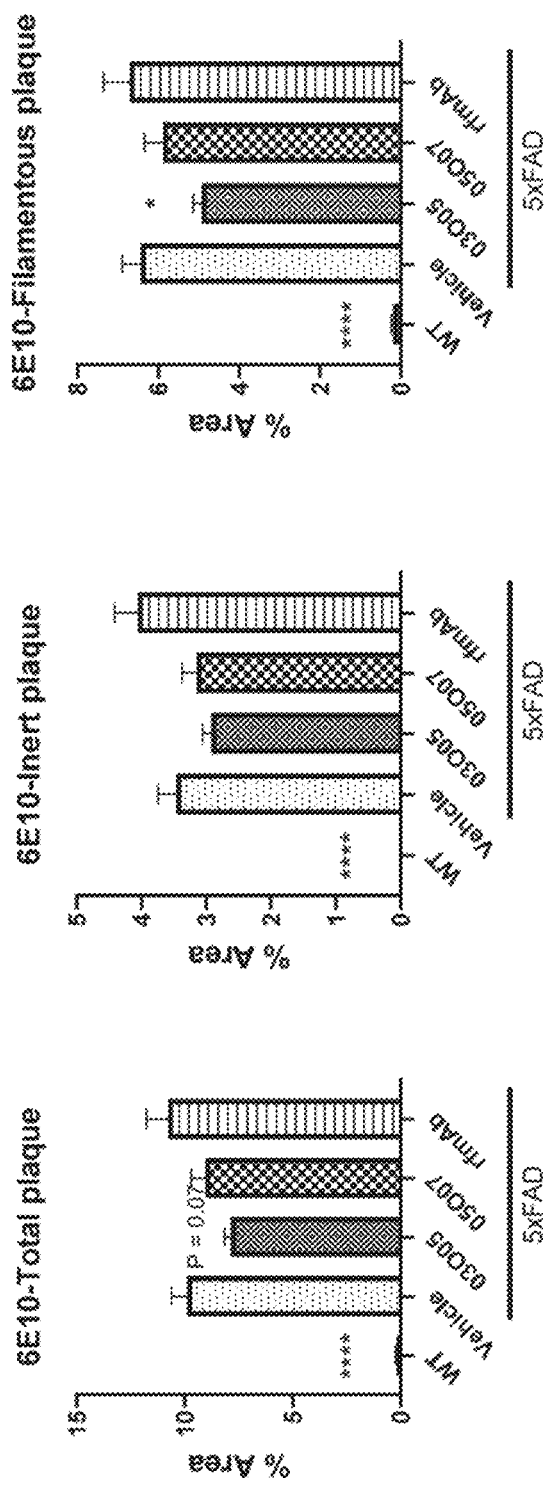
Figure 6I:
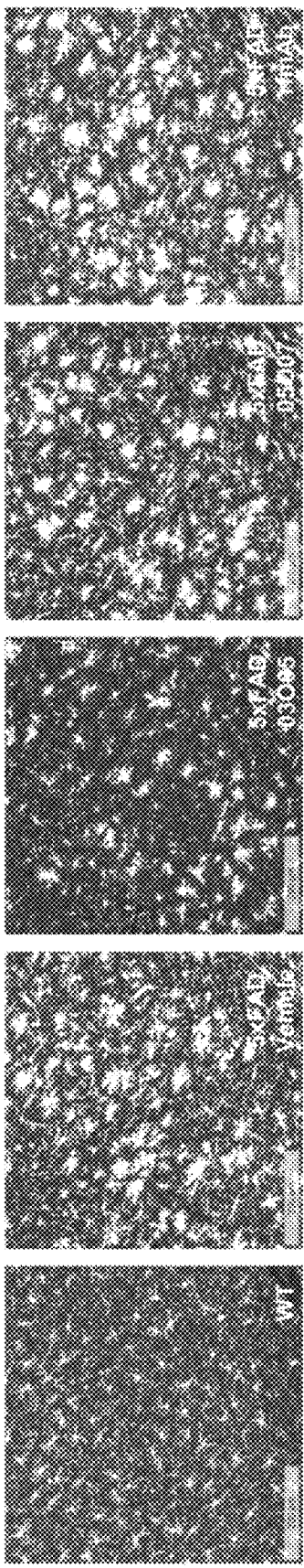
Figure 6J:
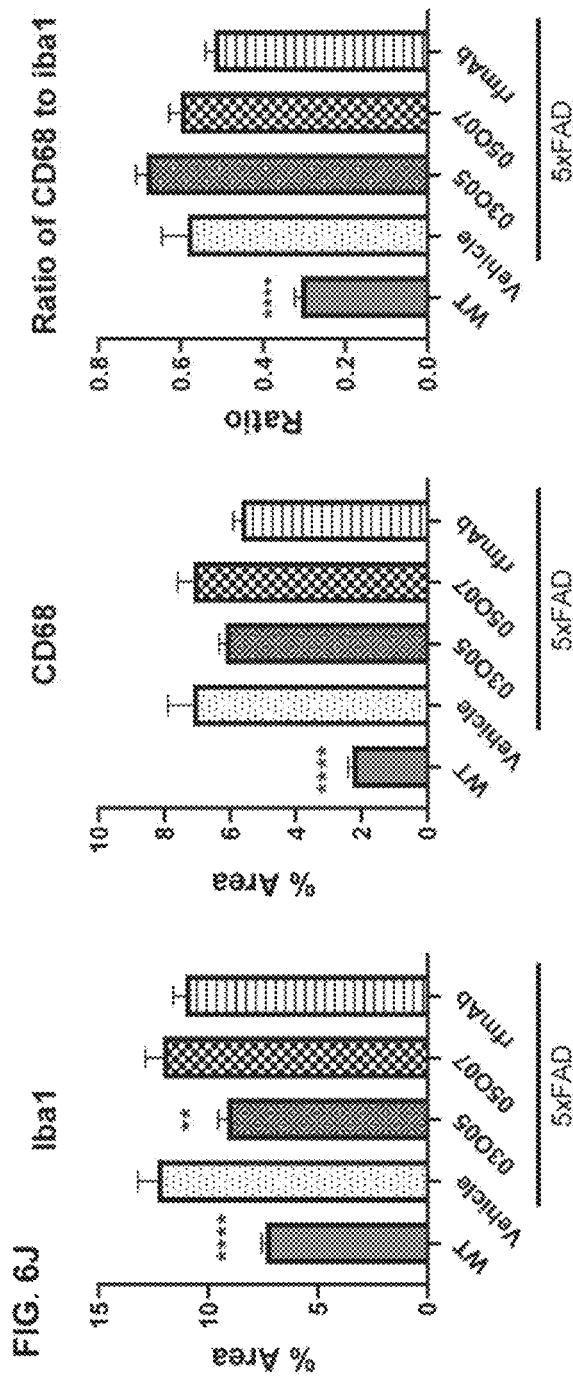

Analysis of the images showed that treatment with antibody 03O05 significantly reduced levels of filamentous plaque (% area of total plaque minus % area of inert plaque) but not inert plaque in the brain as shown in FIG. 6G-H. The levels of total Abeta (Aβ) plaque were also reduced in the brain of 03O05 treated mice. However, there was no statistically significant difference between 03O05 treated and vehicle treated mice (P=0.07, FIG. 6H). The other two antibodies that were tested, 05O07 and rfmAb, had no effect on Abeta (Aβ) plaque levels in the brain. Levels of iba-1 labelled microglia, an indication of microglia-mediated inflammation in the brain, was significantly reduced in the anti-TREM2 antibody 03O05 treated mice as shown in FIG. 6I-J, while 05O07 and rfmAb had no effect on iba-1 labelled microglia levels in the brain. Levels of CD68, a marker of phagocytic microglia, were not significantly changed by anti-TREM2 antibodies 03O05, 05O07 or rfmAb. We then calculated the ratio of CD68 signal to iba1 signal, which reflects the proportion of phagocytic microglia in all microglia population. The result showed that anti-TREM2 antibody 03O05 treatment increased the proportion of phagocytic microglia in the brain, as compared with vehicle treatment. However, the increase did not reach a significant difference (FIG. 6J). In summary, IHC results suggest that chronic treatment of 5×FAD mice with anti-TREM2 antibody 03O05 reduced microglia-mediated inflammation, promoted microglial phagocytosis and reduced levels of toxic filamentous plaque in the brain.

Example 6. Effects of Anti-TREM2 Antibodies on Myelin Phagocytosis Using Bone Marrow-Derived Macrophages (BMDM)

Myelin was purified from twelve (12) 8-week-old C57BL/6J mice (The Jackson Laboratory, Strain #:000664, RRID:

IMSR_JAX:000664). The brains were placed in 10 ml of 0.32 M sucrose (20 mM Tris-Cl, 2 mM EDTA, pH 7.45), roughly chopped up and transferred to a 40 ml Dounce homogenizer (Kontes). The tissue was homogenized by five (5) strokes using the loose pestle and five (5) strokes on the tight pestle, until the mixture appeared homogenized and no solid tissue remained. The homogenate volume was brought up to 78 ml 0.32 M sucrose. Six (6) ultracentrifuge tubes were prepared with 13 ml of 0.83 M sucrose (20 mM Tris-Cl, 2 mM EDTA, pH 7.45) in each tube. Thirteen (13) ml of the diluted homogenate was slowly layered on top of the 0.83 M sucrose in each tube. The samples were centrifuged at 100,000×g (27,000 rpm in a Beckman SW28 rotor) for a total of 45 min at 4° C., with acceleration and deceleration set to zero. The cloudy interphase was collected using a plastic Pasteur pipette, resuspended in 150 ml Tris buffer (20 mM Tris-Cl, 2 mM EDTA, PH 7.45), distributed to six (6) ultracentrifuge tubes and centrifuged at the same setting as described above. Then, a wash step was repeated once more. The pellets were resuspended in 6 ml dPBS, divided into six (6) pre-weighed 1.5 ml centrifuge tubes, and centrifuged at 22,000 g for 15 min at 4° C. The pellets were then weighed and resuspended at 100 mg/ml myelin in dPBS.

PHRODO™ Green (pHrodo™ Green) pH-sensitive dye (Thermo Fisher, #P35369) was used to label purified myelin. 50 mg myelin pellet was centrifuged at 22,000 g for 15 min at 4° C. and resuspended in 750 µl PBS pH 8. All the subsequent centrifugation was performed at the same setting. 75 µl DMSO (dimethyl sulfoxide) was added to one tube of 500 µg pHrodo™ Green to make 10 mM stock. Then, 750 µl myelin was added to the 75 µl pHrodo™ Green solution and the tube was incubated in the dark for 1 hr at room temperature. Afterwards, the labeled myelin was washed three times and resuspended in 1 ml PBS pH 7.2, aliquoted and stored in −80° C. until use.

Mouse bone marrow-derived macrophages (BMDMs) were differentiated using L929-conditioned medium. L929 cells (ATCC (atcc.org), ATTC #CCL-1) were plated at $5.0 \times 10^5$ cells/15 ml in T75 polystyrene tissue culture treated flask (NEST, #708003) or $1.67 \times 10^6$ cells/35 ml T175 polystyrene tissue culture treated (ThermoFisher Scientific, #159910) flasks in DMEM (Dulbecco's Modified Eagle Medium, Gibco, #11995) with 10% FBS (fetal bovine scrum; Gibco, #10082-147) and penicillin/streptomycin (Gibco, #15070063). The cells were cultured for 5 days without replenishing the medium. The medium was collected, centrifuged at 200×g for 10 min and stored in −20° C. until use.

C57BL/6J mice (The Jackson Laboratory, Strain #: 000664, RRID:IMSR_JAX:000664), 8 weeks of age, were euthanized with carbon dioxide followed by cervical dislocation. Femur and tibia bones were isolated. After the tips of the bones were trimmed, bone marrow (BM) was flushed out with a syringe and 23G-needle loaded with PBS and 2% FBS. Next, the BM was passed through the same needle 3 times and then through a 70 µm cell strainer to dissociate the cells. One volume of RBC lysis buffer (Invitrogen, #00-4333-57) was added and incubated for 5 min on ice. The cells were then centrifuged at 350 g and resuspended in BMDM culture medium, which consists of IMDM (Iscove's Modified Dulbecco's Medium; Cytiva, #SH30228.01) with 10% FBS and 15% L929-conditioned medium. $5 \times 10^6$ cells in 10 ml BMDM culture medium per 100 mm non-treated petri dish were cultured for a total of 7 days. The medium was replenished once after the first 3 days. On day 7, the attached cells were incubated in HBSS with 5 mM EDTA for 35 min at 4° C., then rinsed off using a P1000 micropipette.

Figure 7A:
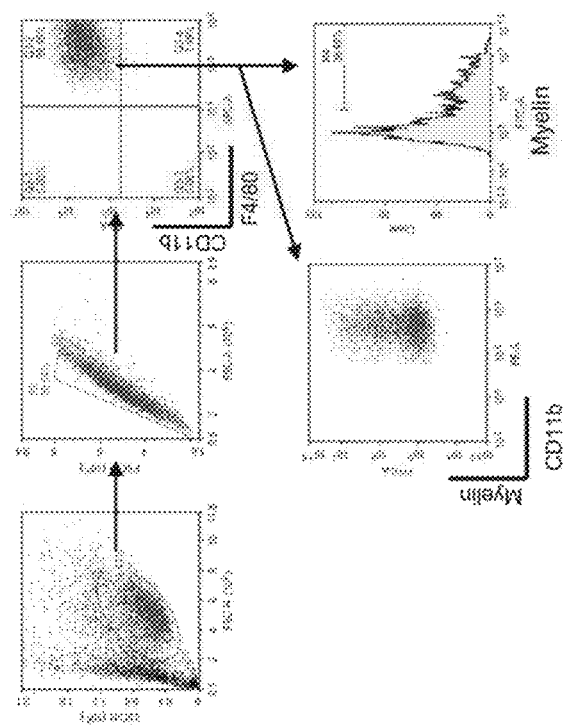
FIGS. 7A-7C show effects of anti-TREM2 antibodies on myelin phagocytosis using BMDM (bone marrow-derived macrophage). Myelin positive BMDM was gated as shown in FIG. 7A. Representative histogram plots showing myelin phagocytosis are shown in FIG. 7B and myelin phagocytosis from two (2) independent experiments are graphed in FIG. 7C. *$P<0.05$, using one-way or two-way ANOVA with Dunnett's multiple comparison adjustment.
Figure 7B:
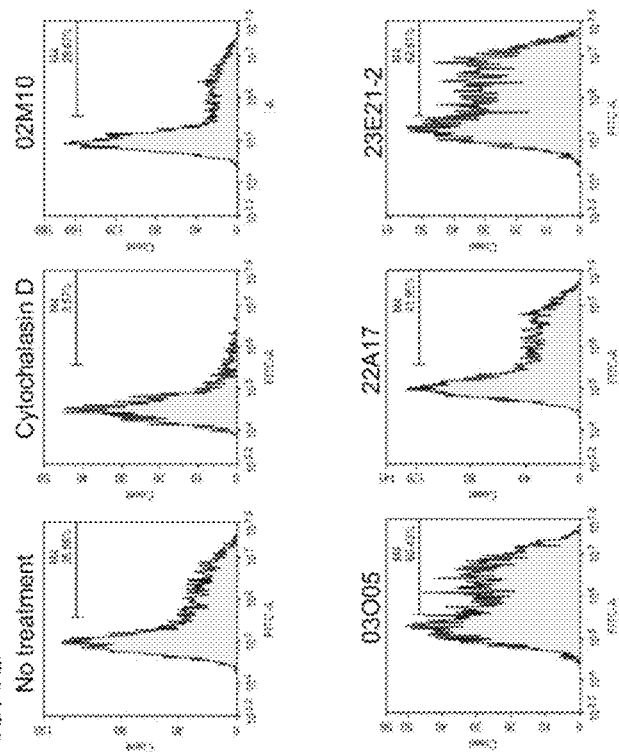
Figure 7C:
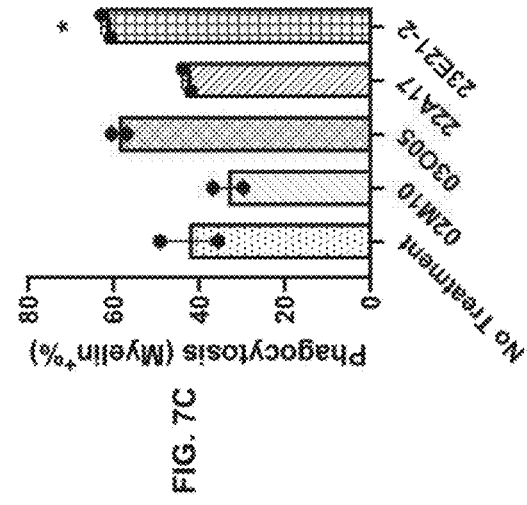

For the phagocytosis assay, differentiated BMDMs were washed and resuspended in IMDM with 10% FBS. $1 \times 10^6$ cells were plated per well in a 24-well plate and treated with 30 nM agonist anti-TREM2 antibodies 02M10, 03O05, 22A17 or 23E21-2 overnight. The next day, 1 µl labeled myelin was added to each well, and the plate was cultured for another 24 hrs. As a negative control, 10 µM cytochalasin D (Millipore-Sigma, #C8273) was added to the wells 30 min prior to antibody treatment. After 24 hrs of myelin treatment, the cells were detached by incubating with Accutase (Corning, #25-058-CI) for 5 min at 37° C. Next, the samples were stained with anti-CD11b PE (Biolegend, #101207) and anti-F4/80 APC (Biolegend, #123116), each at 1:200 dilution, for 20 min on ice. Data was acquired on a NOVO-CYTE® Flow Cytometer. The percentage of myelin-positive cells among the $CD11b^+F4/80^+$ population was gated as shown in FIG. 7A. Results are shown in FIG. 7B-C., where anti-TREM2 antibody 02M10 slightly decreased myelin phagocytosis but did not reach statistical significance, anti-TREM2 antibody 03O05 increased myelin phagocytosis but did not reach statistical significance, anti-TREM2 antibody 22A17 had no effect on myelin phagocytosis, and anti-TREM2 antibody 23E21-2 significantly increased myelin phagocytosis.

Example 7. In Vivo Effect of Anti-TREM2 Antibody 03O05 in the Cuprizone Mouse Model of Multiple Sclerosis Bis(cyclohexanone) oxaldihydrazone, commonly known as cuprizone, is a copper chelator that causes demyelination in the corpus callosum in the time course of 3-5 weeks when administered through rodent chow. When cuprizone is subsequently withdrawn from food, remyelination occurs in the time span of approximately a week. Cuprizone is a commonly chosen multiple sclerosis (MS) model for investigation of demyelination and remyelination processes, as it involves macrophage and microglia activation but not infiltration of peripheral immune cells. Here we used the cuprizone demyelination model in wild-type C57BL/6 mice (The Jackson Laboratory, Strain #:000664; RRID:IMSR_JAX: 000664) to evaluate the efficacy of anti-TREM2 antibody 03O05. Eight-week-old C57BL/6 male mice were fed with 0.2% cuprizone diet (Harlan-Teklad, TD.140800; 0.2% bis (cyclohexanone) oxaldihydrazone in standard diet TD.140803) for a total of 4 weeks. Fresh chow was provided every Monday, Wednesday, and Friday to ensure cuprizone freshness. The mice were treated with 30 mg/kg anti-TREM2 antibody 03O05 or DPBS vehicle through weekly i.p., injection starting at the beginning of cuprizone diet. After 4 weeks of cuprizone and antibody/vehicle treatments, the mice were further divided into 3 subgroups. One group was euthanized at the end of 4-week ("4 weeks") for tissue analysis. Another group was switched back to regular chow for the process of remyelination for 3 days ("4+0.5 weeks") before euthanasia. The last group was switched back to regular chow for 7 days ("4+1 weeks") before euthanasia. There were 8 mice per group. Healthy, age and sex matched C57BL/6 mice that were never fed with cuprizone diet were used as healthy controls.

At the end of the study, the mice were perfused with 15 mL PBS followed by 15 mL 4% paraformaldehyde (PFA) in PBS. Whole brain was isolated and incubated in 4% PFA in PBS for 24 h at 4° C. before switching to PBS. The tissues were sent to Neuroscience Associates (neuroscienceassociates.com, Knoxville, TN) for immunostaining. Upon receiving the tissues, Neuroscience Associates trimmed the tissues to yield the cerebrum portion. 25 mouse brains were embedded together per block, into 2 blocks using MULTIBRAIN® technology (Neuroscience Associates, neuroscienceassociates.com) to embed multiple tissues together in a solid matrix to be processed as a single unit. The brains were freeze-sectioned at 30 µm in the coronal plane and collected into cups containing antigen preserve solution. The first series of 24 cups collected the tissue through the cortex less area of interest (AOI). The second series of 5 cups collected the tissue through the AOI, which is ~1.5 mm +/− of Bregma −1.07.

The following stains were performed through the AOI on every 5th section spaced at 150 µm intervals, yielding 32 slides per block: staining for degraded Myelin Basic Protein (dMBP) using an antibody that binds to Myelin Basic Protein (MBP) epitopes that are exposed after myelin degradation (Sigma-Aldrich, #ab5864) and staining for ionized calcium-binding adaptor molecule 1 (Iba1) using an AIF-1/Iba1 antibody (Novus, #NB100-1028). The whole slides were imaged under a wide-field fluorescent microscope (Slide View VS200, Olympus). Image analysis was conducted using QuPath software, V0.5.5 (downloaded on Dec. 5, 2023, qupath.github.io). For microglial analysis, the section closest to Bregma −1.07 of each brain was selected. For each brain, medial corpus callosum was manually outlined. From the outlined area, the positive area above a certain threshold was measured. The percentage area over total area was calculated and averaged. For the analysis of degraded MBP, the whole brain section was first outlined. The images were divided into numerous supertiles, and each tile a pixel threshold was measured. The tiles without any pixels above the threshold were discarded, and the ones with pixels above the threshold were used to calculate average fluorescence intensity.

Our image analysis revealed no differences between vehicle- and anti-TREM2 antibody 03O05-treated mice at 4 weeks and 4+1 weeks (FIG. 8). This is as expected because cuprizone-induced demyelination is likely not dependent on microglia and macrophage activity, and at 4 weeks the mice had not been off the diet to allow remyelination. Conversely, because remyelination after cuprizone withdrawal usually completes within 1-2 weeks, vehicle-treated mice have already completely remyelinated at 4+1 weeks, so any effect on anti-TREM2 antibody treatment may not be observed. Consistent with this, our analysis revealed that at 4+0.5 weeks when remyelination is still an ongoing process, anti-TREM2 antibody 03O05-treated mice showed greatly decreased amount of degraded MBP compared to vehicle (FIG. 8A-B). While there is a trend towards lower Iba-1 intensity at 4+0.5 weeks, the difference was not statistically significant (FIG. 8C-D). Taken together, the cuprizone study suggests that anti-TREM2 antibody 03O05 treatment facilitates myelin repair due to increased phagocytosis of myelin debris (increased myelin debris clearance).

Example 8. Epitope Mapping of Anti-TREM2 Antibody 03O05 on Human TREM2 Protein

This work was carried out under contract by Immuto Scientific (immutoscientific.com, Madison, WI) using Immuto's proprietary radical labeling and protease digestion methods followed by solvent accessibility determination using LC-MS/MS acquisition. First, antibodies (anti-TREM2 antibody 03O05 and a non-binding control antibody) and antigen (HuTREM2-IgG1Fc (SEQ ID NO: 141)) were buffer-exchanged into Immuto's proprietary radical labeling buffer using a 10 kDa MWCO PES ultrafiltration concentrator (PIERCE™ Protein Concentrator PES; thermofisher.com) and protein concentrations were quantified. Antibody and antigen were then mixed at a molar ratio of 1:2 for 30 min at room temperature. Upon antibody and antigen incubation, Immuto labeling reagents (trifluoromethyl (·CF3), hydroxyl (·OH) and acetyl (·C3H3O)) were added and incubated for 50 min at room temperature. Later, samples were quenched and digested with either a specific protease cocktail for 16 h at 37° C., or a semi-specific protease cocktail for 3 h at 37° C. After digestion, samples were quenched with trifluoroacetic acid (TFA), subjected to solid phase extraction using C18 StageTips (C18 bonded silica solid phase extraction micropipette tips), and analyzed using data-dependent acquisition with an Orbitrap EXPLORIS™ 240 mass spectrometer (thermofisher.com). A 30-min chromatographic gradient from 2 to 40% acetonitrile with 0.1% formic acid was used for separation over a 1.7 mm, 15 cm×75 mm AURORA™ Elite TS C18 column from IonOpticks (ionopticks.com). A top-10 data-dependent acquisition was performed. MS1 parameters were as follows: 60K resolving power, scan range 350-1200 m/z, and normalized AGC target 100%. MS2 parameters were as follows: charge state 2-6, quadrupole isolation window 2 Da, HCD stepped collision energy 20/30%, maximum injection time 75 ms, and dynamic exclusion 6 sec. Data analysis was carried out first by searching raw data files against the HuTREM2 amino acid sequence using a proprietary database search engine. A list of expected modifications was utilized in the database search. Protease cleavage was defined as K, R, F, W, Y, M, L, H (except before proline), with semi-specificity allowed. Missed cleavages were set at 10, and a minimum peptide length of 4. Peptides were identified using MS and MS/MS spectra, setting a 1% false discovery rate (FDR) cutoff. Changes in solvent accessibility of HuTREM2 (fold change of normalized intensity of anti-TREM2 antibody 03O05: HuTREM2 against control antibody: HuTREM2) were determined for mapping binding interfaces. Statistical differences were generated for each residue using conventional LIMMA methods with p-values of ≤0.05 were considered as significant. A decrease in solvent accessibility of radical labeling suggested protection by anti-TREM2 agonist antibody 03O05 towards ECD of HuTREM2, and regions of contiguous unanimous protection were categorized as likely epitope regions. Results suggested discontinuous and conformational epitopes consisting of residues M41-W44 and S112-S116 of HuTREM2.

To validate these findings, individual residues within the protected regions were mutated, and the corresponding HuTREM2 variants were generated with mutations in the TREM2 ECD sequence, including HuTREM2 (M41A)-IgG1Fc (SEQ ID NO: 143), HuTREM2 (K42A)-IgG1Fc (SEQ ID NO: 144), HuTREM2 (W44A)-IgG1Fc (SEQ ID NO: 145), HuTREM2 (S112A)-IgG1Fc (SEQ ID NO: 146), HuTREM2 (H114A)-IgG1Fc (SEQ ID NO: 147), and HuTREM2 (S116A)-IgG1Fc (SEQ ID NO: 148). Binding kinetics were analyzed using BLI technology. As shown in sensorgrams (FIG. 9A-C), anti-TREM2 antibody 03O05 bound to wild-type HuTREM2-IgG1Fc (FIG. 9A) but failed to bind to HuTREM2 (M41A)-IgG1Fc (FIG. 9B) or HuTREM2 (W44A)-IgG1Fc (FIG. 9C), confirming M41 and W44 as critical residues for epitope recognition. In contrast, mutations at K42A, S112A, H114A and S116A had no effect on binding (data not shown), indicating these residues are likely not essential for anti-TREM2 antibody 03O05 binding. To further characterize the discontinuous and conformational nature of the epitope, the AlphaFold structure of HuTREM2 (AF-Q9NZC2-F1) was reviewed. Based on surface accessibility, single-point mutations were introduced to obtain additional antigen variants, including HuTREM2 (N68A)-IgG1Fc (SEQ ID NO: 149), HuTREM2 (L71A)-IgG1Fc (SEQ ID NO:150), HuTREM2 (F74A)-IgG1Fc (SEQ ID NO:151) and HuTREM2 (L89A)-IgG1Fc (SEQ ID NO:152). The HuTREM2-IgG1Fc fusions included signal peptide at positions 1-18, TREM2 ECD at positions 19-174, a linker at positions T175-G176, and IgG1Fc starting at position D177. BLI analysis revealed a complete loss of binding towards HuTREM2 (L89A)-IgG1Fc, suggesting L89 as another essential residue of epitope (FIG. 9D). Mutations at N68, L71 or F74 had no impact on anti-TREM2 antibody 03O05 binding (data not shown).

Figure 9E:
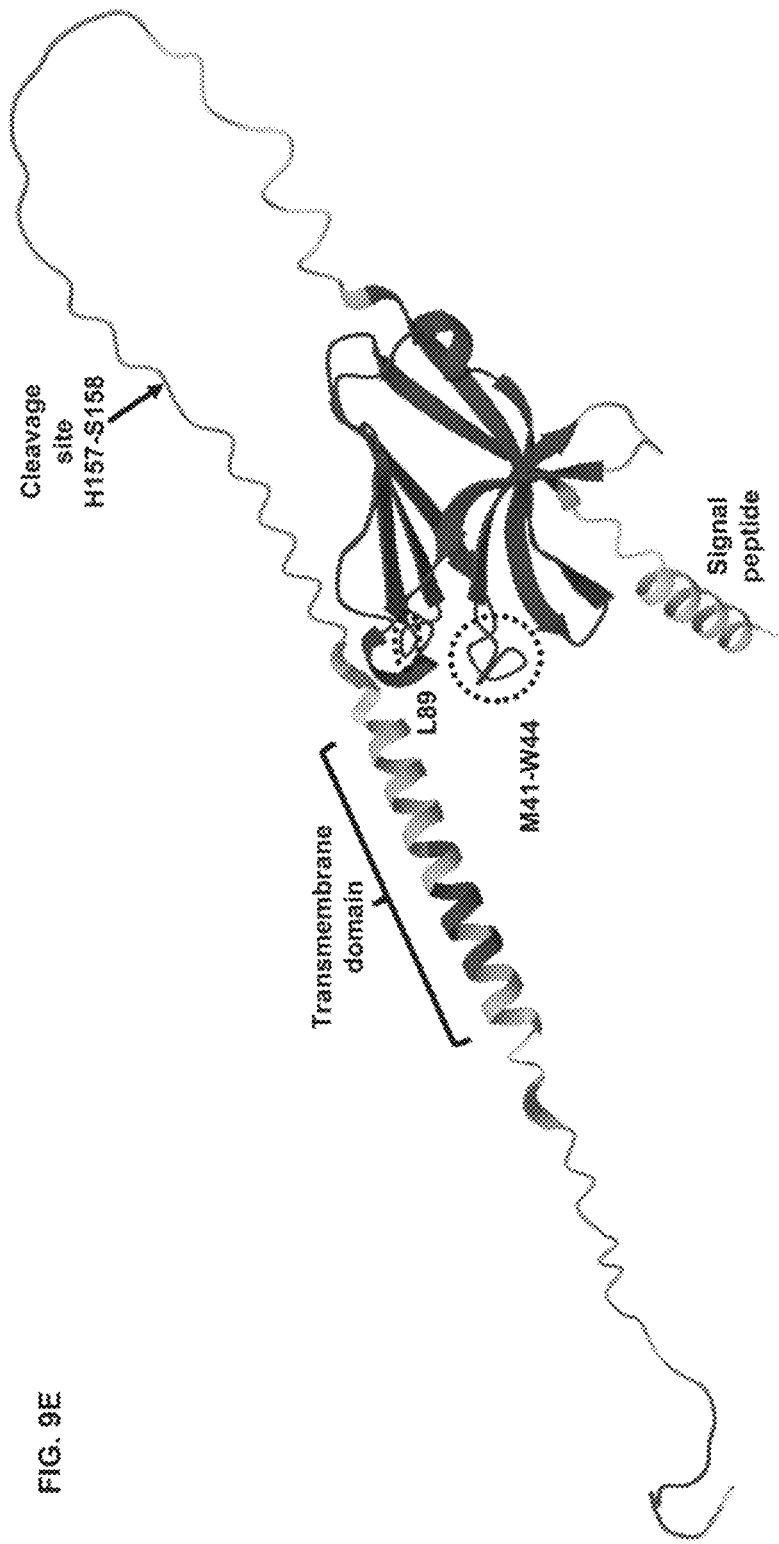

Taken together, using Immuto's proprietary epitope mapping platform and site-directed mutagenesis studies, we have identified a discontinuous, confirmational epitope on the HuTREM2 ECD recognized by the anti-TREM2 agonist antibody 03O05, comprising residues M41-W44 and L89 as demonstrated in FIG. 9E.

Example 9. Affinity Maturation of Anti-TREM2 Antibody 03O05

A fully human version of the anti-TREM2 antibody 03O05 (Hu03O05; incorporating the 03O05 VH/VL with human IgG1 constant regions (CH1-CH3) and human lambda light chain constant domain (CL)) demonstrated agonist activity toward human TREM2. However, binding studies revealed a significant species-dependent difference in affinity, with over a 30-fold reduction in affinity for human target (HuTREM2) compared to mouse target (MoTREM2). This differential binding may limit the utility of the antibody in mouse models, and it is important to evaluate whether improved binding affinity to HuTREM2 would correlate with improved functional activity.

An affinity maturation campaign was initiated under contract to generate Hu03O05 variants with enhanced affinity to huTREM2 by AvantGen (avantgen.com, San Diego, CA). A proprietary yeast surface display library comprising over $10^9$ unique clones was constructed using CDR-targeted mutagenesis informed by amino acid frequencies observed in natural human antibody repertoires. Library screening was performed using magnetic-activated cell sorting and fluorescence-activated cell sorting to isolate clones exhibiting improved target antigen binding affinity while maintaining antigen binding specificity. Selected antibody clones were expressed, purified, and their binding kinetics were reassessed using BLI. Multiple variants demonstrating up to 10-fold improvement in $K_{off}$ were identified. In total, 6 antibody clones with varying degrees of improved affinity were selected (Table 4), and the corresponding mutations within CDRs are listed in Tables 5-6. MB-5 (1-G10) contains two additional framework mutations outside the CDRs, with one in the heavy chain (SEQ ID NO: 121) and one in the light chain (SEQ ID NO: 126). These non-CDR mutations occur rarely and likely arose as random variations during affinity maturation.

TABLE 4

Summary of anti-TREM2 clones with $k_{off}$ improvement

| ANTI-TREM2 ANTIBODY | Total CDR mutations | $K_{off}$ improvement |
|---|---|---|
| Hu03O05 | 0 | N/A |
| MB-9 | 5 | 10x |
| MB-11 | 6 | 6x |
| MB-23 | 4 | 5x |
| MB-4(1-E9) | 6 | 1x |
| MB-5(1-G10) | 5 | 10x |
| MB-6(2-E6) | 5 | 4x |

TABLE 5

Mutations (underlined) within heavy chain (HC) variable region CDRs

| ANTI-TREM2 ANTIBODY | HC CDR1 | HC CDR2 | HC CDR3 |
|---|---|---|---|
| 03O05 VH (SEQ ID NO: 11) | GYTFTDYF (SEQ ID NO: 12) | FNPNSGGS (SEQ ID NO: 13) | ARNGEVPFDN (SEQ ID NO: 14) |
| MB-9 VH (SEQ ID NO: 81) | GYNFTDYF (SEQ ID NO: 82) | FNPYSGAS (SEQ ID NO: 83) | ARSGEVPFDN (SEQ ID NO: 84) |
| MB-11 VH (SEQ ID NO: 91) | GYNFTDYF (SEQ ID NO: 92) | FNPYSGAS (SEQ ID NO: 93) | ARNGEVPFDN (SEQ ID NO: 94) |
| MB-23 VH (SEQ ID NO: 101) | GYTFTDYF (SEQ ID NO: 102) | FNPYSGES (SEQ ID NO: 103) | ARNGEVPFDN (SEQ ID NO: 104) |
| MB-4(1-E9) VH (SEQ ID NO: 111) | GYNFTDYF (SEQ ID NO: 112) | FNPYSGES (SEQ ID NO: 113) | ARNGEVPFDN (SEQ ID NO: 114) |
| MB-5(1-G10)* VH (SEQ ID NO: 121) | GYTFTDYF (SEQ ID NO: 122) | FDPNSGAS (SEQ ID NO: 123) | ARNGEVPFDN (SEQ ID NO: 124) |

TABLE 5-continued

Mutations (underlined) within heavy chain (HC) variable region CDRs

| ANTI-TREM2 ANTIBODY | HC CDR1 | HC CDR2 | HC CDR3 |
|---|---|---|---|
| MB-6(2-E6) VH (SEQ ID NO: 131) | GYTFTDYY (SEQ ID NO: 132) | FNPYSGGS (SEQ ID NO: 133) | ARSGEVPFDN (SEQ ID NO: 134) |

*additional mutations outside of CDRs

TABLE 6

Mutations (underlined) within light chain (LC) variable region CDRs

| ANTI-TREM2 ANTIBODY | LC CDR1 | LC CDR2 | LC CDR3 |
|---|---|---|---|
| 03O05 VL (SEQ ID NO: 16) | SSNIGNNF (SEQ ID NO: 17) | DIN | GTWDISLSAGV (SEQ ID NO: 19) |
| MB-9 VL (SEQ ID NO: 86) | SSNIGNNF (SEQ ID NO: 87) | DIN | GTWDISLSAAV (SEQ ID NO: 89) |
| MB-11 VL (SEQ ID NO: 96) | SSNVGNNF (SEQ ID NO: 97) | GIN | GTWDISLSAAV (SEQ ID NO: 99) |
| MB-23 VL (SEQ ID NO: 106) | SSNIGNSF (SEQ ID NO: 107) | DIN | GTWDISLSAAV (SEQ ID NO: 109) |
| MB-4(1-E9) VL (SEQ ID NO: 116) | SSNIANNF (SEQ ID NO: 117) | DNN | GTWDISLSAAV (SEQ ID NO: 119) |
| MB-5(1-G10)* VL (SEQ ID NO: 126) | SSNIGNSF (SEQ ID NO: 127) | DNN | GSWDISLSAGV (SEQ ID NO: 129) |
| MB-6(2-E6) VL (SEQ ID NO: 136) | SSNIGNNF (SEQ ID NO: 137) | GIN | GTWDISLSAYV (SEQ ID NO: 139) |

*additional mutations outside of CDRs

In Vitro Functional Evaluation of Affinity-Matured Anti-TREM2 Antibody Variants

The in vitro functional activity of anti-TREM2 clones with improved $k_{off}$ was evaluated using NFAT-luciferase reporter assay, as described in Example 3. As shown in FIGS. 10A-B, both the chimeric 03O05 and fully human antibody Hu03O05 significantly stimulated NFAT-driven luciferase activities in a dose-dependent manner as expected. Surprisingly, the affinity-enhanced variants generated from Hu03O05 displayed unexpected performance in the assay. Variant MB-4(1-E9), which exhibited minimal $k_{off}$ improvement and little affinity enhancement, retained weak in vitro activity. In contrast, the other variants, MB-5(1-G10), MB-6(2-E6), MB-9, MB-11 and MB-23, each with 4- to 10-fold $k_{off}$ improvement, showed no detectable functional activity in the NFAT-luciferase assay. These results were unanticipated and suggest that anti-TREM2 agonist activity is NOT directly correlated with antibody binding affinity. Increased affinity of anti-TREM2 antibody may abolish in vitro functional activity through unknown mechanisms, highlighting the complexity of TREM2 signaling.

In Vivo Evaluation of Affinity-Matured Anti-TREM2 Antibody Variants

Figure 10C:
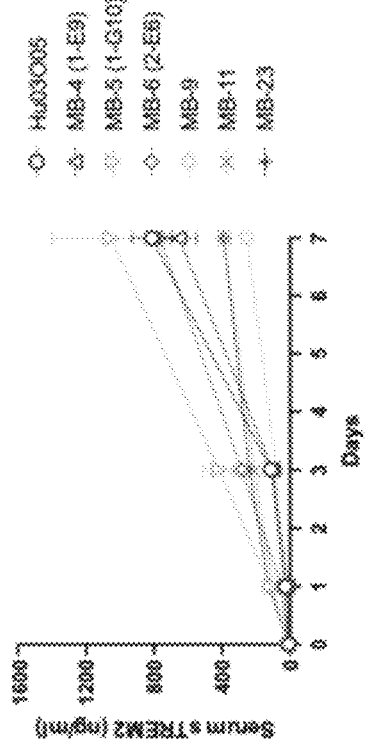
Figure 10D:
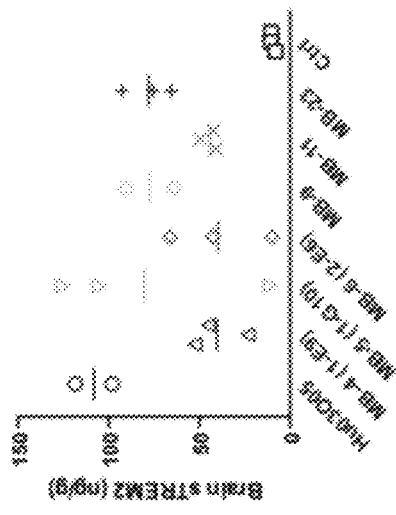

The in vivo activity of antibody variants was evaluated to determine whether $k_{off}$ improvement would impact the antibody's ability to increase sTREM2 levels in vivo. Briefly, Hu03O05, MB-4 (1-E9), MB-5 (1-G10), MB-6 (2-E6), MB-9, MB-11 and MB-23 were injected i.p. into B6SJLF1/J mice (The Jackson Laboratory, Strain #: 100012, RRID: IMSR_JAX:10001) at a dose of 30 mg/kg. Serum samples were collected at pre-dosing, 1, 3, and 7 days after dosing, and whole brains were collected at 7 days post-dosing. Serum and brain lysates were prepared as described in Example 4, and sTREM2 levels were quantified using a sandwich ELISA as described in Example 4. As shown in FIGS. 10C-D, administration of Hu03O05 and all affinity-matured variants generated from Hu03O05 increased sTREM2 levels in both serum and brain lysates (brain tissue). These results were surprising, as in vitro activity had been abolished in all but one variant. However, the in vivo capability to increase sTREM2 levels remained intact across all tested antibody variants.

Figure 10E:
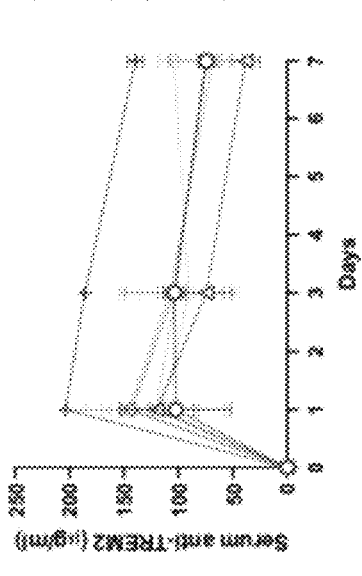
Figure 10F:
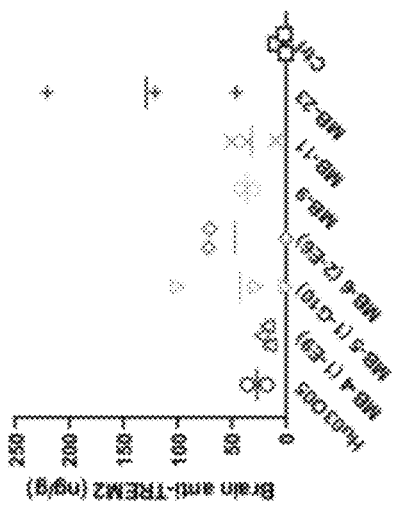

Concentrations of anti-TREM2 antibody variants were quantified using an ELISA against ECD of mouse TREM2 tagged with a poly-histidine tag (described in Example 1), as shown in FIGS. 10E-F, providing confirmation of dosing.

What is claimed is:

1. An isolated recombinant anti-TREM2 agonist antibody or antigen-binding fragment thereof that binds the extracellular domain (ECD) of triggering receptors expressed on myeloid cells-2 (TREM2) on a cell expressing TREM2, wherein the antibody can increase levels of soluble TREM2 (sTREM2) in serum and brain tissue after administration to a mammalian subject, wherein the antibody or antigen-binding fragment thereof comprises a heavy chain variable region (VH) comprising a heavy chain (HC) complementarity region (CDR) 1 having the amino acid sequence GYTFTDYF (SEQ ID NO: 12), a HC CDR2 having the amino sequence FNPNSGGS (SEQ ID NO: 13), and a HC CDR3 having the amino acid sequence ARNGEVPFDN (SEQ ID NO: 14), and a light chain variable region (VL) comprising a light chain (LC) CDR1 having the amino acid sequence SSNIGNNF (SEQ ID NO: 17), a LC CDR2 having the amino acid sequence DIN, and a LC CDR3 having the amino acid sequence GTWDISLSAGV (SEQ ID NO: 19).

2. The anti-TREM2 antibody or antigen-binding fragment thereof of claim 1, wherein the antibody or antigen-binding fragment thereof binds to a discontinuous conformational epitope comprising at least residues M41, W44, and L89 of human TREM2 (HuTREM2) of SEQ ID NO: 141.

3. The isolated recombinant anti-TREM2 antibody or antigen-binding fragment thereof of claim 1, wherein the VH comprises the amino acid sequence of SEQ ID NO: 11 and the VL comprises the amino acid sequence of SEQ ID NO: 16.

4. The anti-TREM2 antibody or antigen-binding fragment thereof of claim 1, wherein the antibody binds the ECD of human TREM2 (HuTREM2) on a cell expressing HuTREM2 and the ECD of mouse TREM2 (MoTREM2) on a cell expressing MoTREM2, and wherein the antibody is a chimeric antibody, a humanized antibody, or a full-length antibody.

5. A pharmaceutical composition comprising the anti-TREM2 antibody or antigen-binding fragment thereof of claim 1 and a pharmaceutically acceptable carrier or excipient.

6. An isolated nucleic acid molecule comprising polynucleotides encoding the VH and VL of the anti-TREM2 antibody of claim 1, wherein the VH comprises the amino acid sequence of SEQ ID NO: 11, and the VL comprises the amino acid sequence of SEQ ID NO: 16.

7. The isolated nucleic acid molecule according to claim 6, wherein the polynucleotide encoding the VL of the anti-TREM2 antibody comprises the nucleic acid sequence of SEQ ID NO: 15 and the polynucleotide encoding the VH of the anti-TREM2 antibody comprises the nucleic acid sequence of SEQ ID NO: 20.

* * * * *

SEQUENCE LISTING

```
Sequence total quantity: 153
SEQ ID NO: 1                 moltype = AA  length = 118
FEATURE                      Location/Qualifiers
source                       1..118
                             mol_type = protein
                             organism = synthetic construct
SEQUENCE: 1
EVQLVESGGG LVKPGGSLRL SCAASGFTFS TYSMNWVRQA PGKGLEWVSS ISSGSSHKYY    60
ADSVKGRFTI SRDNAKNSLY LQMNSLRAED TAVYYCARWE NAMGLDYWGQ GTLVTVSS    118

SEQ ID NO: 2                 moltype = AA  length = 8
FEATURE                      Location/Qualifiers
source                       1..8
                             mol_type = protein
                             organism = synthetic construct
SEQUENCE: 2
GFTFSTYS                                                              8

SEQ ID NO: 3                 moltype = AA  length = 7
FEATURE                      Location/Qualifiers
source                       1..7
                             mol_type = protein
                             organism = synthetic construct
SEQUENCE: 3
ISSGSSH                                                               7

SEQ ID NO: 4                 moltype = AA  length = 7
FEATURE                      Location/Qualifiers
source                       1..7
                             mol_type = protein
                             organism = synthetic construct
SEQUENCE: 4
ARWENAM                                                               7

SEQ ID NO: 5                 moltype = DNA  length = 354
FEATURE                      Location/Qualifiers
source                       1..354
                             mol_type = other DNA
                             organism = synthetic construct
SEQUENCE: 5
gaggtgcagc tggttgaatc tggcggagga ctggttaagc ctggcggctc tctgagactg    60
tcttgtgccg cttctggctt caccttctcc acctactcca tgaactgggt ccgacaggct   120
cccgcaaag gactggaatg ggtgtcctcc atctcctccg ctccagcca caagtactac     180
gccgactctg tgaagggcag attcaccatc tctcgggaca acgccaagaa ctccctgtac   240
ctgcagatga acagcctgag agccgaggac accgccgtgt actactgtgc cagatgggag   300
aatgccatgg gcctcgatta ttggggccag ggcacactgg tcaccgtgtc ctct         354

SEQ ID NO: 6                 moltype = AA  length = 110
FEATURE                      Location/Qualifiers
source                       1..110
                             mol_type = protein
                             organism = synthetic construct
SEQUENCE: 6
QSVLTQPPSV SAAPGQKVTI SCSGSSSNIG NNYVSWYQQV PGTAPKLLIY DNNKRPSGIP    60
DRFSGSKSGT SATLGITGLQ TGDEADYYCG TWDSSLRAVV FGGGTKLSVL              110

SEQ ID NO: 7                 moltype = AA  length = 8
FEATURE                      Location/Qualifiers
source                       1..8
                             mol_type = protein
                             organism = synthetic construct
SEQUENCE: 7
SSNIGNNY                                                              8

SEQ ID NO: 8                 moltype =   length =
SEQUENCE: 8
000

SEQ ID NO: 9                 moltype = AA  length = 11
FEATURE                      Location/Qualifiers
source                       1..11
                             mol_type = protein
                             organism = synthetic construct
SEQUENCE: 9
GTWDSSLRAV V                                                         11

SEQ ID NO: 10                moltype = DNA  length = 330
FEATURE                      Location/Qualifiers
```

```
source                  1..330
                        mol_type = other DNA
                        organism = synthetic construct
SEQUENCE: 10
cagtctgtgc tgacccaacc tccttctgtg tctgctgccc ctggccagaa agtgaccatc   60
tcttgctccg gctcctcctc caacatcggc aacaactacg tgtcctggta tcagcaggtc  120
cccggcacag ctcctaagct gctgatctac gacaacaaca gcggcccag cggcatccct  180
gacagattct ccggatctaa gtccggcacc tctgctaccc tgggcatcac aggattgcag  240
acaggcgacg aggccgacta ctattgcggc acctgggact ctagcctgag agccgttgtt  300
tttggcggag gcaccaagct gagtgtgctg                                   330

SEQ ID NO: 11           moltype = AA   length = 117
FEATURE                 Location/Qualifiers
source                  1..117
                        mol_type = protein
                        organism = synthetic construct
SEQUENCE: 11
QVQLVQSGAE VKKPGAAVKV SCTASGYTFT DYFMHWVRRA PGQGLEWMGW FNPNSGGSNY   60
AQKFQGRVAM TRDTSISTAY MELSRLRSDD TAVYYCARNG EVPFDNWGQG TLVTVSS    117

SEQ ID NO: 12           moltype = AA   length = 8
FEATURE                 Location/Qualifiers
source                  1..8
                        mol_type = protein
                        organism = synthetic construct
SEQUENCE: 12
GYTFTDYF                                                             8

SEQ ID NO: 13           moltype = AA   length = 8
FEATURE                 Location/Qualifiers
source                  1..8
                        mol_type = protein
                        organism = synthetic construct
SEQUENCE: 13
FNPNSGGS                                                             8

SEQ ID NO: 14           moltype = AA   length = 10
FEATURE                 Location/Qualifiers
source                  1..10
                        mol_type = protein
                        organism = synthetic construct
SEQUENCE: 14
ARNGEVPFDN                                                          10

SEQ ID NO: 15           moltype = DNA   length = 351
FEATURE                 Location/Qualifiers
source                  1..351
                        mol_type = other DNA
                        organism = synthetic construct
SEQUENCE: 15
caggtgcagc tggttcaatc tggcgccgaa gtgaagaaac ctggcgccgc tgtgaaggtg   60
tcctgtaccg cttctggcta cacctttacc gactacttca tgcactgggt tcgcagagcc  120
cctggacagg gacttgaatg gatgggctgg tttaacccca actccggcgg ctctaactac  180
gcccagaaat ccagggcag agtggccatg accagagaca cctctatctc caccgcctac  240
atggaactgt cccggctgag atctgacgac accgccgtgt actactgcgc cagaaatggc  300
gaggtgccct cgataattgg ggccaggga acctggtca ccgtgtcctc t             351

SEQ ID NO: 16           moltype = AA   length = 110
FEATURE                 Location/Qualifiers
source                  1..110
                        mol_type = protein
                        organism = synthetic construct
SEQUENCE: 16
QSVLTQPPSV SAAPGQKVTI SCSGSSSNIG NNFVSWYQQL PGTAPKLLIY DINKRPSGIP   60
DRFSGSKSGT SATLVITGLQ TGDEADYYCG TWDISLSAGV FGGGTKLTVL            110

SEQ ID NO: 17           moltype = AA   length = 8
FEATURE                 Location/Qualifiers
source                  1..8
                        mol_type = protein
                        organism = synthetic construct
SEQUENCE: 17
SSNIGNNF                                                             8

SEQ ID NO: 18           moltype =   length =
SEQUENCE: 18
000

SEQ ID NO: 19           moltype = AA   length = 11
```

```
FEATURE                 Location/Qualifiers
source                  1..11
                        mol_type = protein
                        organism = synthetic construct
SEQUENCE: 19
GTWDISLSAG V                                                                    11

SEQ ID NO: 20           moltype = DNA   length = 330
FEATURE                 Location/Qualifiers
source                  1..330
                        mol_type = other DNA
                        organism = synthetic construct
SEQUENCE: 20
cagtctgtgc tgacccaacc tccttctgtg tctgctgccc ctggccagaa agtgaccatc         60
tcttgctccg gctcctcctc caacatcggc aacaacttcg tgtcctggta tcagcagctg         120
cccggcacag ctcccaaaac tgctgatcta cgacatcaaca gcggcccag cggcatccct         180
gacagattct ccggatctaa gtccggcacc agcgctaccc tggttatcac cggattgcag         240
acaggcgacg aggccgacta ctattgcggc acctgggaca tcagtctgtc tgccggtgtt         300
tttggcggag gcaccaagct gacagtgctg                                          330

SEQ ID NO: 21           moltype = AA   length = 118
FEATURE                 Location/Qualifiers
source                  1..118
                        mol_type = protein
                        organism = synthetic construct
SEQUENCE: 21
EVQVVESGGG LVQPGGSLRL SCAASGFTFS SYSMNWVRQA PGKGLEWVSY ISSSSGTIYY         60
ADSVKGRFTI SRDNAKNSLY LQMNSLRDED TAVYYCARLP REGFFDYWGQ GTLVTVSS          118

SEQ ID NO: 22           moltype = AA   length = 8
FEATURE                 Location/Qualifiers
source                  1..8
                        mol_type = protein
                        organism = synthetic construct
SEQUENCE: 22
GFTFSSYS                                                                    8

SEQ ID NO: 23           moltype = AA   length = 8
FEATURE                 Location/Qualifiers
source                  1..8
                        mol_type = protein
                        organism = synthetic construct
SEQUENCE: 23
ISSSSGTI                                                                    8

SEQ ID NO: 24           moltype = AA   length = 11
FEATURE                 Location/Qualifiers
source                  1..11
                        mol_type = protein
                        organism = synthetic construct
SEQUENCE: 24
ARLPREGFFD Y                                                                11

SEQ ID NO: 25           moltype = DNA   length = 354
FEATURE                 Location/Qualifiers
source                  1..354
                        mol_type = other DNA
                        organism = synthetic construct
SEQUENCE: 25
gaggtgcagg tcgtggaatc tggcggagga ttggttcagc ctggcggctc tctgagactg         60
tcttgtgccg cttccggctt caccttctcc agctactcca tgaactgggt ccgacaggct         120
cccggcaaag gactggaatg ggtgtcctac atctcctcca gctccggcac catctactac         180
gccgactctg tgaagggcag attcaccatc tctcgggaca cgccaagaa ctccctgtac         240
ctgcagatga cagcctgcg cgacgaggat accgccgtgt actactgtgc cagactgccc         300
agagagggct tcttcgatta ttggggccag ggcaccctgg tcaccgtgtc ctct              354

SEQ ID NO: 26           moltype = AA   length = 112
FEATURE                 Location/Qualifiers
source                  1..112
                        mol_type = protein
                        organism = synthetic construct
SEQUENCE: 26
DIVMTQTPLS SPVTLGQPAS ISCRSSQSLV HSDGNTYLSW LQQRPGQPPR LLIYKISNRF         60
SGVPDRFSGS GAGTDFTLKI SRVEAEDVGV YYCMQVTQFP FTFGPGTKVD IK                112

SEQ ID NO: 27           moltype = AA   length = 11
FEATURE                 Location/Qualifiers
source                  1..11
                        mol_type = protein
```

```
                               organism = synthetic construct
SEQUENCE: 27
QSLVHSDGNT Y                                                              11

SEQ ID NO: 28          moltype =    length =
SEQUENCE: 28
000

SEQ ID NO: 29          moltype = AA   length = 9
FEATURE                Location/Qualifiers
source                 1..9
                       mol_type = protein
                       organism = synthetic construct
SEQUENCE: 29
MQVTQFPFT                                                                 9

SEQ ID NO: 30          moltype = DNA   length = 336
FEATURE                Location/Qualifiers
source                 1..336
                       mol_type = other DNA
                       organism = synthetic construct
SEQUENCE: 30
gacatcgtga tgacccagac acctctgagc agccccgtta cattgggcca gcctgcctcc         60
atctcctgca gatcctctca gtccctggtg cactctgacg gcaacaccta cctgtcttgg        120
ctgcagcaga ggcctggaca gcctcctaga ctgctgatct acaagatctc caaccggttc        180
tccggcgtgc ccgacagatt ttctggatct ggcgctggca ccgacttcac cctgaagatt        240
tccagagtgg aagccgagga cgtgggcgtg tactactgta tgcaagtgac ccagtttcct        300
ttcaccttcg gacccggcac caaggtggac atcaag                                  336

SEQ ID NO: 31          moltype = AA   length = 117
FEATURE                Location/Qualifiers
source                 1..117
                       mol_type = protein
                       organism = synthetic construct
SEQUENCE: 31
QVQLVQSRAE VKKPGASVKV SCKASGYTFT GYYMHWVRQA PGQGLEWMGW FNPNSGGTKY         60
AQKFQGRVTM TRDTSINTAY MELSSLRSDD TAVYYCARTG VIPFDYWGQG TLVTVSS           117

SEQ ID NO: 32          moltype = AA   length = 8
FEATURE                Location/Qualifiers
source                 1..8
                       mol_type = protein
                       organism = synthetic construct
SEQUENCE: 32
GYTFTGYY                                                                  8

SEQ ID NO: 33          moltype = AA   length = 8
FEATURE                Location/Qualifiers
source                 1..8
                       mol_type = protein
                       organism = synthetic construct
SEQUENCE: 33
FNPNSGGT                                                                  8

SEQ ID NO: 34          moltype = AA   length = 10
FEATURE                Location/Qualifiers
source                 1..10
                       mol_type = protein
                       organism = synthetic construct
SEQUENCE: 34
ARTGVIPFDY                                                                10

SEQ ID NO: 35          moltype = DNA   length = 351
FEATURE                Location/Qualifiers
source                 1..351
                       mol_type = other DNA
                       organism = synthetic construct
SEQUENCE: 35
caggtgcagc tggttcagag tagagccgaa gtgaagaaac ctggcgcctc cgtgaaggtg         60
tcctgcaagg cttctggcta cacctttacc ggctactaca tgcactgggt ccgacaggct        120
ccaggccaag gattgaatg gatgggctgg ttcaaccca actccggcgg cactaagtac         180
gcccagaaat tccagggcag agtgaccatg accagacaca cctccatcaa caccgcctac        240
atggaactgt ccagcctgag atctgacgac accgccgtgt actactgtgc cagaacaggc        300
gtgatcccct cgactattgg ggccaggga acctggtca ccgtgtcctc t                   351

SEQ ID NO: 36          moltype = AA   length = 110
FEATURE                Location/Qualifiers
source                 1..110
                       mol_type = protein
```

```
                            organism  = synthetic construct
SEQUENCE: 36
QSVLTQPPSV SAAPGQKVTI SCSGSSSNIG NDYVSWYQQL PETAPKLLIY DNNKRPSGIP    60
DRFSGSKSGT SATLGITGLQ TGDEADYYCG TWDSSLSAVV FGGGTKLTVL              110

SEQ ID NO: 37               moltype = AA    length = 8
FEATURE                     Location/Qualifiers
source                      1..8
                            mol_type = protein
                            organism = synthetic construct
SEQUENCE: 37
SSNIGNDY                                                             8

SEQ ID NO: 38               moltype =    length =
SEQUENCE: 38
000

SEQ ID NO: 39               moltype = AA    length = 11
FEATURE                     Location/Qualifiers
source                      1..11
                            mol_type = protein
                            organism = synthetic construct
SEQUENCE: 39
GTWDSSLSAV V                                                        11

SEQ ID NO: 40               moltype = DNA   length = 330
FEATURE                     Location/Qualifiers
source                      1..330
                            mol_type = other DNA
                            organism = synthetic construct
SEQUENCE: 40
cagtctgtgc tgacccaacc tccttctgtg tctgctgccc ctggccagaa agtgaccatc    60
tcttgctccg gctcctcctc caacatcggc aacgattacg tgtcctggta tcagcagctg   120
cccgagacag ctcccaaaact gctgatctac gacaacaaca gcggcccag cggcatccct   180
gacagattct ccggatctaa gtccggcacc tctgctaccc tgggcatcac aggattgcag   240
acaggcgacg aggccgacta ctattgcggc acctgggact cttctctgtc cgccgttgtt   300
tttggcggag gcaccaagct gacagtgctg                                    330

SEQ ID NO: 41               moltype = AA    length = 118
FEATURE                     Location/Qualifiers
source                      1..118
                            mol_type = protein
                            organism = synthetic construct
SEQUENCE: 41
EVQLVQSGSE VKKPGESLRI SCKGSGYSFS SYWLAWVRQM PGKGLEWMGI IYPGDSDTRY    60
SPSFQGQVTI SADKSISTAY LQWSSLKASD TAMYYCARGT PLFYFTYWGQ GTLVTVSS     118

SEQ ID NO: 42               moltype = AA    length = 8
FEATURE                     Location/Qualifiers
source                      1..8
                            mol_type = protein
                            organism = synthetic construct
SEQUENCE: 42
GYSFSSYW                                                             8

SEQ ID NO: 43               moltype = AA    length = 8
FEATURE                     Location/Qualifiers
source                      1..8
                            mol_type = protein
                            organism = synthetic construct
SEQUENCE: 43
IYPGDSDT                                                             8

SEQ ID NO: 44               moltype = AA    length = 11
FEATURE                     Location/Qualifiers
source                      1..11
                            mol_type = protein
                            organism = synthetic construct
SEQUENCE: 44
ARGTPLFYFT Y                                                        11

SEQ ID NO: 45               moltype = DNA   length = 354
FEATURE                     Location/Qualifiers
source                      1..354
                            mol_type = other DNA
                            organism = synthetic construct
SEQUENCE: 45
gaagtgcagc tggtgcagtc tggctccgaa gtgaagaagc ctggcgagtc cctgcggatc    60
tcctgtaaag gctccggcta ctccttctcc tcctactggc tggcttgggt ccgacagatg   120
```

```
cctggcaaag gcctggaatg gatgggcatc atctacccccg gcgacagcga taccagatac  180
tccctagct  tccagggcca agtgaccatc tccgccgaca agtctatctc caccgcctac  240
ctgcagtggt cctctctgaa ggcctctgac accgccatgt actactcgcg tagaggcacc  300
cctctgttct acttcaccta ttggggccag ggcaccctgg tcacagtgtc ctct        354
```

```
SEQ ID NO: 46            moltype = AA   length = 113
FEATURE                  Location/Qualifiers
source                   1..113
                         mol_type = protein
                         organism = synthetic construct
SEQUENCE: 46
DIVMTQTPLS LPVTPGETAS ISCRSSQSLL DSEDGNTYLD WYLQKPGQSP QLLIYTLSYR   60
ASGVPDRFSG SGSGTDFTLK ISRVEAEDVG VYYCMQRIES PLTFGGGTKV EIK         113

SEQ ID NO: 47            moltype = AA   length = 12
FEATURE                  Location/Qualifiers
source                   1..12
                         mol_type = protein
                         organism = synthetic construct
SEQUENCE: 47
QSLLDSEDGN TY                                                       12

SEQ ID NO: 48            moltype =      length =
SEQUENCE: 48
000

SEQ ID NO: 49            moltype = AA   length = 9
FEATURE                  Location/Qualifiers
source                   1..9
                         mol_type = protein
                         organism = synthetic construct
SEQUENCE: 49
MQRIESPLT                                                            9

SEQ ID NO: 50            moltype = DNA  length = 339
FEATURE                  Location/Qualifiers
source                   1..339
                         mol_type = other DNA
                         organism = synthetic construct
SEQUENCE: 50
gacatcgtga tgacccagac acctctgagc ctgcctgtga cacctggcga gacagcctcc   60
atctcctgca gatcctctca gtccctgctg gactctgagg acggcaacac ctacctggac  120
tggtatctgc agaagcccgg ccagtctcct cagctgctga tctacacccct gtcctacaga  180
gcctctggcg tgcccgatag attctccggc tctggctctg gcaccgactt cacccctgaag  240
atctccagag tggaagccga ggacgtgggc gtgtactact gtatgcagcg gatcgagtcc  300
cctctgacct tggcggagg caccaaggtg gaaatcaag                          339

SEQ ID NO: 51            moltype = AA   length = 115
FEATURE                  Location/Qualifiers
source                   1..115
                         mol_type = protein
                         organism = synthetic construct
SEQUENCE: 51
QVQLQESGPG LVKPSETLSL TCTVSGGSIS SYYWSWIRQP AGKGLEWIGL IYTSGSTIYN   60
PSVKRRVTMS VDTSKNQFSL KLTSVTAADT AVYYCARDLF YFDYWGQGTL VTVSS       115

SEQ ID NO: 52            moltype = AA   length = 8
FEATURE                  Location/Qualifiers
source                   1..8
                         mol_type = protein
                         organism = synthetic construct
SEQUENCE: 52
GGSISSYY                                                             8

SEQ ID NO: 53            moltype = AA   length = 7
FEATURE                  Location/Qualifiers
source                   1..7
                         mol_type = protein
                         organism = synthetic construct
SEQUENCE: 53
IYTSGST                                                              7

SEQ ID NO: 54            moltype = AA   length = 9
FEATURE                  Location/Qualifiers
source                   1..9
                         mol_type = protein
                         organism = synthetic construct
SEQUENCE: 54
ARDLFYFDY                                                            9
```

```
SEQ ID NO: 55           moltype = DNA  length = 345
FEATURE                 Location/Qualifiers
source                  1..345
                        mol_type = other DNA
                        organism = synthetic construct
SEQUENCE: 55
caggtccagc tgcaagaatc tggccctgga ctggtcaagc cctccgagac actgtctctg    60
acctgtacag tgtccggcgg ctccatctcc tcctactact ggtcctggga cagacagcct   120
gccggcaaag gcctggaatg gatcggcctc atctacacct ccggtccac catctacaac    180
ccctccgtga agcggagagt gaccatgtcc gtggacacct ccaagaacca gttctccctg   240
aagctgacct ccgtgaccgc tgctgatacc gccgtgtact actgcgccag ggacctgttc   300
tacttcgact attggggcca gggcaccctg gtcacagtgt cctct                   345

SEQ ID NO: 56           moltype = AA   length = 107
FEATURE                 Location/Qualifiers
source                  1..107
                        mol_type = protein
                        organism = synthetic construct
SEQUENCE: 56
EIVLTQSPAT LSLSPGERAT LSCRASQSVS SYLAWYQQRP GQAPRLLISD ASNRATGIPA    60
RFSGSESGTD FTLTISSLEP EDFAVYYCQQ RSNWPWTFGQ GTKVEIK                 107

SEQ ID NO: 57           moltype = AA   length = 6
FEATURE                 Location/Qualifiers
source                  1..6
                        mol_type = protein
                        organism = synthetic construct
SEQUENCE: 57
QSVSSY                                                                6

SEQ ID NO: 58           moltype =      length =
SEQUENCE: 58
000

SEQ ID NO: 59           moltype = AA   length = 9
FEATURE                 Location/Qualifiers
source                  1..9
                        mol_type = protein
                        organism = synthetic construct
SEQUENCE: 59
QQRSNWPWT                                                             9

SEQ ID NO: 60           moltype = DNA  length = 321
FEATURE                 Location/Qualifiers
source                  1..321
                        mol_type = other DNA
                        organism = synthetic construct
SEQUENCE: 60
gagatcgtgc tgacccaatc tcctgccaca ctgtctctga gccctggcga gagagctacc    60
ctgtcttgta gagcctctca gtccgtgtcc tcctacctgg ctggtatca gcagaggcct    120
ggacaggctc ctcggctgct gatttctgac gcctccaata gagccacagg catccccgcc   180
agattctccg gatctgagtc tggcaccgac tttaccctga ccatctccag cctgaaacct   240
gaggacttcg ccgtgtacta ctgccagcag cggtctaact ggccttggac ctttggccag   300
ggcaccaagg tggaaatcaa g                                             321

SEQ ID NO: 61           moltype = AA   length = 117
FEATURE                 Location/Qualifiers
source                  1..117
                        mol_type = protein
                        organism = synthetic construct
SEQUENCE: 61
QVHLVQSGAE VKKPGASVKV SCKASGYTFT GYYMHWVRQA PGQGLEWMGW ISPHSGGTNY    60
AQNFQGRVTM TRDTSISTAY MELSRLRSDD TAVYYCARSG RVAFDIWGQG TMVTVSS      117

SEQ ID NO: 62           moltype = AA   length = 8
FEATURE                 Location/Qualifiers
source                  1..8
                        mol_type = protein
                        organism = synthetic construct
SEQUENCE: 62
GYTFTGYY                                                              8

SEQ ID NO: 63           moltype = AA   length = 8
FEATURE                 Location/Qualifiers
source                  1..8
                        mol_type = protein
                        organism = synthetic construct
SEQUENCE: 63
```

```
                                                -continued

ISPHSGGT                                                                         8

SEQ ID NO: 64           moltype = AA  length = 10
FEATURE                 Location/Qualifiers
source                  1..10
                        mol_type = protein
                        organism = synthetic construct
SEQUENCE: 64
ARSGRVAFDI                                                                      10

SEQ ID NO: 65           moltype = DNA  length = 351
FEATURE                 Location/Qualifiers
source                  1..351
                        mol_type = other DNA
                        organism = synthetic construct
SEQUENCE: 65
caggtgcact tggtccaatc cggcgccgaa gtgaaaaaac caggcgccag cgtcaaggtt              60
agctgcaagg cctcaggcta cactttcact ggatattaca tgcattgggt cagacaggct             120
cctggccaag gtctcgagtg gatgggatgg atcagccccc attcggggagg cacaaactat            180
gcgcaaaact tccaaggccg ggtcactatg acaagagaca cgtcaatatc gactgctat              240
atggagctga gccggctgag gagtgatgat acggctgtat attactgcgc aagaagcggg             300
cgggtggctt tcgacatttg gggacagggc accatgtgta ccgtttcatc g                      351

SEQ ID NO: 66           moltype = AA  length = 110
FEATURE                 Location/Qualifiers
source                  1..110
                        mol_type = protein
                        organism = synthetic construct
SEQUENCE: 66
QSVLTQPPSV SAAPGQKVTI SCSGSSSNIG NDYVSWFQQL PGTAPKLLIY DNNKRPSGIP              60
DRFSGSKSGT SATLGITGLQ TGDEADYYCG TWDTSLSAVV FGGGTKLTVL                        110

SEQ ID NO: 67           moltype = AA  length = 8
FEATURE                 Location/Qualifiers
source                  1..8
                        mol_type = protein
                        organism = synthetic construct
SEQUENCE: 67
SSNIGNDY                                                                        8

SEQ ID NO: 68           moltype =    length =
SEQUENCE: 68
000

SEQ ID NO: 69           moltype = AA  length = 11
FEATURE                 Location/Qualifiers
source                  1..11
                        mol_type = protein
                        organism = synthetic construct
SEQUENCE: 69
GTWDTSLSAV V                                                                   11

SEQ ID NO: 70           moltype = DNA  length = 330
FEATURE                 Location/Qualifiers
source                  1..330
                        mol_type = other DNA
                        organism = synthetic construct
SEQUENCE: 70
cagagcgtgc tgacacaacc tcctagcgtg tccgccgctc ccgggcaaaa agtcaccatc              60
tcatgctccg gctcctctag caacatcggc aatgactacg tttcttggtt ccaacaactt            120
cccggcaccg caccaaagct gctcatctat gataacaaca gcggccatc tgggattcct             180
gaccggttct ctgggagcaa gtccggaaca tcagctacat gggaatcac cggactgcaa             240
acaggcgatg aggctgatta ctactgtggc acctgggaca ccagtttgag tgctgtggtc            300
tttggcggcg gaactaagct gactgtactg                                              330

SEQ ID NO: 71           moltype = AA  length = 117
FEATURE                 Location/Qualifiers
source                  1..117
                        mol_type = protein
                        organism = synthetic construct
SEQUENCE: 71
QVQLVQSGTE VKKPGASVKV SCKASGYTFT GYYMHWVRQA PGQGLEWMGW FDPNSGGANH              60
AQKFQDRVTM TRDTSISTAY MELRRLTSDD SAVYFCARSG SFPFDYWGQG TLVTVSS                117

SEQ ID NO: 72           moltype = AA  length = 8
FEATURE                 Location/Qualifiers
source                  1..8
                        mol_type = protein
                        organism = synthetic construct
```

```
SEQUENCE: 72
GYTFTGYY                                                                      8

SEQ ID NO: 73           moltype = AA  length = 8
FEATURE                 Location/Qualifiers
source                  1..8
                        mol_type = protein
                        organism = synthetic construct
SEQUENCE: 73
FDPNSGGA                                                                      8

SEQ ID NO: 74           moltype = AA  length = 10
FEATURE                 Location/Qualifiers
source                  1..10
                        mol_type = protein
                        organism = synthetic construct
SEQUENCE: 74
ARSGSFPFDY                                                                   10

SEQ ID NO: 75           moltype = DNA  length = 351
FEATURE                 Location/Qualifiers
source                  1..351
                        mol_type = other DNA
                        organism = synthetic construct
SEQUENCE: 75
caggtgcaac tggtccaatc tgggactgaa gtcaagaagc caggggcctc cgtcaaagtc             60
agctgcaaag catccgggta cacttttcacc ggctattaca tgcactgggt tcgccaagca           120
cccgggcaag gcctggagtg gatgggatgg tttgacccta actccggtgg cgccaatcac            180
gcccaaaagt tccaagacag agtgactatg acccgggata ctagcatttc tactgcttat            240
atggagctga ggcggctgac atcagatgat tccgctgtgt acttttgtgc ccggtctgga            300
agtttcccct ttgattactg gggccagggc acactggtga ccgtcagctc c                     351

SEQ ID NO: 76           moltype = AA  length = 110
FEATURE                 Location/Qualifiers
source                  1..110
                        mol_type = protein
                        organism = synthetic construct
SEQUENCE: 76
QSVLTQPPSV SAAPGQKVTI SCSGSSSNIG NDYVSWFQQL PGTAPKLLIY DNNKRPSGIP             60
DRFSGSKSGT SATLGITGLQ TGDEADYYCG TWDSSLSAVV FGGGTKLTVL                       110

SEQ ID NO: 77           moltype = AA  length = 8
FEATURE                 Location/Qualifiers
source                  1..8
                        mol_type = protein
                        organism = synthetic construct
SEQUENCE: 77
SSNIGNDY                                                                      8

SEQ ID NO: 78           moltype =    length =
SEQUENCE: 78
000

SEQ ID NO: 79           moltype = AA  length = 11
FEATURE                 Location/Qualifiers
source                  1..11
                        mol_type = protein
                        organism = synthetic construct
SEQUENCE: 79
GTWDSSLSAV V                                                                 11

SEQ ID NO: 80           moltype = DNA  length = 330
FEATURE                 Location/Qualifiers
source                  1..330
                        mol_type = other DNA
                        organism = synthetic construct
SEQUENCE: 80
cagtctgtgt tgacccaacc accgtctgta tccgctgccc ctggccaaaa ggtgaccatc             60
agttgctctg gatcgagttc gaacatcggc aacgactacg tttcctggtt ccaacaacta            120
cctggcaccg ctcccaagct gctcatttac gacaacaaca gcggcccag cgggattcca             180
gaccggttct ctggctctaa gtctggaaca agcgccacac tgggcatcac tgggctacag            240
acgggggacg aggccgatta ttactgtgga acatgggact tccctgag cgcagtggtc              300
tttggtggcg gtaccaagct gacagtattg                                             330

SEQ ID NO: 81           moltype = AA  length = 117
FEATURE                 Location/Qualifiers
source                  1..117
                        mol_type = protein
                        organism = synthetic construct
```

```
SEQUENCE: 81
QVQLVQSGAE VKKPGAAVKV SCTASGYNFT DYFMHWVRRA PGQGLEWMGW FNPYSGASNY    60
AQKFQGRVAM TRDTSISTAY MELSRLRSDD TAVYYCARSG EVPFDNWGQG TLVTVSS      117

SEQ ID NO: 82            moltype = AA   length = 8
FEATURE                  Location/Qualifiers
source                   1..8
                         mol_type = protein
                         organism = synthetic construct
SEQUENCE: 82
GYNFTDYF                                                              8

SEQ ID NO: 83            moltype = AA   length = 8
FEATURE                  Location/Qualifiers
source                   1..8
                         mol_type = protein
                         organism = synthetic construct
SEQUENCE: 83
FNPYSGAS                                                              8

SEQ ID NO: 84            moltype = AA   length = 10
FEATURE                  Location/Qualifiers
source                   1..10
                         mol_type = protein
                         organism = synthetic construct
SEQUENCE: 84
ARSGEVPFDN                                                           10

SEQ ID NO: 85            moltype = DNA   length = 351
FEATURE                  Location/Qualifiers
source                   1..351
                         mol_type = other DNA
                         organism = synthetic construct
SEQUENCE: 85
caggtgcagc tggttcaatc tggcgccgaa gtgaagaaac ctggcgccgc tgtgaaggtg     60
tcctgtaccg cttctggcta caactttacc gactacttca tgcactgggt tcgcagagcc   120
cctggacagg gacttgaatg gatgggctgg tttaaccctt actccggcgg ctctaactac   180
gcccagaaat tccagggcag agtggccatg accagagaca cctctatctc caccgcctac   240
atggaactgt cccggctgag atctgacgac accgccgtgt actactgcgc cagatccggc   300
gaggtgccct cgataattgg ggccaggga accctggtca ccgtgtcctc t             351

SEQ ID NO: 86            moltype = AA   length = 110
FEATURE                  Location/Qualifiers
source                   1..110
                         mol_type = protein
                         organism = synthetic construct
SEQUENCE: 86
QSVLTQPPSV SAAPGQKVTI SCSGSSSNIG NNFVSWYQQL PGTAPKLLIY DINKRPSGIP    60
DRFSGSKSGT SATLVITGLQ TGDEADYYCG TWDISLSAAV FGGGTKLTVL              110

SEQ ID NO: 87            moltype = AA   length = 8
FEATURE                  Location/Qualifiers
source                   1..8
                         mol_type = protein
                         organism = synthetic construct
SEQUENCE: 87
SSNIGNNF                                                              8

SEQ ID NO: 88            moltype =    length =
SEQUENCE: 88
000

SEQ ID NO: 89            moltype = AA   length = 11
FEATURE                  Location/Qualifiers
source                   1..11
                         mol_type = protein
                         organism = synthetic construct
SEQUENCE: 89
GTWDISLSAA V                                                         11

SEQ ID NO: 90            moltype = DNA   length = 330
FEATURE                  Location/Qualifiers
source                   1..330
                         mol_type = other DNA
                         organism = synthetic construct
SEQUENCE: 90
cagtctgtgc tgacccaacc tccttctgtg tctgctgccc ctggccagaa agtgaccatc     60
tcttgctccg gctcctcctc caacataggc aacaacttcg tgtcctggta tcagcagctg   120
cccggcacag ctcccaaact gctgatctac gacatcaaca gcggcccag cggcatccct    180
```

```
gacagattct ccggatctaa gtccggcacc agcgctaccc tggttatcac cggattgcag    240
acaggcgacg aggccgacta ctattgcggc acctgggaca tcagtctgtc tgccgcggtt    300
tttggcggag gtaccaaatt gactgtcctg                                     330
```

SEQ ID NO: 91          moltype = AA   length = 117
FEATURE                Location/Qualifiers
source                 1..117
                       mol_type = protein
                       organism = synthetic construct
SEQUENCE: 91
QVQLVQSGAE VKKPGAAVKV SCTASGYNFT DYFMHWVRRA PGQGLEWMGW FNPYSGASNY     60
AQKFQGRVAM TRDTSISTAY MELSRLRSDD TAVYYCARNG EVPFDNWGQG TLVTVSS       117

SEQ ID NO: 92          moltype = AA   length = 8
FEATURE                Location/Qualifiers
source                 1..8
                       mol_type = protein
                       organism = synthetic construct
SEQUENCE: 92
GYNFTDYF                                                               8

SEQ ID NO: 93          moltype = AA   length = 8
FEATURE                Location/Qualifiers
source                 1..8
                       mol_type = protein
                       organism = synthetic construct
SEQUENCE: 93
FNPYSGAS                                                               8

SEQ ID NO: 94          moltype = AA   length = 10
FEATURE                Location/Qualifiers
source                 1..10
                       mol_type = protein
                       organism = synthetic construct
SEQUENCE: 94
ARNGEVPFDN                                                            10

SEQ ID NO: 95          moltype = DNA   length = 351
FEATURE                Location/Qualifiers
source                 1..351
                       mol_type = other DNA
                       organism = synthetic construct
SEQUENCE: 95
caggtgcagc tggttcaatc tggcgccgaa gtgaagaaac ctggcgccgc tgtgaaggtg     60
tcctgtaccg cttctggcta caactttacc gactacttca tgcactgggt tcgcagagcc    120
cctggacagg gacttgaatg gatgggctgg tttaaccctt actccggcgc atctaactac    180
gcccagaaat tccagggcag agtggccatg accagagaca tctctatctc caccgcctac    240
atggaactgt cccggctgag atctgacgac accgccgtgt actactgcgc cagaaatggc    300
gaggtgccct tcgataattg gggccaggga accctggtca ccgtgtcctc t             351

SEQ ID NO: 96          moltype = AA   length = 110
FEATURE                Location/Qualifiers
source                 1..110
                       mol_type = protein
                       organism = synthetic construct
SEQUENCE: 96
QSVLTQPPSV SAAPGQKVTI SCSGSSSNVG NNFVSWYQQL PGTAPKLLIY GINKRPSGIP     60
DRFSGSKSGT SATLVITGLQ TGDEADYYCG TWDISLSAAV FGGGTKLTVL               110

SEQ ID NO: 97          moltype = AA   length = 8
FEATURE                Location/Qualifiers
source                 1..8
                       mol_type = protein
                       organism = synthetic construct
SEQUENCE: 97
SSNVGNNF                                                               8

SEQ ID NO: 98          moltype =    length =
SEQUENCE: 98
000

SEQ ID NO: 99          moltype = AA   length = 11
FEATURE                Location/Qualifiers
source                 1..11
                       mol_type = protein
                       organism = synthetic construct
SEQUENCE: 99
GTWDISLSAA V                                                          11

```
SEQ ID NO: 100            moltype = DNA  length = 330
FEATURE                   Location/Qualifiers
source                    1..330
                          mol_type = other DNA
                          organism = synthetic construct
SEQUENCE: 100
cagtctgtgc tgacccaacc tccttctgtg tctgctgccc ctggccagaa agtgaccatc    60
tcttgctccg gctcctcctc caacgtaggc aacaacttcg tgtcctggta tcagcagctg   120
cccggcacag ctcccaaaact gctgatctac ggcatcaaca gcggcccag cggcatccct   180
gacagattct ccggatctaa gtccggcacc agcgctaccc tggttatcac cggattgcag   240
acaggcgacg aggccgacta ctattgcggc acctgggaca tcagtctgtc tgccgcggtt   300
tttggcggag gtaccaaatt gactgtcctg                                    330

SEQ ID NO: 101            moltype = AA  length = 117
FEATURE                   Location/Qualifiers
source                    1..117
                          mol_type = protein
                          organism = synthetic construct
SEQUENCE: 101
QVQLVQSGAE VKKPGAAVKV SCTASGYTFT DYFMHWVRRA PGQGLEWMGW FNPYSGESNY    60
AQKFQGRVAM TRDTSISTAY MELSRLRSDD TAVYYCARNG EVPFDNWGQG TLVTVSS      117

SEQ ID NO: 102            moltype = AA  length = 8
FEATURE                   Location/Qualifiers
source                    1..8
                          mol_type = protein
                          organism = synthetic construct
SEQUENCE: 102
GYTFTDYF                                                              8

SEQ ID NO: 103            moltype = AA  length = 8
FEATURE                   Location/Qualifiers
source                    1..8
                          mol_type = protein
                          organism = synthetic construct
SEQUENCE: 103
FNPYSGES                                                              8

SEQ ID NO: 104            moltype = AA  length = 10
FEATURE                   Location/Qualifiers
source                    1..10
                          mol_type = protein
                          organism = synthetic construct
SEQUENCE: 104
ARNGEVPFDN                                                           10

SEQ ID NO: 105            moltype = DNA  length = 351
FEATURE                   Location/Qualifiers
source                    1..351
                          mol_type = other DNA
                          organism = synthetic construct
SEQUENCE: 105
caggtgcagc tggttcaatc tggcgccgaa gtgaagaaac ctggcgccgc tgtgaaggtg    60
tcctgtaccg cttctggcta cacctttacc gactacttca tgcactgggt tcgcagagcc   120
cctggacagg gacttgaatg gatgggctgg tttaacccct actccggcga atctaactac   180
gcccagaaat tccagggcag agtggccatg accagagaca cctctatctc caccgcctac   240
atggaactgt cccggctgag atctgacgac accgccgtgt actactgcgc cagaaacggc   300
gaggtgcccct tcgataattg gggccaggga accctggtca ccgtgtcctc t           351

SEQ ID NO: 106            moltype = AA  length = 110
FEATURE                   Location/Qualifiers
source                    1..110
                          mol_type = protein
                          organism = synthetic construct
SEQUENCE: 106
QSVLTQPPSV SAAPGQKVTI SCSGSSSNIG NSFVSWYQQL PGTAPKLLIY DINKRPSGIP    60
DRFSGSKSGT SATLVITGLQ TGDEADYYCG TWDISLSAAV FGGGTKLTVL              110

SEQ ID NO: 107            moltype = AA  length = 8
FEATURE                   Location/Qualifiers
source                    1..8
                          mol_type = protein
                          organism = synthetic construct
SEQUENCE: 107
SSNIGNSF                                                              8

SEQ ID NO: 108            moltype =     length =
SEQUENCE: 108
000
```

```
SEQ ID NO: 109          moltype = AA   length = 11
FEATURE                 Location/Qualifiers
source                  1..11
                        mol_type = protein
                        organism = synthetic construct
SEQUENCE: 109
GTWDISLSAA V                                                          11

SEQ ID NO: 110          moltype = DNA  length = 330
FEATURE                 Location/Qualifiers
source                  1..330
                        mol_type = other DNA
                        organism = synthetic construct
SEQUENCE: 110
cagtctgtgc tgacccaacc tccttctgtg tctgctgccc ctggccagaa agtgaccatc      60
tcttgctccg gctcctcctc caacatcggc aacagcttcg tgtcctggta tcagcagctg    120
cccggcacag ctcccaaaac tctgatctac gacatcaaca gcgcccag cggcatccct      180
gacagattct ccggatctaa gtccggcacc agcgctaccc tggttatcac cggattgcag    240
acaggcgacg aggccgacta ctattgcggc acctgggaca tcagtctgtc tgccgcggtt    300
tttggcggag gtaccaaatt gactgtcctg                                     330

SEQ ID NO: 111          moltype = AA   length = 117
FEATURE                 Location/Qualifiers
source                  1..117
                        mol_type = protein
                        organism = synthetic construct
SEQUENCE: 111
QVQLVQSGAE VKKPGAAVKV SCTASGYNFT DYFMHWVRRA PGQGLEWMGW FNPYSGESNY      60
AQKFQGRVAM TRDTSISTAY MELSRLRSDD TAVYYCARNG EVPFDNWGQG TLVTVSS        117

SEQ ID NO: 112          moltype = AA   length = 8
FEATURE                 Location/Qualifiers
source                  1..8
                        mol_type = protein
                        organism = synthetic construct
SEQUENCE: 112
GYNFTDYF                                                               8

SEQ ID NO: 113          moltype = AA   length = 8
FEATURE                 Location/Qualifiers
source                  1..8
                        mol_type = protein
                        organism = synthetic construct
SEQUENCE: 113
FNPYSGES                                                               8

SEQ ID NO: 114          moltype = AA   length = 10
FEATURE                 Location/Qualifiers
source                  1..10
                        mol_type = protein
                        organism = synthetic construct
SEQUENCE: 114
ARNGEVPFDN                                                            10

SEQ ID NO: 115          moltype = DNA  length = 351
FEATURE                 Location/Qualifiers
source                  1..351
                        mol_type = other DNA
                        organism = synthetic construct
SEQUENCE: 115
caggtgcagc tggttcaatc tggcgccgaa gtgaagaaac ctggcgccgc tgtgaaggtg      60
tcctgtaccg cttctggcta caactttacc gactacttca tgcactgggt tcgcagagcc    120
cctggacagg gacttgaatg gatgggctgg tttaacccta ctccggcga atctaactac      180
gcccagaaat tccagggcag agtggccatg accagagaca cctctatctc caccgcctac    240
atggaactgt cccggctgag atctgacgac accgccgtgt actactgcgc cagaaatggc    300
gaggtgccct cgataattg gggccaggga accctggtca ccgtgtcctc t              351

SEQ ID NO: 116          moltype = AA   length = 110
FEATURE                 Location/Qualifiers
source                  1..110
                        mol_type = protein
                        organism = synthetic construct
SEQUENCE: 116
QSVLTQPPSV SAAPGQKVTI SCSGSSSNIA NNFVSWYQQL PGTAPKLLIY DNNKRPSGIP      60
DRFSGSKSGT SATLVITGLQ TGDEADYYCG TWDISLSAAV FGGGTKLTVL                110

SEQ ID NO: 117          moltype = AA   length = 8
FEATURE                 Location/Qualifiers
```

| | | |
|---|---|---|
| source | 1..8 | |
| | mol_type = protein | |
| | organism = synthetic construct | |
| SEQUENCE: 117 | | |
| SSNIANNF | | 8 |

SEQ ID NO: 118          moltype =    length =
SEQUENCE: 118
000

SEQ ID NO: 119          moltype = AA   length = 11
FEATURE                 Location/Qualifiers
source                  1..11
                        mol_type = protein
                        organism = synthetic construct
SEQUENCE: 119
GTWDISLSAA V                                                                 11

SEQ ID NO: 120          moltype = DNA  length = 330
FEATURE                 Location/Qualifiers
source                  1..330
                        mol_type = other DNA
                        organism = synthetic construct
SEQUENCE: 120
cagtctgtgc tgacccaacc tccttctgtg tctgctgccc tggccagaa agtgaccatc              60
tcttgctccg gctcctcctc caacatcgca aacaacttcg tgtcctggta tcagcagctg            120
cccggcacag ctcccaaact gctgatctac gacaacaaca gcggcccag cggcatccct             180
gacagattct ccggatctaa gtccggcacc agcgctaccc tggttatcac cggaattgcag           240
acaggcgacg aggccgacta ctattgcggc acctgggaca tcagtctgtc tgccgcggtt            300
tttggcggag gtaccaaatt gactgtcctg                                             330

SEQ ID NO: 121          moltype = AA   length = 117
FEATURE                 Location/Qualifiers
source                  1..117
                        mol_type = protein
                        organism = synthetic construct
SEQUENCE: 121
QVQLVQSGAE VKKPGAAVKV SCTASGYTFT DYFMHWVRRA PGQGLEWMGW FDPNSGASNY             60
AQKFQGRVAM TRDTSISTAY MELSRLKSDD TAVYYCARNG EVPFDNWGQG TLVTVSS               117

SEQ ID NO: 122          moltype = AA   length = 8
FEATURE                 Location/Qualifiers
source                  1..8
                        mol_type = protein
                        organism = synthetic construct
SEQUENCE: 122
GYTFTDYF                                                                      8

SEQ ID NO: 123          moltype = AA   length = 8
FEATURE                 Location/Qualifiers
source                  1..8
                        mol_type = protein
                        organism = synthetic construct
SEQUENCE: 123
FDPNSGAS                                                                      8

SEQ ID NO: 124          moltype = AA   length = 10
FEATURE                 Location/Qualifiers
source                  1..10
                        mol_type = protein
                        organism = synthetic construct
SEQUENCE: 124
ARNGEVPFDN                                                                   10

SEQ ID NO: 125          moltype = DNA  length = 351
FEATURE                 Location/Qualifiers
source                  1..351
                        mol_type = other DNA
                        organism = synthetic construct
SEQUENCE: 125
caggtgcagc tggttcaatc tggcgccgaa gtgaagaaac ctggcgccgc tgtgaaggtg             60
tcctgtaccg cttctggcta cacatttacc gactacttca tgcactgggt tcgcagagcc           120
cctggacagg gacttgaatg gatgggctgg tttgacccca ctccggcgc atctaactac            180
gcccagaaat tccagggcag agtggccatg accagagaca cctctatctc caccgcctac           240
atggaactgt cccggctgaa atctgacgac accgccgtgt actactgcgc cagaaatggc           300
gaggtccccct tcgataattg gggccaggga accctggtca ccgtgtcctc t                    351

SEQ ID NO: 126          moltype = AA   length = 110
FEATURE                 Location/Qualifiers

```
                          -continued source                  1..110
                        mol_type = protein
                        organism = synthetic construct
SEQUENCE: 126
QSVLTQPPSV SAAPGQKVTI SCSGSSSNIG NSFVSWYQQL PGTAPKLLIY DNNKRPSGIP    60
DRFSGSTSGT SATLVITGLQ TGDEADYYCG SWDISLSAGV FGGGTKLTVL              110

SEQ ID NO: 127          moltype = AA   length = 8
FEATURE                 Location/Qualifiers
source                  1..8
                        mol_type = protein
                        organism = synthetic construct
SEQUENCE: 127
SSNIGNSF                                                              8

SEQ ID NO: 128          moltype =      length =
SEQUENCE: 128
000

SEQ ID NO: 129          moltype = AA   length = 11
FEATURE                 Location/Qualifiers
source                  1..11
                        mol_type = protein
                        organism = synthetic construct
SEQUENCE: 129
GSWDISLSAG V                                                         11

SEQ ID NO: 130          moltype = DNA  length = 330
FEATURE                 Location/Qualifiers
source                  1..330
                        mol_type = other DNA
                        organism = synthetic construct
SEQUENCE: 130
cagtctgtgc tgacccaacc tccttctgtg tctgctgccc ctggccagaa agtgaccatc    60
tcttgctccg gctcctcctc caacatcggc aacagcttcg tgtcctggta tcagcagctg   120
cccggcacag ctcccaaact gctgatctac gacaacaaca gcggcccag cggcatccct   180
gacagattct ccggatctac gtccggcacc agcgctaccc tggttatcac cggattgcag   240
acaggcgacg aggccgacta ctattgcggc agctgggaca tcagtctgtc tgccggtgtt   300
tttggcggag gtaccaaatt gactgtcctg                                    330

SEQ ID NO: 131          moltype = AA   length = 117
FEATURE                 Location/Qualifiers
source                  1..117
                        mol_type = protein
                        organism = synthetic construct
SEQUENCE: 131
QVQLVQSGAE VKKPGAAVKV SCTASGYTFT DYYMHWVRRA PGQGLEWMGW FNPYSGGSNY    60
AQKFQGRVAM TRDTSISTAY MELSRLRSDD TAVYYCARSG EVPFDNWGQG TLVTVSS      117

SEQ ID NO: 132          moltype = AA   length = 8
FEATURE                 Location/Qualifiers
source                  1..8
                        mol_type = protein
                        organism = synthetic construct
SEQUENCE: 132
GYTFTDYY                                                              8

SEQ ID NO: 133          moltype = AA   length = 8
FEATURE                 Location/Qualifiers
source                  1..8
                        mol_type = protein
                        organism = synthetic construct
SEQUENCE: 133
FNPYSGGS                                                              8

SEQ ID NO: 134          moltype = AA   length = 10
FEATURE                 Location/Qualifiers
source                  1..10
                        mol_type = protein
                        organism = synthetic construct
SEQUENCE: 134
ARSGEVPFDN                                                           10

SEQ ID NO: 135          moltype = DNA  length = 351
FEATURE                 Location/Qualifiers
source                  1..351
                        mol_type = other DNA
                        organism = synthetic construct
SEQUENCE: 135
```

```
caggtgcagc tggttcaatc tggcgccgaa gtgaagaaac ctggcgccgc tgtgaaggtg    60
tcctgtaccg cttctggcta caccttacc  gactactaca tgcactgggt tcgcagagcc   120
cctggacagg gacttgaatg gatgggctgg tttaacccct actccggcgg ctctaactac   180
gcccagaaat tccagggcag agtggccatg accagagaca cctctatctc caccgcctac   240
atgaactgtc ccggctgag  atctgacgac accgccgtgt actactgcgc cagatccggc   300
gaggtgccct tcgataattg gggccaggga accctggtca ccgtgtcctc t            351
```

SEQ ID NO: 136            moltype = AA   length = 110
FEATURE                   Location/Qualifiers
source                    1..110
                          mol_type = protein
                          organism = synthetic construct
SEQUENCE: 136
QSVLTQPPSV SAAPGQKVTI SCSGSSSNIG NNFVSWYQQL PGTAPKLLIY GINKRPSGIP    60
DRFSGSKSGT SATLVITGLQ TGDEADYYCG TWDISLSAYV FGGGTKLTVL              110

SEQ ID NO: 137            moltype = AA   length = 8
FEATURE                   Location/Qualifiers
source                    1..8
                          mol_type = protein
                          organism = synthetic construct
SEQUENCE: 137
SSNIGNNF                                                              8

SEQ ID NO: 138            moltype =     length =
SEQUENCE: 138
000

SEQ ID NO: 139            moltype = AA   length = 11
FEATURE                   Location/Qualifiers
source                    1..11
                          mol_type = protein
                          organism = synthetic construct
SEQUENCE: 139
GTWDISLSAY V                                                         11

SEQ ID NO: 140            moltype = DNA  length = 330
FEATURE                   Location/Qualifiers
source                    1..330
                          mol_type = other DNA
                          organism = synthetic construct
SEQUENCE: 140
```
```
cagtctgtgc tgacccaacc tccttctgtg tctgctgccc ctggccagaa agtgaccatc    60
tcttgctccg gctcctcctc caacatcggc aacaacttcg tgtcctggta tcagcagctg   120
cccggcacag ctcccaaact gctgatctac ggcatcaaca gcggccagcg gcatccct     180
gacagattct ccggatctaa gtccggcacc agcgctaccc tggttatcac cggattgcag   240
acaggcgacg aggccgacta ctattgcggc acctgggaca tcagtctatc tgcctacgtt   300
tttggcggag gtaccaaatt gactgtcctg                                    330
```

SEQ ID NO: 141            moltype = AA   length = 403
FEATURE                   Location/Qualifiers
source                    1..403
                          mol_type = protein
                          organism = synthetic construct
SEQUENCE: 141
MEPLRLLILL FVTELSGAHN TTVFQGVAGQ SLQVSCPYDS MKHWGRRKAW CRQLGEKGPC    60
QRVVSTHNLW LLSFLRRWNG STAITDDTLG GTLTITLRNL QPHDAGLYQC QSLHGSEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
EPQVYTLPPC REEMTKNQVS LWCLVKGFYP SDIAVEWESN GQPENNYKTT PPVLDSDGSF   360
FLYSKLTVDK SRWQQGNVFS CSVMHEALHN HYTQKSLSLS PGK                     403

SEQ ID NO: 142            moltype = AA   length = 400
FEATURE                   Location/Qualifiers
source                    1..400
                          mol_type = protein
                          organism = synthetic construct
SEQUENCE: 142
MGPLHQFLLL LITALSQALN TTVLQGMAGQ SLRVSCTYDA LKHWGRRKAW CRQLGEEGPC    60
QRVVSTHGVW LLAFLKKRNG STVIADDTLA GTVTITLKNL QAGDAGLYQC QSLRGREAEV   120
LQKVLVEVLE DPLDDQDAGD LWVPEESSSF EGAQVEHSTS RNQETSFPPT STGDKTHTCP   180
PCPAPELLGG PSVFLPPPKP KDTLMISRTP EVTCVVVHGS HEDPEVKFNW YVDGVEVHNA   240
KTKPREEQYN STYRVVSVLT VLHQDWLNGK EYKCKVSNKA LPAPIEKTIS KAKGQPREPQ   300
VYTLPPCREE MTKNQVSLWC LVKGFYPSDI AVEWESNGQP ENNYKTTPPV LDSDGSFFLY   360
SKLTVDKSRW QQGNVFSCSV MHEALHNHYT QKSLSLSPGK                         400

SEQ ID NO: 143            moltype = AA   length = 403
FEATURE                   Location/Qualifiers

```
source                   1..403
                         mol_type = protein
                         organism = synthetic construct
SEQUENCE: 143
MEPLRLLILL FVTELSGAHN TTVFQGVAGQ SLQVSCPYDS AKHWGRRKAW CRQLGEKGPC    60
QRVVSTHNLW LLSFLRRWNG STAITDDTLG GTLTITLRNL QPHDAGLYQC QSLHGSEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
EPQVYTLPPC REEMTKNQVS LWCLVKGFYP SDIAVEWESN GQPENNYKTT PPVLDSDGSF   360
FLYSKLTVDK SRWQQGNVFS CSVMHEALHN HYTQKSLSLS PGK                     403

SEQ ID NO: 144           moltype = AA  length = 403
FEATURE                  Location/Qualifiers
source                   1..403
                         mol_type = protein
                         organism = synthetic construct
SEQUENCE: 144
MEPLRLLILL FVTELSGAHN TTVFQGVAGQ SLQVSCPYDS MAHWGRRKAW CRQLGEKGPC    60
QRVVSTHNLW LLSFLRRWNG STAITDDTLG GTLTITLRNL QPHDAGLYQC QSLHGSEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
EPQVYTLPPC REEMTKNQVS LWCLVKGFYP SDIAVEWESN GQPENNYKTT PPVLDSDGSF   360
FLYSKLTVDK SRWQQGNVFS CSVMHEALHN HYTQKSLSLS PGK                     403

SEQ ID NO: 145           moltype = AA  length = 403
FEATURE                  Location/Qualifiers
source                   1..403
                         mol_type = protein
                         organism = synthetic construct
SEQUENCE: 145
MEPLRLLILL FVTELSGAHN TTVFQGVAGQ SLQVSCPYDS MKHAGRRKAW CRQLGEKGPC    60
QRVVSTHNLW LLSFLRRWNG STAITDDTLG GTLTITLRNL QPHDAGLYQC QSLHGSEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
EPQVYTLPPC REEMTKNQVS LWCLVKGFYP SDIAVEWESN GQPENNYKTT PPVLDSDGSF   360
FLYSKLTVDK SRWQQGNVFS CSVMHEALHN HYTQKSLSLS PGK                     403

SEQ ID NO: 146           moltype = AA  length = 403
FEATURE                  Location/Qualifiers
source                   1..403
                         mol_type = protein
                         organism = synthetic construct
SEQUENCE: 146
MEPLRLLILL FVTELSGAHN TTVFQGVAGQ SLQVSCPYDS MKHWGRRKAW CRQLGEKGPC    60
QRVVSTHNLW LLSFLRRWNG STAITDDTLG GTLTITLRNL QPHDAGLYQC QALHGSEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
EPQVYTLPPC REEMTKNQVS LWCLVKGFYP SDIAVEWESN GQPENNYKTT PPVLDSDGSF   360
FLYSKLTVDK SRWQQGNVFS CSVMHEALHN HYTQKSLSLS PGK                     403

SEQ ID NO: 147           moltype = AA  length = 403
FEATURE                  Location/Qualifiers
source                   1..403
                         mol_type = protein
                         organism = synthetic construct
SEQUENCE: 147
MEPLRLLILL FVTELSGAHN TTVFQGVAGQ SLQVSCPYDS MKHWGRRKAW CRQLGEKGPC    60
QRVVSTHNLW LLSFLRRWNG STAITDDTLG GTLTITLRNL QPHDAGLYQC QSLAGSEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
EPQVYTLPPC REEMTKNQVS LWCLVKGFYP SDIAVEWESN GQPENNYKTT PPVLDSDGSF   360
FLYSKLTVDK SRWQQGNVFS CSVMHEALHN HYTQKSLSLS PGK                     403

SEQ ID NO: 148           moltype = AA  length = 403
FEATURE                  Location/Qualifiers
source                   1..403
                         mol_type = protein
                         organism = synthetic construct
SEQUENCE: 148
MEPLRLLILL FVTELSGAHN TTVFQGVAGQ SLQVSCPYDS MKHWGRRKAW CRQLGEKGPC    60
QRVVSTHNLW LLSFLRRWNG STAITDDTLG GTLTITLRNL QPHDAGLYQC QALHGAEADT   120
LRKVLVEVLA DPLDHRDAGD LWFPGESESF EDAHVEHSIS RSLLEGEIPF PPTSTGDKTH   180
TCPPCPAPEL LGGPSVFLFP PKPKDTLMIS RTPEVTCVVV DVSHEDPEVK FNWYVDGVEV   240
HNAKTKPREE QYNSTYRVVS VLTVLHQDWL NGKEYKCKVS NKALPAPIEK TISKAKGQPR   300
```

```
EPQVYTLPPC REEMTKNQVS LWCLVKGFYP SDIAVEWESN GQPENNYKTT PPVLDSDGSF    360
FLYSKLTVDK SRWQQGNVFS CSVMHEALHN HYTQKSLSLS PGK                     403

SEQ ID NO: 149          moltype = AA  length = 403
FEATURE                 Location/Qualifiers
source                  1..403
                        mol_type = protein
                        organism = synthetic construct
SEQUENCE: 149
MEPLRLLILL FVTELSGAHN TTVFQGVAGQ SLQVSCPYDS MKHWGRRKAW CRQLGEKGPC    60
QRVVSTHALW LLSFLRRWNG STAITDDTLG GTLTITLRNL QPHDAGLYQC QSLHGSEADT    120
LRKVLVEVLA DPLDHRDAGD LWFPGESESF EDAHVEHSIS RSLLEGEIPF PPTSTGDKTH    180
TCPPCPAPEL LGGPSVFLFP PKPKDTLMIS RTPEVTCVVV DVSHEDPEVK FNWYVDGVEV    240
HNAKTKPREE QYNSTYRVVS VLTVLHQDWL NGKEYKCKVS NKALPAPIEK TISKAKGQPR    300
EPQVYTLPPC REEMTKNQVS LWCLVKGFYP SDIAVEWESN GQPENNYKTT PPVLDSDGSF    360
FLYSKLTVDK SRWQQGNVFS CSVMHEALHN HYTQKSLSLS PGK                     403

SEQ ID NO: 150          moltype = AA  length = 403
FEATURE                 Location/Qualifiers
source                  1..403
                        mol_type = protein
                        organism = synthetic construct
SEQUENCE: 150
MEPLRLLILL FVTELSGAHN TTVFQGVAGQ SLQVSCPYDS MKHWGRRKAW CRQLGEKGPC    60
QRVVSTHNLW ALSFLRRWNG STAITDDTLG GTLTITLRNL QPHDAGLYQC QSLHGSEADT    120
LRKVLVEVLA DPLDHRDAGD LWFPGESESF EDAHVEHSIS RSLLEGEIPF PPTSTGDKTH    180
TCPPCPAPEL LGGPSVFLFP PKPKDTLMIS RTPEVTCVVV DVSHEDPEVK FNWYVDGVEV    240
HNAKTKPREE QYNSTYRVVS VLTVLHQDWL NGKEYKCKVS NKALPAPIEK TISKAKGQPR    300
EPQVYTLPPC REEMTKNQVS LWCLVKGFYP SDIAVEWESN GQPENNYKTT PPVLDSDGSF    360
FLYSKLTVDK SRWQQGNVFS CSVMHEALHN HYTQKSLSLS PGK                     403

SEQ ID NO: 151          moltype = AA  length = 403
FEATURE                 Location/Qualifiers
source                  1..403
                        mol_type = protein
                        organism = synthetic construct
SEQUENCE: 151
MEPLRLLILL FVTELSGAHN TTVFQGVAGQ SLQVSCPYDS MKHWGRRKAW CRQLGEKGPC    60
QRVVSTHNLW LLSALRRWNG STAITDDTLG GTLTITLRNL QPHDAGLYQC QSLHGSEADT    120
LRKVLVEVLA DPLDHRDAGD LWFPGESESF EDAHVEHSIS RSLLEGEIPF PPTSTGDKTH    180
TCPPCPAPEL LGGPSVFLFP PKPKDTLMIS RTPEVTCVVV DVSHEDPEVK FNWYVDGVEV    240
HNAKTKPREE QYNSTYRVVS VLTVLHQDWL NGKEYKCKVS NKALPAPIEK TISKAKGQPR    300
EPQVYTLPPC REEMTKNQVS LWCLVKGFYP SDIAVEWESN GQPENNYKTT PPVLDSDGSF    360
FLYSKLTVDK SRWQQGNVFS CSVMHEALHN HYTQKSLSLS PGK                     403

SEQ ID NO: 152          moltype = AA  length = 403
FEATURE                 Location/Qualifiers
source                  1..403
                        mol_type = protein
                        organism = synthetic construct
SEQUENCE: 152
MEPLRLLILL FVTELSGAHN TTVFQGVAGQ SLQVSCPYDS MKHWGRRKAW CRQLGEKGPC    60
QRVVSTHNLW LLSFLRRWNG STAITDDTAG GTLTITLRNL QPHDAGLYQC QSLHGSEADT    120
LRKVLVEVLA DPLDHRDAGD LWFPGESESF EDAHVEHSIS RSLLEGEIPF PPTSTGDKTH    180
TCPPCPAPEL LGGPSVFLFP PKPKDTLMIS RTPEVTCVVV DVSHEDPEVK FNWYVDGVEV    240
HNAKTKPREE QYNSTYRVVS VLTVLHQDWL NGKEYKCKVS NKALPAPIEK TISKAKGQPR    300
EPQVYTLPPC REEMTKNQVS LWCLVKGFYP SDIAVEWESN GQPENNYKTT PPVLDSDGSF    360
FLYSKLTVDK SRWQQGNVFS CSVMHEALHN HYTQKSLSLS PGK                     403

SEQ ID NO: 153          moltype = AA  length = 230
FEATURE                 Location/Qualifiers
source                  1..230
                        mol_type = protein
                        organism = Macaca fascicularis
SEQUENCE: 153
MEPLRLLILL FATELSGAHN TTVFQGVEGQ SLQVSCPYDS MKHWGRRKAW CRQLGEKGPC    60
QRVVSTHNLW LLSFLRRRNG STAITDDTLG GTLTITLRNL QPHDAGFYQC QSLHGSEADT    120
LRKVLVEVLA DPLDHRDAGD LWVPGESESF EDAHVEHSIS RSLLEGEIPF PPTSVLLLLA    180
CIFLIKILAA SALWAAAWHG QKPGTHPPGE PDCGHDPGHQ LQTLPGLRDT              230
```